(12) United States Patent
Kukal et al.

(10) Patent No.: US 9,449,130 B1
(45) Date of Patent: Sep. 20, 2016

(54) METHODS, SYSTEMS, AND ARTICLES OF MANUFACTURE FOR BACK ANNOTATING AND VISUALIZING PARASITIC MODELS OF ELECTRONIC DESIGNS

(71) Applicant: Cadence Design Systems, Inc., San Jose, CA (US)

(72) Inventors: Taranjit Singh Kukal, Delhi (IN); Steven Durrill, Campbell, CA (US); Utpal Bhattacharyya, Noida (IN); Amit Sharma, New Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/069,881

(22) Filed: Mar. 14, 2016

Related U.S. Application Data

(62) Division of application No. 14/503,408, filed on Oct. 1, 2014, now Pat. No. 9,286,421.

(60) Provisional application No. 62/033,607, filed on Aug. 5, 2014.

(51) Int. Cl.
*G06F 9/455* (2006.01)
*G06F 17/50* (2006.01)

(52) U.S. Cl.
CPC .................. *G06F 17/5036* (2013.01)

(58) Field of Classification Search
CPC .................................. G06F 17/5022
USPC ........................................ 716/106
See application file for complete search history.

(56) References Cited

U.S. PATENT DOCUMENTS

| | | |
|---|---|---|
| 4,457,027 A | 7/1984 | Gladstone |
| 5,396,435 A | 3/1995 | Ginetti |
| 5,426,591 A | 6/1995 | Ginetti et al. |
| 5,633,803 A | 5/1997 | Silve et al. |
| 5,638,290 A | 6/1997 | Ginetti et al. |
| 5,726,902 A | 3/1998 | Mahmood et al. |
| 5,751,596 A | 5/1998 | Ginetti et al. |

(Continued)

OTHER PUBLICATIONS

LAYIN: toward a global solution for parasitic coupling modeling and visualization; Clement et al.; Swiss Federal Institute of Technology; pp. 537-540.*

(Continued)

*Primary Examiner* — Suresh Memula
(74) *Attorney, Agent, or Firm* — Vista IP Law Group, LLP

(57) ABSTRACT

Various embodiments automatically back annotate an electronic design representation by inserting complex model instances in the representation and interconnecting the model instances with one or more interconnect models. Identifications of ports in a first representation may be associated or updated with identifications of corresponding ports in a second representation. Annotating the first representation may also include associating or stitching parasitic information from the second representation with or in the first representation. A model is used to represent a vectored net by splitting a vectored net with a vectored net identification into multiple scalared net segments each having its own scalared net identification. Some aspects automatically generate a display for visualizing results of annotating an electronic design with complex models. Some of these aspects may further include parasitic information and analysis results in the display.

20 Claims, 35 Drawing Sheets

(56) References Cited

U.S. PATENT DOCUMENTS

| | | | |
|---|---|---|---|
| 5,764,525 A | 6/1998 | Mahmood et al. | |
| 5,825,658 A | 10/1998 | Ginetti et al. | |
| 5,841,663 A | 11/1998 | Sharma et al. | |
| 5,896,299 A | 4/1999 | Ginetti et al. | |
| 5,956,257 A | 9/1999 | Ginetti et al. | |
| 6,086,621 A | 7/2000 | Ginetti et al. | |
| 6,113,647 A | 9/2000 | Silve et al. | |
| 6,145,117 A * | 11/2000 | Eng | G06F 17/5045 716/105 |
| 6,170,080 B1 | 1/2001 | Ginetti et al. | |
| 6,353,612 B1 | 3/2002 | Zhu | |
| 6,378,116 B1 | 4/2002 | Ginetti | |
| 6,401,128 B1 | 6/2002 | Stai | |
| 6,405,345 B1 | 6/2002 | Ginetti | |
| 6,519,743 B1 | 2/2003 | Nauts et al. | |
| 6,622,290 B1 | 9/2003 | Ginetti et al. | |
| 6,622,291 B1 | 9/2003 | Ginetti | |
| 7,143,341 B1 | 11/2006 | Kohli | |
| 7,168,041 B1 | 1/2007 | Durrill et al. | |
| 7,257,799 B2 | 8/2007 | McKenney | |
| 7,468,982 B2 | 12/2008 | Mehra | |
| 7,490,309 B1 | 2/2009 | Kukal et al. | |
| 7,555,739 B1 | 6/2009 | Ginetti et al. | |
| 7,634,743 B1 | 12/2009 | Ginetti | |
| 7,779,286 B1 | 8/2010 | Pritchard | |
| 7,802,221 B1 | 9/2010 | Brink | |
| 7,949,987 B1 | 5/2011 | Ginetti et al. | |
| 7,971,175 B2 | 6/2011 | Ginetti | |
| 7,971,178 B1 | 6/2011 | Marwah et al. | |
| 7,990,375 B2 | 8/2011 | Kohli et al. | |
| 8,046,730 B1 | 10/2011 | Ferguson et al. | |
| 8,136,071 B2 | 3/2012 | Solomon | |
| 8,145,458 B1 | 3/2012 | Kukal et al. | |
| 8,191,035 B1 | 5/2012 | Van Brink | |
| 8,255,845 B2 | 8/2012 | Ginetti | |
| 8,261,228 B1 | 9/2012 | Gopalakrishnan et al. | |
| 8,271,933 B1 | 9/2012 | Kohli et al. | |
| 8,281,272 B1 | 10/2012 | Ginetti | |
| 8,286,025 B1 | 10/2012 | Pritchard | |
| 8,286,110 B1 | 10/2012 | Kukal et al. | |
| 8,316,337 B2 | 11/2012 | Bhattacharya et al. | |
| 8,316,342 B1 | 11/2012 | Kukal et al. | |
| 8,347,261 B2 | 1/2013 | Ginetti et al. | |
| 8,364,656 B2 | 1/2013 | Arora et al. | |
| 8,438,524 B1 | 5/2013 | Kohli et al. | |
| 8,452,582 B1 | 5/2013 | Al-Hawari et al. | |
| 8,453,136 B1 | 5/2013 | Hahn et al. | |
| 8,479,134 B2 | 7/2013 | Bhattacharya et al. | |
| 8,521,483 B1 | 8/2013 | Kukal et al. | |
| 8,527,929 B2 | 9/2013 | Bhattacharya et al. | |
| 8,527,934 B2 | 9/2013 | Ginetti et al. | |
| 8,566,767 B1 | 10/2013 | Kukal et al. | |
| 8,594,988 B1 | 11/2013 | Spyrou et al. | |
| 8,631,181 B2 | 1/2014 | Feehrer | |
| 8,645,894 B1 | 2/2014 | Kukal et al. | |
| 8,656,329 B1 | 2/2014 | Kukal et al. | |
| 8,719,754 B1 | 5/2014 | Ginetti | |
| 8,732,636 B2 | 5/2014 | Ginetti et al. | |
| 8,732,651 B1 | 5/2014 | Kukal et al. | |
| 8,762,906 B2 | 6/2014 | Ginetti et al. | |
| 8,769,455 B1 | 7/2014 | Singh et al. | |
| 8,806,405 B2 | 8/2014 | Colwell | |
| 8,898,039 B1 | 11/2014 | Kukal et al. | |
| 8,910,100 B1 | 12/2014 | Wilson et al. | |
| 8,930,878 B1 | 1/2015 | Leef | |
| 9,223,912 B1 * | 12/2015 | Liapis | G06F 17/5045 |
| 2003/0051222 A1 | 3/2003 | Williams et al. | |
| 2003/0196182 A1 | 10/2003 | Hahn | |
| 2004/0034842 A1 | 2/2004 | Mantey | |
| 2004/0156322 A1 | 8/2004 | Mehra | |
| 2005/0229128 A1 * | 10/2005 | Sripada | G06F 17/5022 716/113 |
| 2005/0273732 A1 | 12/2005 | Xu | |
| 2006/0111884 A1 | 5/2006 | McGaughy et al. | |
| 2007/0229537 A1 | 10/2007 | Kohli et al. | |
| 2008/0301600 A1 | 12/2008 | Kumagai | |
| 2009/0007031 A1 | 1/2009 | Ginetti et al. | |
| 2010/0031209 A1 | 2/2010 | Luan et al. | |
| 2010/0115207 A1 | 5/2010 | Arora et al. | |
| 2010/0306729 A1 | 12/2010 | Ginetti | |
| 2011/0041106 A1 | 2/2011 | Li et al. | |
| 2011/0061034 A1 | 3/2011 | Ginetti et al. | |
| 2011/0153288 A1 | 6/2011 | Bhattacharya et al. | |
| 2011/0153289 A1 | 6/2011 | Bhattacharya et al. | |
| 2011/0154276 A1 | 6/2011 | Bhattacharya et al. | |
| 2011/0161899 A1 | 6/2011 | Ginetti et al. | |
| 2011/0161900 A1 | 6/2011 | Ginetti et al. | |
| 2011/0173582 A1 | 7/2011 | Bhattacharya et al. | |
| 2012/0047434 A1 | 2/2012 | Ginetti | |
| 2013/0097572 A1 | 4/2013 | Ginetti et al. | |
| 2013/0246900 A1 | 9/2013 | Ginetti et al. | |
| 2013/0290834 A1 | 10/2013 | Ginetti et al. | |
| 2014/0123094 A1 | 5/2014 | Colwell et al. | |
| 2014/0223402 A1 | 8/2014 | Satou | |

OTHER PUBLICATIONS

Backward-annotation of post-layout delay information into high-level synthesis process for performance optimization; Park et al.; VLSI and CAD, 1999. ICVC '99. 6th International Conference; pp. 25-28.*

Hon-Chi Ng, "Cpr E 305 Laboratory Tutorial ¾ Verilog Syntax: Summary of Verilog Syntax" Last Updated: Feb. 7, 2001.

Stuart Sutherland, "Verilog HDL: Quick Reference Guide" 2001.

"Summary of Verilog Syntax" URL: http://www.verilogtutorial.info/chapter_3.htm, 2007, Accessed on Sep. 2, 2014.

Non-Final Office Action dated Apr. 13, 2015 for U.S. Appl. No. 14/503,408.

Non-Final Office Action dated Apr. 16, 2015 for U.S. Appl. No. 14/503,407.

Notice of Allowance dated Aug. 21, 2015 for U.S. Appl. No. 14/503,406.

Notice of Allowance dated Oct. 28, 2015 for U.S. Appl. No. 14/503,407.

Notice of Allowance dated Oct. 29, 2015 for U.S. Appl. No. 14/503,408.

Ex-parte Quayle Action dated Nov. 2, 2015 for U.S. Appl. No. 14/503,404.

Notice of Allowance dated Jan. 22, 2016 for U.S. Appl. No. 14/503,404.

Ex-parte Quayle Action dated Nov. 27, 2015 for U.S. Appl. No. 14/503,404.

* cited by examiner

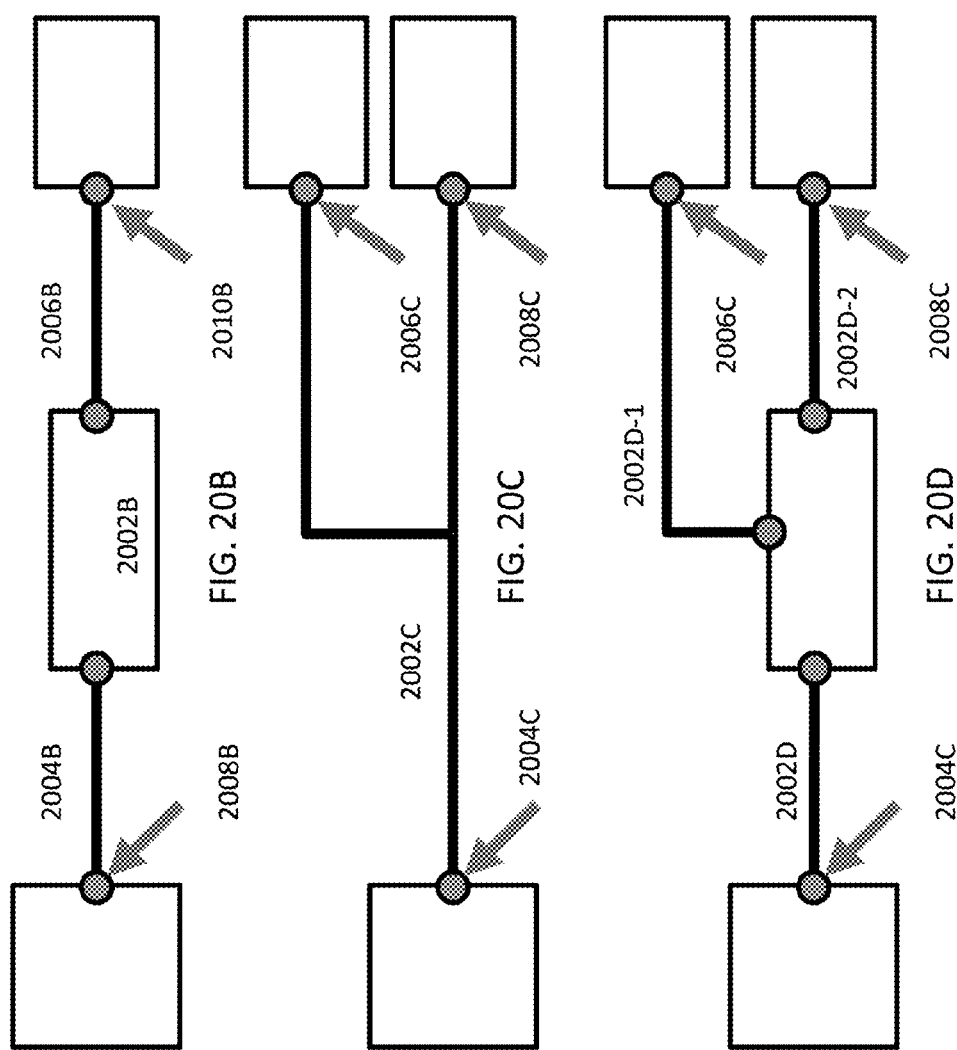

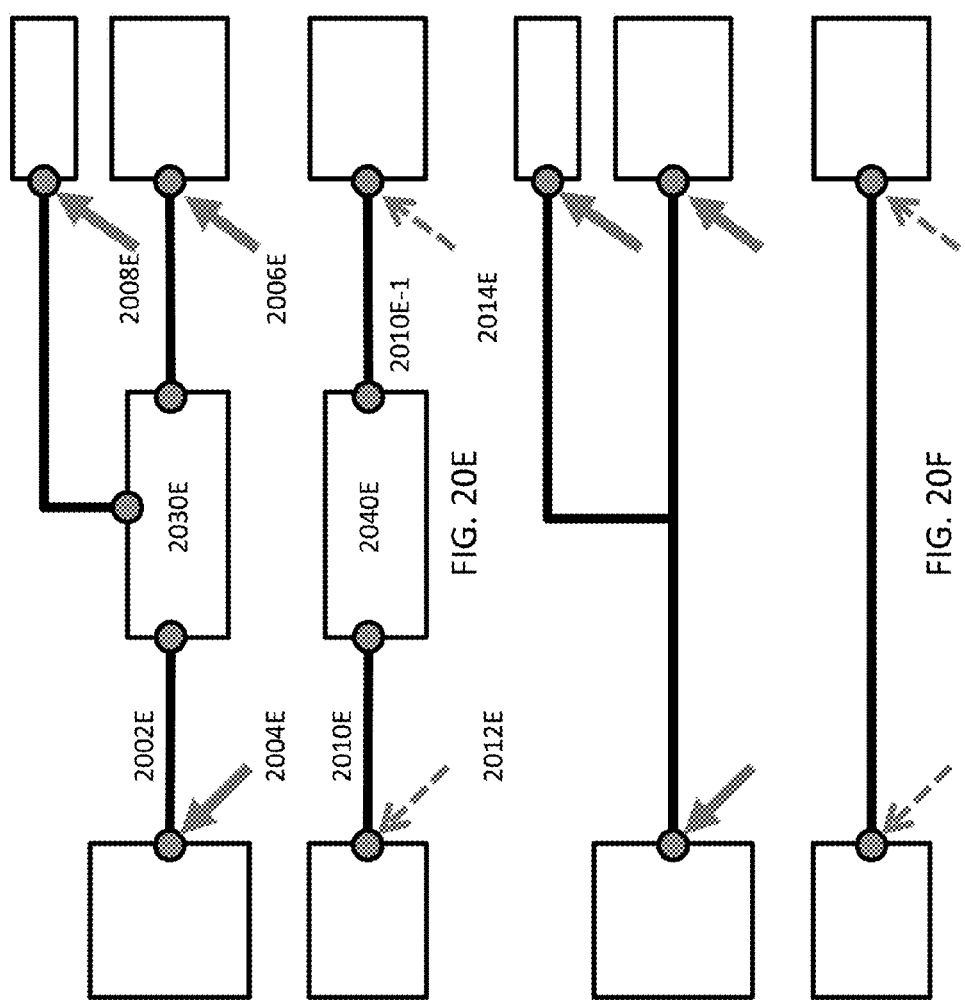

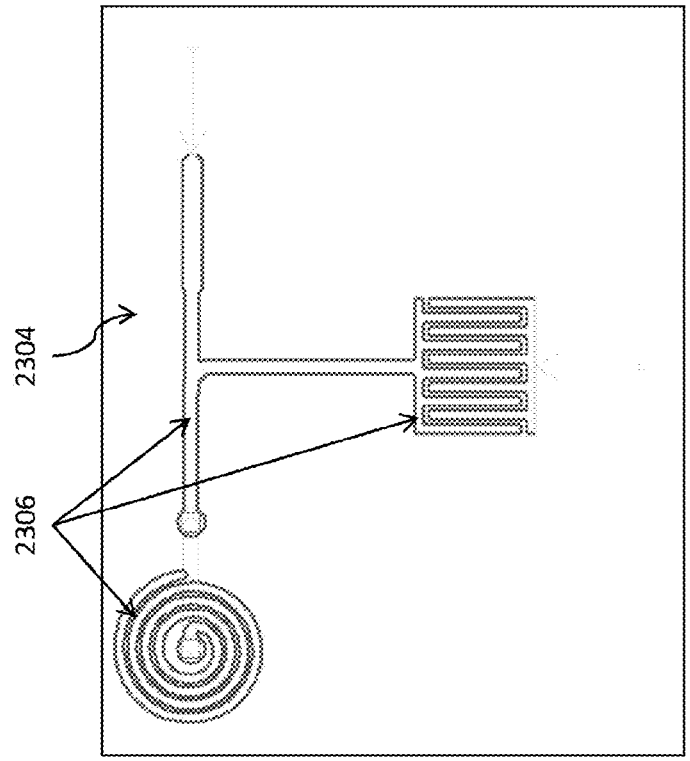
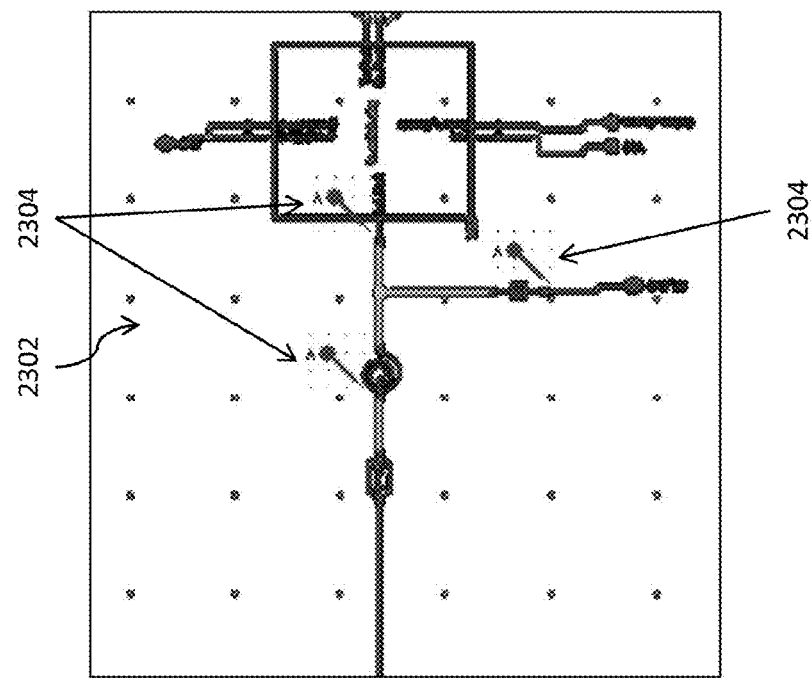
FIG. 23

“METHODS, SYSTEMS, AND ARTICLES OF MANUFACTURE FOR BACK ANNOTATING AND VISUALIZING PARASITIC MODELS OF ELECTRONIC DESIGNS”

CROSS-REFERENCE TO RELATED PATENT APPLICATIONS

This patent application is a division of U.S. patent application Ser. No. 14/503,408 filed on Oct. 1, 2014 and entitled "METHODS, SYSTEMS, AND ARTICLES OF MANUFACTURE FOR BACK ANNOTATING AND VISUALIZING PARASITIC MODELS OF ELECTRONIC DESIGNS" that further claims the benefit of U.S. Prov. Patent App. Ser. No. 62/033,607 filed on Aug. 5, 2014 and entitled "METHOD, SYSTEM, AND COMPUTER PROGRAM PRODUCT FOR IMPLEMENTING, VERIFYING, AND/OR ANALYZING A MULTI-FABRIC ELECTRONIC DESIGN SPANNING ACROSS MULTIPLE DESIGN FABRICS". This application is also cross related to U.S. patent application Ser. No. 14/503,403 filed concurrently and entitled "METHODS, SYSTEMS, AND ARTICLES OF MANUFACTURE FOR IMPLEMENTING A MULTI-FABRIC ELECTRONIC DESIGN SPANNING ACROSS MULTIPLE DESIGN FABRICS", U.S. patent application Ser. No. 14/503,404 filed concurrently and entitled "METHODS, SYSTEMS, AND ARTICLES OF MANUFACTURE FOR PROBING OR NETLISTING A MULTI-FABRIC ELECTRONIC DESIGN SPANNING ACROSS MULTIPLE DESIGN FABRICS", U.S. patent application Ser. No. 14/503,406 filed concurrently and entitled "METHOD, SYSTEM, AND COMPUTER PROGRAM PRODUCT FOR CHECKING, VERIFYING, OR TESTING A MULTI-FABRIC ELECTRONIC DESIGN SPANNING ACROSS MULTIPLE DESIGN FABRICS", and U.S. patent application Ser. No. 14/503,407 filed concurrently and entitled "METHODS, SYSTEMS, AND ARTICLES OF MANUFACTURE FOR ANALYZING A MULTI-FABRIC ELECTRONIC DESIGN AND DISPLAYING ANALYSIS RESULTS FOR THE MULTI-FABRIC ELECTRONIC DESIGN SPANNING AND DISPLAYING SIMULATION RESULTS ACROSS MULTIPLE DESIGN FABRICS". The contents of the aforementioned U.S. provisional patent application and U.S. patent applications are hereby incorporated by reference in their respective entireties for all purposes.

BACKGROUND

With increasing data-rates in modern electronic designs, functional schematic simulations may need to account for layout parasitics to ensure accurate simulation results. Accounting for parasitics has become even more important for RF (radio frequency), analog, or mixed-signal electronic designs where layout parasitics may drastically impact electrical characteristics (e.g., voltages and currents) and hence the performance, reliability, manufacturability, and quality of the electronic deigns. Parasitics may come from IC-layout and/or package-layout and affect the performance, reliability, manufacturability, and quality of the electronic design. Traditional approaches use extraction techniques to extract IC (integrated circuit)-layout parasitics as RC (resistance, capacitance) values. The extracted parasitics are often not sufficiently accurate for electronic designs where package-layout geometries are two-and-a-half-dimensional or three-dimensional in nature and may thus be inductive, especially with complex coupling with their neighboring components As a result, IC bumps, package balls, vias, and/or dense routing over large package geometries may need to be extracted as complex macro-models. When such macro-models representing the parasitics are inserted into schematics for "parasitic aware circuit simulations", the schematic may become overly complicated as connections are abutted to join various sources and destinations and models are inserted. Conventional approaches thus require a manual process for such macro-model insertion, and with such conventional approaches the schematic may start to lose its readability and may not be able to drive PCB (printed circuit board)/package implementation.

In addition, conventional approaches may not account for complex models such as s-parameter models, SPICE (simulation program with integrated circuit emphasis) sub-circuit models, or IBIS (input output buffer information specification) models that often include multiple coupled nets. Furthermore, a user may need to quickly perform multiple what-if analyses to examine the impact of changing parasitics on the electronic design. With conventional approaches, users simply cannot selectively probe the inserted complex models, not to mention performing any quick evaluation or analyses (e.g., what-if analysis analyses) where multiple simulations with different model associations need to be performed. Conventional approaches may also fail when a net to be extracted is common or shared across two models. Some conventional approaches are further limited to parasitic stitching and cannot handle model annotation for instances of various circuit design components or blocks. Conventional approach also cannot change model associations unless the cell view of an inserted symbol is modified for the name of the sub-circuit of interest.

Therefore, there exists a need to back annotate and visualize parasitic models for electronic designs without any of the aforementioned issues or limitations.

SUMMARY

Disclosed are method(s), system(s), and article(s) of manufacture for back annotating and visualizing parasitic models of electronic designs in one or more embodiments. Some embodiments are directed at a method for back annotating and visualizing parasitic models of electronic designs in the schematic design fabric. The method includes the acts of identifying a first port in a first block of circuit design in a first representation of an electronic design with a first model identification of the first port in a second representation of the electronic design; determining a first model in the first representation for the first block of circuit design; and automatically annotating the first model into the first representation for the first block. In some embodiments, the first model includes an s-parameter model or a SPICE sub-circuit model. The method may further optionally include the acts of extracting parasitic information for one or more circuit components from the second representation of the electronic design; and automatically annotating the first representation with the parasitic information.

In addition or in the alternative, the first representation belongs to a first design fabric, and the second representation belongs to a second design fabric. In some embodiments, the method may also include the acts of identifying the second port of the second block with a second model identification of the second port in the second representation of the electronic design, wherein the first block is connected to the second block in the first representation of the electronic design; determining a second model in the first representation for the second block of circuit design; and automatically annotating the second model into the first representation for the second block. In some of these immediately preceding embodiments, the method may include the acts of automatically inserting the first model into the first representation of the electronic design; automatically inserting the second model into the first representation of the electronic design; and automatically connecting the first port to the second port in the first representation of the electronic design.

Some of these embodiments that connect the first port to the second port may optionally include the acts of determining connectivity information for at least the first block and the second block; updating the first model and the second model with at least the connectivity information; identifying one or more nets interconnecting the first port and the second port by using at least the connectivity information; and determining one or more net models for the one or more nets based at least in part upon the connectivity information. In some embodiments, the method may optionally include the act of identifying a first simulation representation; and associating the first simulation representation with the first representation by using a first profile. In addition or in the alternative, the method may further include the acts of identifying a request including a probe for displaying the first representation of the electronic design; identifying one or more pertinent circuit components related to the request in response to the request; and generating a display for the first representation in a user interface to fulfill the request, wherein the display comprises at least the first model and the one or more pertinent circuit components.

In some embodiments where the first representation includes a vectored net, the method may further include the acts of connecting the first port to a first end of a vectored net with a first vectored net identification in the first representation; and splitting the first vectored net identification for the first end into multiple first net model identifications corresponding to multiple first net segment models. In some of these embodiments, the method may further include the acts of determining an interconnect model for the vectored net by using at least the multiple first net model identifications; and annotating the first representation by at least abutting the multiple first net segment models and connecting the multiple first net segment models to the first port of the first model in place of the first vectored net.

In addition or in the alternative, the method may optionally include the acts of identifying a second block including a second port connected to the first port of the first block via a second end of the vectored net in the first representation; and identifying the second port of the second block with a second model identification of the second port in the second representation of the electronic design. Some embodiments may include the acts of updating the interconnect model for the vectored net by using at least the multiple second net model identifications; and annotating the first representation by at least abutting the multiple second net segment models and connecting the multiple second net segment models to the second port of the second model in place of the first vectored net.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4A illustrates a more detailed flow diagram for back annotating and visualizing parasitic models of electronic designs in some embodiments.

FIG. 4B illustrates another more detailed flow diagram for processing an annotated electronic design in some embodiments.

FIGS. 20B-H illustrate one or more portions of a simplified electronic design and various representations of the annotated one or more portions in some embodiments.

FIG. 23 illustrates application of techniques described herein for automatic identification of corresponding structures in a layout in response to the identification of one or more circuit component in a schematic design via probes in some embodiments.

DETAILED DESCRIPTION

Figure 1:
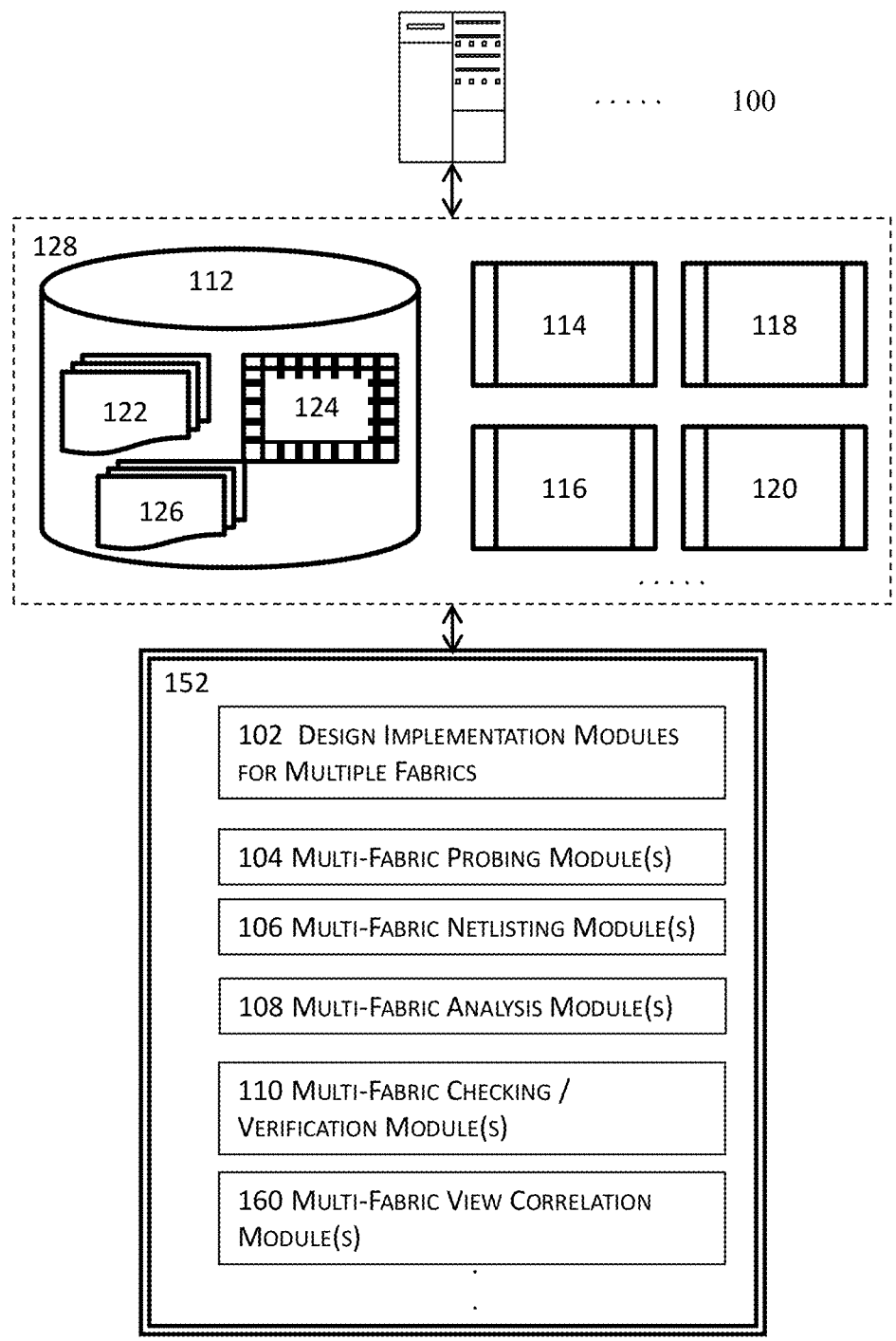
FIG. 1 illustrates a high level block diagram of a system for back annotating and visualizing parasitic models of electronic designs in some embodiments.

Various embodiments describe here build over certain tools including, for example, radio-frequency (RF) system design tools, analog or analog mixed-signal design tools or other similar or equivalent EDA (electronic design automation) tools capabilities to ensure completeness in parasitic, electrical, and/or performance information back-annotation capability for s-parameters and SPICE (simulation with integrated circuit emphasis) or SPICE-like models. These embodiments may work alone or in conjunction with IC (integrated circuit) design suites, PCB design suites, IC packaging design suites, or other similar or equivalent EDA tools integration flow that is planned to serve customers who need to co-analyze IC (integrated circuit) designs, IC packages, PCB designs, and/or test bench designs.

The parasitics may include, for example, one or more s-parameters or s-parameter models or one or more SPICE sub-circuits. The parasitics may be extracted or determined from an integrated circuit (IC) layout and/or a package layout. The electrical information and performance information may be determined from various analyses and/or simulations. A package layout is known to be three-dimensional or two-and-a-half dimensional in nature, and some of the geometries (e.g., IC bumps, bond-wires, package balls, vias, dense routing over large package geometries, etc.) in the package layout may be inductive with complex coupling effects.

Various embodiments described herein may import one or more models into a schematic design without removing the original graphic content of the schematic design. A model may include, for example, an s-parameter model, a SPICE (simulation program with integrated circuit emphasis) sub-circuit, an IBIS model, etc. Some embodiments described herein may import one or more models into a schematic design while maintaining the original connectivity. That is, these embodiments may import one or more models without disturbing the original connectivity of the schematic. Some embodiments may display a net or a portion thereof having annotated one or more complex models and parasitics from the IC layout or the package-IC layout and illustrate one or more locations of one or more ports of one or more models with graphical and/or textual emphasis (e.g., graphical highlighting, textual box, etc.)

Some embodiments identify one or more nets and one or more instances together for display in a user interface or extraction for subsequent uses. Some of these embodiments identify one or more nets and one or more instances across multiple hierarchies in one or more design domains (e.g., a schematic domain, a layout domain, etc.) or across multiple design fabrics (e.g., an IC design fabrics including, for example, the IC layout domain and the schematic domain, a package design fabric including, for example, the physical domain and schematic domain of the package design). Some of these embodiments also identify the parasitics of such one or more nets and one or more instances across multiple hierarchies in one or more design domains or across multiple design fabrics. A design fabric may include several design domains, and each domain may include one or more hierarchies or hierarchical levels.

For example, an IC design fabric may include the IC layout domain and the schematic domain. Depending upon whether the design is flat or hierarchical, each domain may further include one or more hierarchical levels. Depending upon a user's identification or what certain electronic design automation (EDA) tools need, some embodiments may identify the input (e.g., from a user or from an EDA tool), automatically traverse one or more nets across one or more hierarchies in one or more design fabrics, and present the entire net or a portion thereof with the annotation. Some embodiments may store the annotations and information about the inserted models as one or more profiles. Some of these embodiments may apply a profile to a master schematic to identify (if pre-existing) or generate (if non-existing) simulation results that may also be displayed on top of or in a separate display from the schematic design.

Some of these embodiments may further store or associate the simulation results with the corresponding one or more profiles to allow a user to, for example, view annotations, view model associations, view various circuit components with the model associations and/or annotations, probe a point or a portion of an electronic design, and/or display various simulation results, model associations, and/or annotations with graphical and/or textual emphasis. Some embodiments replace one or more instances or nets with the one or more corresponding models (e.g., an s-parameter model, a SPICE sub-circuit, etc.) and may change the model file that is associated with an instance with annotated parasitics.

Some embodiments account for layout parasitics including s-parameters of one or more SPICE sub-circuits during schematic or functional analyses or simulations of an electronic circuit comprising a radio-frequency design, an analog design, a mixed-signal design, or a combination thereof in order to capture more accurate electrical parasitics such as voltages and currents in the analysis or simulation results.

Some embodiments allow an easy way to annotate complex models (e.g., a model extracted from a schematic or a layout of an electronic design, an IBIS or Input output Buffer Information Specification model, a SPICE model, etc.) onto the corresponding schematic without tempering with the ability of the master schematic tools to access the corresponding schematic. Users may also view the annotation of complex models through probing these models that correlate various pins, pads, terminals, etc. of devices across multiple hierarchical levels (e.g., multiple hierarchical levels in a layout of an electronic design) in a single design fabric (e.g., the die fabric, the package design fabric, the printed circuit board or PCB design fabric, the test bench design fabric, etc.), across multiple design fabrics, or across multiple pages of the corresponding schematic.

In addition or in the alternative, pins, pads, or terminals of one or more devices may be selected or identified in a schematic, and some embodiments automatically select or identify the corresponding layout structures for extraction, manipulation, or visualization. Annotation on subnets of vectored bus of a model may also be presented or displayed. Various embodiments support automatic insertion of complex models (e.g., s-parameter models or SPICE sub-circuits) when a representation (e.g., a schematic) of an electronic design includes one or more vectored-pin symbols. Unlike conventional approaches, various embodiments may annotate instances, in addition to parasitic stitching. For example, some embodiments may extract nets and inductors together.

Some embodiments provide a user interface for the user to identify structures in a first representation (e.g., a schematic) and automatically select the corresponding structures in a second representation (e.g., layout) of an electronic design not only for visualization purposes but also for other purposes including extraction of one or more complex models. FIG. 23 illustrates application of techniques described herein for automatic identification of corresponding structures in a layout in response to the identification of one or more circuit component in a schematic design via probes in some embodiments. More specifically, FIG. 23 illustrates a portion of a user interface allowing users to select or identify devices (pins in this illustrated example) to drive the corresponding layout structures for solver extraction. More specifically, FIG. 23 illustrates that a user selects pins through one or more probes in a schematic design on the left-hand side of FIG. 23, and that the method or system automatically identifies the layout structures for solver extraction with respect to the nearest return path as illustrated in the right-hand side of FIG. 23.

Figure 22:
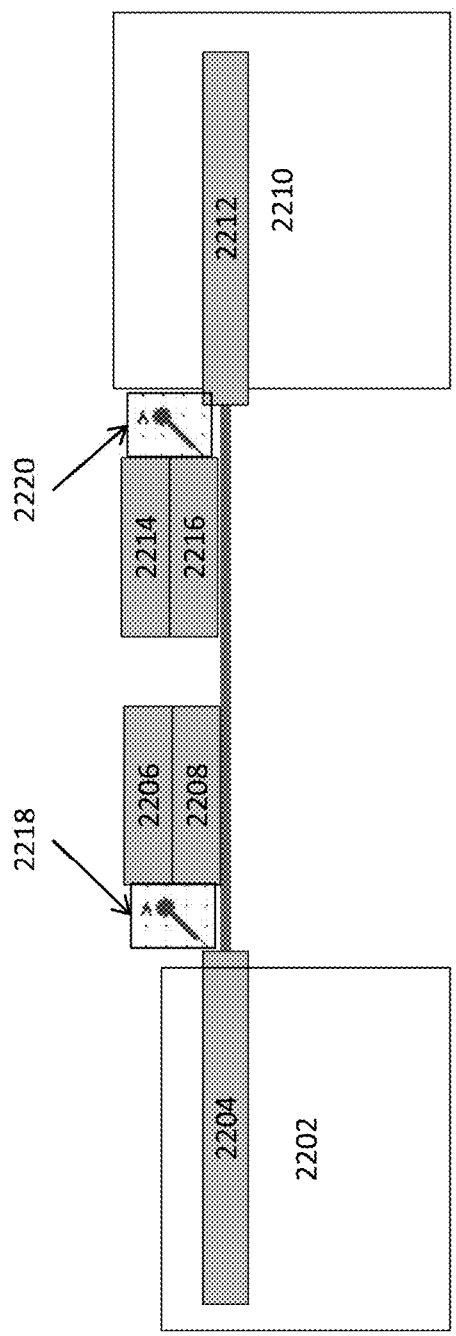
FIG. 22 illustrates application of techniques described herein to generate visualization or display of model annotations on vectored nets in a simplified electronic design in some embodiments.

In addition to annotating a representation of an electronic design with one or more complex models of vectored nets or information thereof, the method or system may also prepare and present a visual representation of the annotation of the one or more complex models in some embodiments. FIG. 22 illustrates application of techniques described herein to generate visualization or display of model annotations on vectored nets in a simplified electronic design in some embodiments. More specifically, FIG. 22 illustrates an example of such visual representation of a portion of a simplified representation of an electronic design where the portion of the simplified representation includes a portion of a schematic of an electronic design. The method or system may probe the schematic to identify the pin numbers where the extraction has occurred and may perform model assignment on net<1> and net<0> but not on net<2> in this illustrated example having the net "net<2:0>" interconnecting two circuit blocks 2202 and 2210. In addition or in the alternative, the ordering of bits on probes reflects the corresponding end to end points of nets. The method or system may also include a user interface to allow a user to select (e.g., by clicking on a probe with a pointing device or by specifying the probe via textual input) to display the annotation via pop-up windows, bubbles, or tool-tips.

One of the advantages of some embodiments described herein is to import complex s-parameter model, an IBIS model, and/or a SPICE model into the schematic without removing the original content of the schematic. For example, the original graphics and net connectivity in the schematic may be maintained, even with the importation of one or more complex models into the schematic.

Figure 20A:
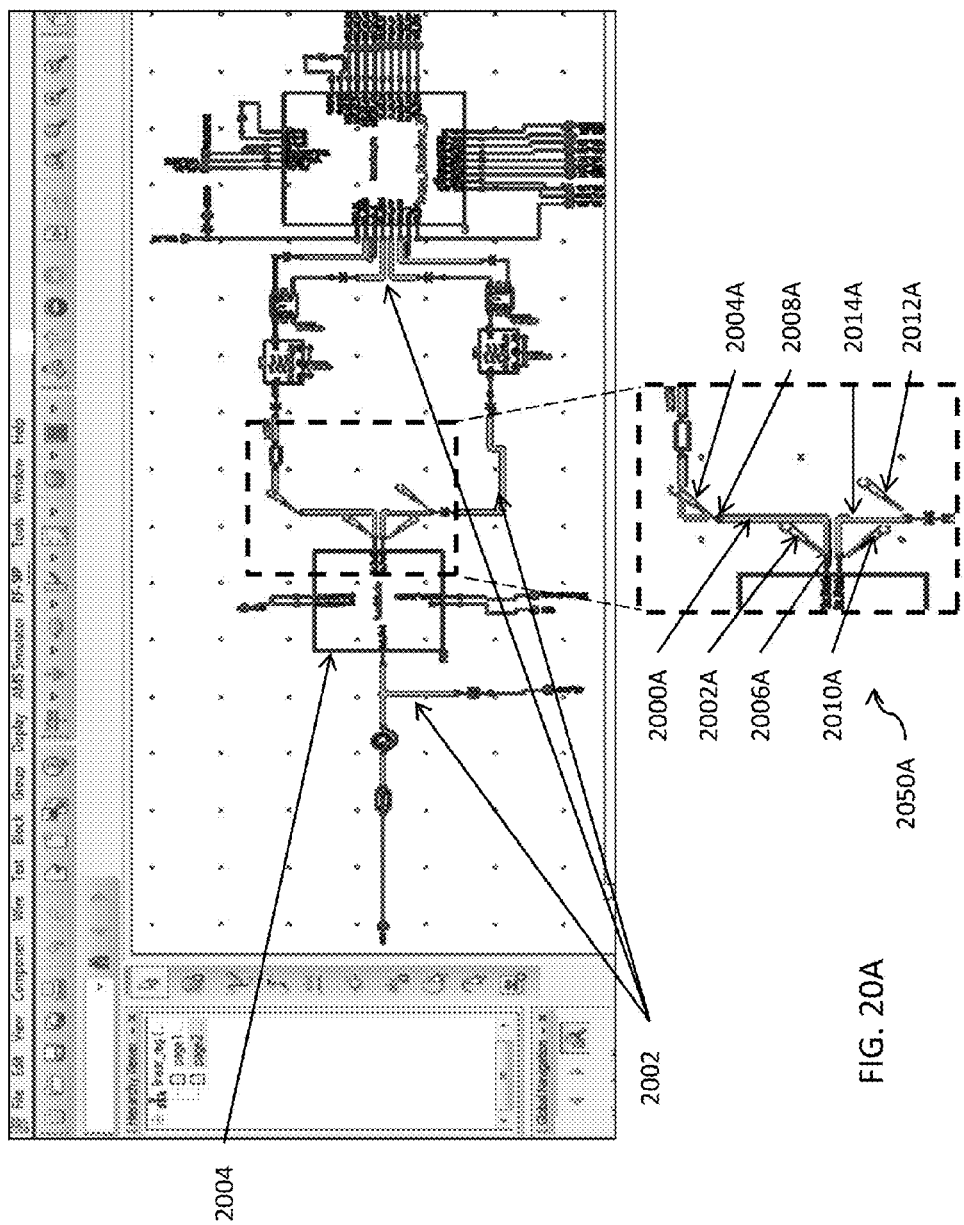
FIG. 20A illustrates application of techniques described herein to generate visualization or display of ports of parasitic models that correspond to extracted nets in a simplified electronic design in some embodiments.

Another advantage of some embodiments described herein is to visualize nets that have parasitics (e.g., currents, voltages, inductances, resistances, capacitors, inductors, etc.) annotated with textual and/or graphical indications illustrating where model-ports exist as illustrated in FIG. 20A that shows the visualization of ports of parasitic models corresponding to the extracted nets.

FIG. 20A illustrates application of techniques described herein to generate visualization or display of ports of parasitic models that correspond to extracted nets in a simplified electronic design in some embodiments. More specifically, FIG. 20A illustrates a schematic representation of a portion of an annotated electronic design according to some embodiments described herein. FIG. 20A illustrates that the annotated electronic design includes four probes, markers, or indicators (collectively "probe" for singular or "probes" for plural) 2002A, 2004A, 2010A, and 2012A as well as some net segments 2002 that are associated with the at least the aforementioned four probes.

It shall be noted that FIG. 20A may include one or more additional probes than what is illustrated, and that these one or more additional probes are omitted for the ease of explanation and illustration. These four illustrated probes illustrated in FIG. 20A may belong to one or more groups. In some embodiments where these four illustrated probes belong to the same group, the circuit components (e.g., one or more devices, one or more net segments, or a combination thereof) associated with these illustrated probes indicates that these associated circuit components are extracted together to form one single model (e.g., a complex model as described herein).

For example, the method or system may extract, for example, the corresponding parasitic information, connectivity information (e.g., pin numbers), simulation results, timing information, and/or layout structures for the net segments 2002 and 2000A, one or more devices (e.g., 2004, etc.) from the layout to generate a single model for annotating the electronic design with the single model in some embodiments illustrated in FIG. 20A. A net segment with a probe on each end of the net segment indicates that the method or system has annotated the electronic design by using a model for the net segment in the electronic design. For example, net segment 2000A has the probe 2004A on one end and the probe 2002A on the other end, and the appearance of these two probes for net segment 2000A indicates that the method or system has annotated the electronic design by using a model, which includes a model in the single, extracted model described above, for this net segment.

In these embodiments, the method or system may further present the extracted information described above in the same or different display area of a user interface. For example, the method or system may present the voltage values at either end node of the net segment 2000A, the current through net segment 2000A, the resistance, or any other electrical, parasitic, performance, or design related information associated with net segment 2002A and use the probes to indicate the availability of such information without cluttering the electronic design.

In some embodiments, the method or system may annotate an electronic design without altering the appearance of the original electronic design at all. For example, the annotated electronic design illustrated in FIG. 20A differs from the original electronic design in its inclusion of the probes 2002A, 2004A, 2010A, and 2012A. These probes are inserted either by the user to indicate the nodes or circuit component (e.g., a net segment or a device) of interest or by the system automatically in response to a user's indication of interest in obtaining additional information (e.g., parasitic, electrical, performance, or timing information, simulation or analysis results, etc.) or to perform further operations on the annotated electronic design (e.g., perform various analyses or simulations with the additional information from annotation) in some embodiments. Nevertheless, the method or system may perform the same functions with full and equal effects without displaying the probes at all in some embodiments. In these embodiments, the method or system may thus annotate an electronic design to include any additional information from other domain(s), design fabric(s), or analyses without altering the appearance of the electronic design to the users.

FIGS. 20B-H illustrate one or more portions of a simplified electronic design and various representations of the annotated one or more portions in some embodiments. In some embodiments, the method or system may represent net segment 2000A as shown in FIG. 20B that illustrates the insertion of a model 2002B for net segment 2000A along the net segment and breaks down the original net segment 2000A into two smaller net segments 2004B and 2006B. The model 2002B may include, for example, a complex model such as an s-parameter model or a SPICE sub-circuit. In some embodiments, the smaller net segment 2004B may have or be associated with the same net identification as net segment 2000A of FIG. 20A.

This representation illustrated in FIG. 20B may also include the probes 2008B and 2010B that perform identical or substantially similar functions or serve identical or substantially similar purposes as described above with reference to FIG. 20A. In some embodiments, the method or system may use the representation illustrated in FIG. 20B internally for various EDA tools to use in performing various operations. Similarly, FIG. 20C illustrates a portion of a simplified electronic design including a net 2002C. The method or system may annotate the electronic design or a portion thereof according to the techniques described herein. The annotated portion of the electronic design may be presented as shown in FIG. 20C including the probes 2004C, 2006C, and 2008C indicating the availability of additional information for the net 2002C.

The method or system may also represent the portion of the simplified electronic design with the representation illustrated in FIG. 20D internally to one or more EDA tools. In FIG. 2D, the method or system may insert a model (e.g., a complex model) for net 2002C in FIG. 20C. In addition, the method may annotate the portion of the electronic design by dividing net 2002C into net 2002D, net 2002D-1, and net 2002D-2 each having its own net identification by using some of the techniques described herein. In addition or in the alternative, the method or system may optionally include the probes 2004C, 2006C, and 2008C in the annotated portion illustrated in FIG. 20D. In the alternative, the method or system may also present the representation illustrated in FIG. 20D to the user in some other embodiments.

FIG. 20E illustrates an annotated portion of a simplified electronic design in some embodiments. FIG. 20E may represent the annotated portion that the method or system internally uses for other processes or operations and/or a visual representation of the annotated portion to users. More specifically, the portion in FIG. 20E includes two nets 2002E and 2010E interconnecting their respective circuit components. FIG. 20E further illustrates two groups of probes that are illustrated with different line types for distinction. The first group of probes includes 2004E, 2008E, and 2006E represented with the solid line type, and the second group of probes includes 2012E and 2014E represented with the dashed line type.

The inclusion of these two groups in the annotated portion indicates that this annotated portion includes at least two single models—the first model 2030 being extracted and generated for the circuit components (e.g., net segments and one or more circuit devices) with respect to probes 2004E, 2006E, and 2008E, and the second model 2040E being extracted and generated for the circuit components with respect to probes 2012E and 2014E. Different sets of probes, if shown in an annotated electronic design, may further be distinguished with other textual and/or graphical emphasis. In some embodiments, the same annotated portion of the simplified electronic design may be presented by the representation illustrated in FIG. 20F with the optional inclusion of one or both sets of probes to provide visual hints of the availability of additional information and/or the insertion of one or more models (two models in the embodiments illustrated in FIG. 20F).

Figure 20G:
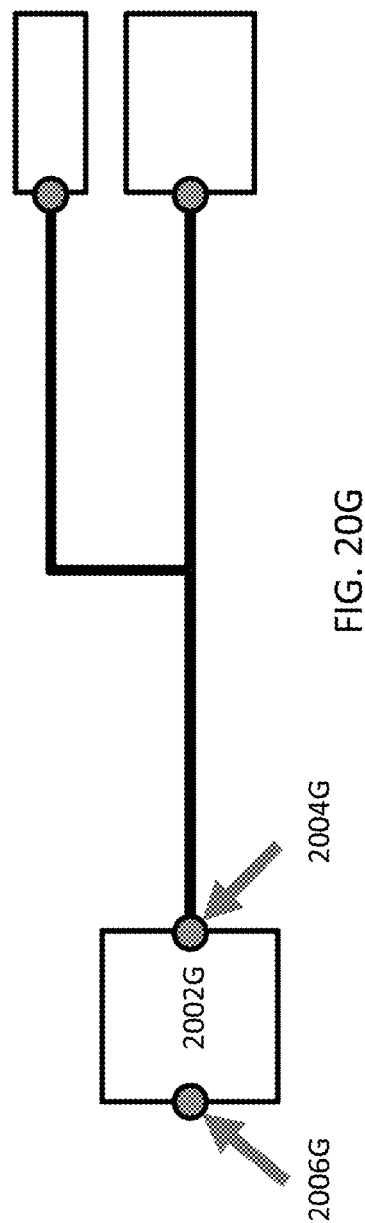

The method or system may annotate an electronic design not only with models for the nets or segments thereof but also models for the devices. FIG. 20G illustrates those embodiments where the method or system may annotate an at least a portion of an electronic design with a model of a device. For example, the method or system may extract, for example, the parasitics of an inductor from a layout, generate a model for the inductor with the extracted information, and annotate the portion of the electronic design in another domain or design fabric with the model 2002G of the inductor. In some of these embodiments, the method or system may also display one or more probes (2004G and/or 2006G) to provide a visual hint to users that additional information is available for the inductor.

Figure 20H:
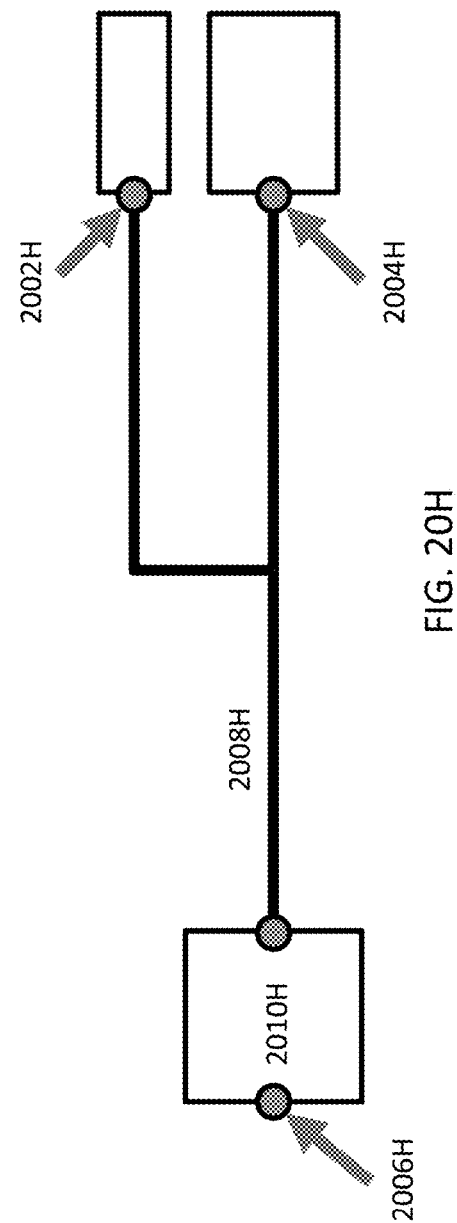

In some embodiments where the portion of electronic design is annotated as shown in FIG. 20G, the model is generated by extracting the parasitic information (and/or other related information or data as described above) for the inductor alone. FIG. 20H illustrates a representation of the annotated portion of the electronic design similar to that of the representation illustrated in FIG. 20G. More specifically, the representation in FIG. 20H includes three probes 2002H, 2004H, and 2006H that indicate the circuit components including the net 208H and the inductor 210H. The probes 2002H, 2004H, and 2006H indicate the availability of addition information for both the net segments and the inductor.

In various embodiments, the annotated electronic design provides the users with the capabilities of probing the annotated electronic design. For example, a user may probe the voltage on the net, and the method or system may identify the voltage value(s) (e.g., voltage values at various nodes along the net) associated with the probed net. In some embodiments where the requested information is not available or the circuit component being probed is not annotated with a model as described above in response to probing, the method or system may on the fly generate the model, insert the model into the electronic design, interconnect the model with the corresponding circuit component(s), perform necessary analyses or simulations, and/or generate or identify the requested information in response to the probing.

In some embodiments where voltage information is desired in response to a probe associated with or on a net, the method or system may automatically insert one or more numbers of probes at various locations along the net that is being probed. For example, the method or system may automatically insert probes at some or all the nodes along the net or at one or more fixed distances. A user may also probe a node, a pin, a terminal, a pad, or a port to obtain current information. In some embodiments, the method or system may automatically save the information for the one or more models, one or more probes, and the corresponding information in response to the one or more probes, and other information or parameter (e.g., whether or not probes are to be displayed, how the requested information is to be displayed, etc.) in a simulation profile which, when applied to an electronic design, provides the requested or desired view(s) and/or information in one or more display areas in a user interface.

Figure 21:
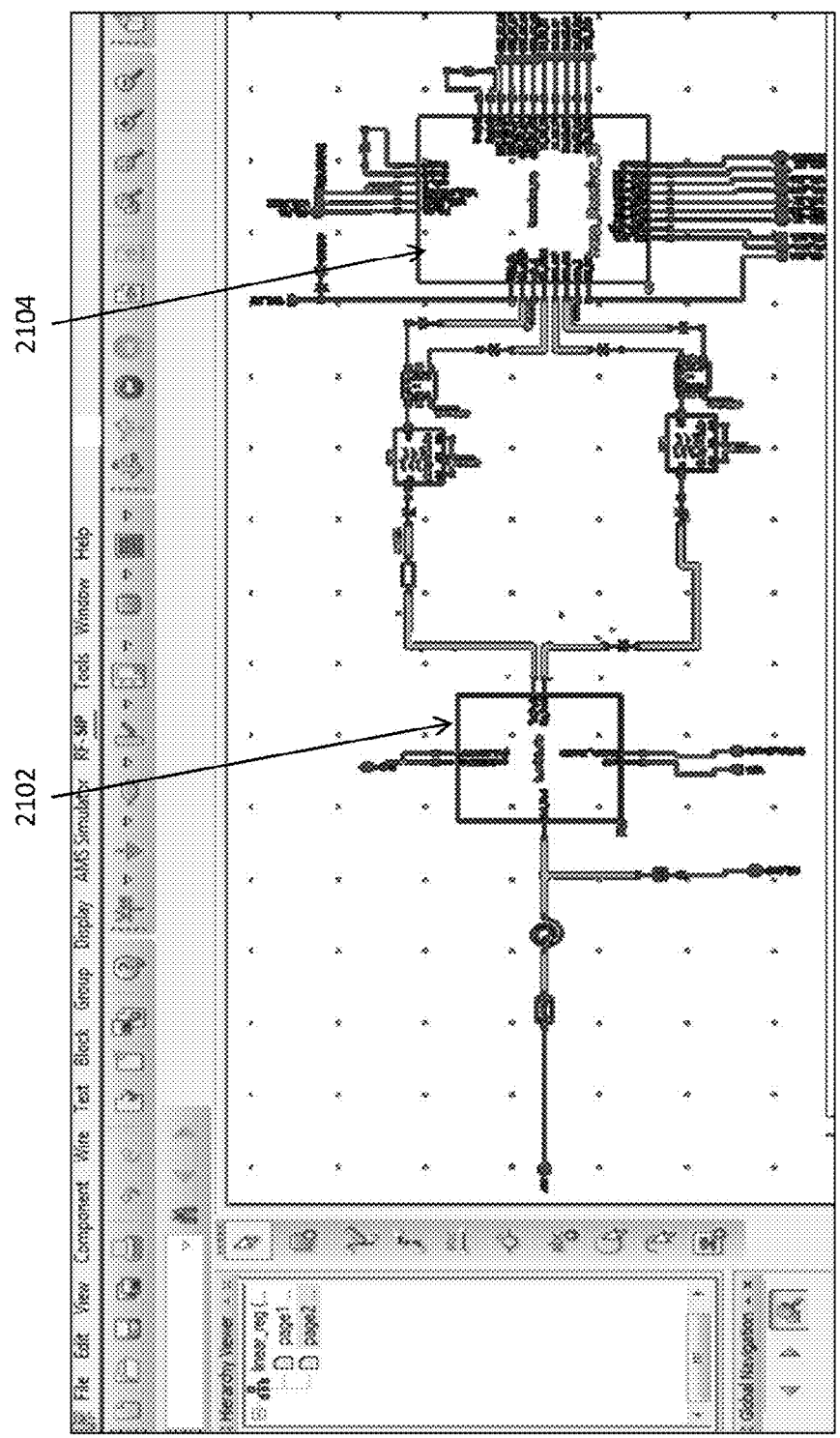
FIG. 21 illustrates application of techniques described herein to generate visualization or display of ports of parasitic models that correspond to a group of nets and instances in a simplified electronic design in some embodiments.

One of the advantages of some embodiments described herein is to visualize one or more nets and/or instances that are treated or considered as a group for model extraction. FIG. 21 illustrates application of techniques described herein to generate visualization or display of ports of parasitic models that correspond to a group of nets and instances in a simplified electronic design in some embodiments. More specifically, FIG. 21 illustrates the visualization of ports of a parasitic model corresponding to a group of nets and instances in some embodiments. In some of these embodiments, nets may be extracted on a net-by-net basis. Some of these embodiments extract a net even when the net traverses across multiple hierarchical levels (e.g., multiple hierarchical levels in a layout of an electronic design) in a single design fabric (e.g., the die fabric, the package design fabric, the printed circuit board or PCB design fabric, the test bench design fabric, etc.) or across multiple design fabrics. Another advantage of some embodiments described herein is to visualize parasitic nets and/or instances across multiple design hierarchies (e.g., multiple hierarchical levels in a layout of an electronic design) in a design fabric (e.g., the die fabric, the package design fabric, the printed circuit board or PCB design fabric, the test bench design fabric, etc.), across multiple design fabrics, and across multiple pages of a schematic of an electronic design.

Another advantage of some embodiments described herein is to view all or some of parasitic groups in one run in one or more textual and/or graphical display areas that may be linked and cross-referenced such any manipulation (e.g., highlighting or otherwise emphasizing, probing, netlisting, simulating, analyzing, etc.) of one of the parasitic or parasitic groups result in the corresponding manipulations in the remaining display areas showing the corresponding parasitic or parasitic group. FIG. 21 illustrates the visualization of all annotated models in one run with different annotated models identified by different colored probes.

Another advantage of some embodiments described herein to store the model-annotation data or information as one or more simulation profiles which, when applied to the master schematic, provides visualization of various model-ports. A simulation profile may point to a scratch netlist and/or schematic that comprises the nets that are immediately adjacent to one or more appropriately inserted models. Some embodiments store the annotated design representation as well as some or all of the instance selection after model annotation as one or more simulation profiles. These one or more simulation profile may point to or be linked with a scratch or temporary netlist or schematic (e.g., a copy of the netlist or schematic stored in the random access memory of a computing system) that includes the pertinent nets abutted with one or more models that have been appropriately inserted with the techniques described herein.

The method or system may further apply the profile on the master design, rather than the temporary or scratch representation of the master design. When applying a simulation profile to the master design, the non-selected components, instances, nets, etc. may be de-emphasized (e.g., being represented with dimmed or less contrasting graphical representation) in the graphical display area of the user interface. The probe points for some or all of the model annotations may be emphasized (e.g., being represented with highlighted or more contrasting graphical representation).

The method or system may also provide one or more probes that allow users to probe voltages on either side of a net in the user interface or to probe a pin for its voltage level. In these embodiments, a user may probe a pin to acquire both the current and voltage values, rather than just the current value at the pin. The method or system may also define and provide one or more probes for a common group that spread across multiple hierarchical levels (e.g., multiple hierarchical levels in a layout of an electronic design) in a single design fabric (e.g., the die fabric, the package design fabric, the printed circuit board or PCB design fabric, the test bench design fabric, etc.), across multiple design fabrics, or across multiple pages of the corresponding representation (e.g., schematic) of an electronic design. In addition or in the alternative, the method or system may identify a user's identification of a probe (e.g., by receiving a user's clicking on a probe) of a group of probes and automatically show the associated model file that may be modified and automatically save the corresponding one or more simulation profiles.

Another advantage of some embodiments described herein is to replace a group of instances and/or nets in an electronic design with corresponding one or more models comprising one or more complex models, one or more extracted models described herein, or any combinations thereof.

Another advantage of some embodiments described herein is to modify a model file associated with a parasitic instance or a parasitic group.

Another advantage of some embodiments described herein is to drive selection of one or more nets and/or instances from a schematic to drive corresponding solver-extraction of traces, wires, or interconnects and footprints thereof at the layout stage.

Some embodiments map schematic nets to model ports. The mapping of nets to ports may be stored as one or more constraint views. The symbol for model should pre-exist. Scratch schematic is created that has the model-symbol inserted after abutment of nets; this view is used for netlisting. In some embodiments, the method or system may insert a model for vectored nets in a schematic netlist. In these embodiments, the model extracted from the layout for nets that appear as vectored buses in the schematic may need abutment of the entire bus followed by the insertion of parasitic models for the extracted nets and the insertion of shorts for nets where the layout was not extracted. Some embodiments automatically insert models when a schematic includes one or more vectored-pin symbols. Some embodiments may also extract one or more nets that are common between two or more models.

Some embodiments generate model annotation for one or more instances. Some of these embodiments generate model annotation for one or more instances without parasitic stitching for nets. For example, when nets and inductor are extracted together from a layout into an extracted model, these embodiments may annotate such a model on the schematic. Some embodiments perform model annotation without extracting or having to extract a model or one or more parameter values thereof (e.g., RC values) from an electronic design (e.g., an extracted view of a layout) and then stitching or inserting the extracted one or more values into another version of the electronic design (e.g., a schematic design corresponding to the layout). These embodiments account for the insertion of one or more complex models (e.g., s-parameter models or SPICE sub-circuits) that are extracted out of multiple coupled nets. Some of these embodiments may selectively probe any part of an electronic design across multiple design hierarchies (e.g., multiple hierarchical levels in a layout of an electronic design) in a design fabric (e.g., the die fabric, the package design fabric, the printed circuit board or PCB design fabric, the test bench design fabric, etc.) or across multiple design fabrics and thus may selectively perform what-if analyses without performing or having to performing multiple simulation trial runs and without modifying model association. Some embodiments modify the model association without modifying a complete cell view of an inserted symbol for the corresponding sub-circuit. Various embodiments annotate complex models (e.g., models extracted from a layout) onto the corresponding schematics while maintain the readability of the schematics, without comprising the readability of the schematic or the ability of any existing schematic tools. The annotation results may be stored as simulation profiles to create multiple versions of the same electronic design.

Some embodiments simulate a schematic in the context of extracted parasitics that include one or more s-parameters of one or more SPICE sub-circuits of the corresponding electronic design (e.g., the layout corresponding to the schematic). Some of these embodiments extract models from one or more nets in a layout of an electronic design where these one or more nets comprise at least one vectored bus and insert the corresponding parasitic models for the one or more nets. Some of these embodiments further insert one or more shorts for nets where the layout is not extracted. In annotating models for vectored signals, some of these embodiments may first create a simulation schematic view as illustrated in FIGS. 1-2.

In one or more embodiments, FIG. 1 shows an illustrative high level schematic block diagram for enhancing manufacturability of electronic designs for multi-exposure lithography and may comprise one or more computing systems 100, such as a general purpose computer described in the System Architecture Overview section to implement one or more special proposes. In some embodiments, the one or more computing systems 100 may invoke various system resources such as the processor(s) or processor core(s), memory, disks, etc. The one or more computing systems 100 may also initiate or interact with other computing systems to access various resources 128 that may comprise a floorplanner, a global routing engine, and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), electronic circuit design specification database(s), various statistics, various data, rule decks, various design rules, constraints, etc. (122), or other information or data (126) that may be used to facilitate the performance of various functions to achieve the intended purposes.

In some embodiments, the one or more computing systems 100 may, either directly or indirectly through various resources 128 invoke various software, hardware modules or combinations thereof in a multi-fabric design environment 152 that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics, one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules to correlate various symbolic views, schematic views, and/or layout views with the schematic design data or the layout data in different design fabrics at various hierarchical levels, etc. In some embodiments, a symbolic view may be stored or linked together with a schematic view or layout view of a circuit component, block, or cell.

Figure 2:
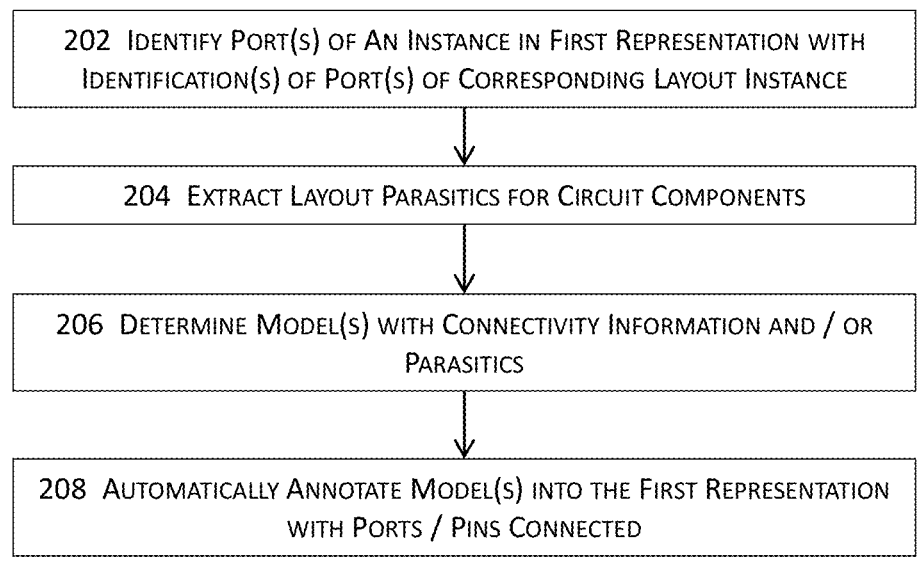
FIG. 2 illustrates a top level flow diagram of back annotating and visualizing parasitic models of electronic designs in some embodiments.

FIG. 2 illustrates a top level flow diagram for back annotating and visualizing parasitic models of electronic designs in some embodiments. In these embodiments illustrated in FIG. 2, the method or system may identify one or more ports, pads, pins, bus(es), terminals (collectively ports for plural or port for singular) of an instance (e.g., a symbol model instance) in a first representation of an electronic design with the corresponding identifications of the one or more ports in a corresponding instance in a second representation at 202. For example, the method or system may update the ports of a schematic instance of a cell or block in the schematic of an electronic design with the port names of the corresponding layout instance of the same cell in the layout of the electronic design by associating the port names with the corresponding ports in the schematic or by storing the port names in the corresponding ports. By updating the ports of a cell or block in the first representation with the identifications of the corresponding ports of the cell or block in the second representation and use these identifications in various processes, the method or system may replace any circuit component with any model (e.g., a complex model described herein) in any representation of any design fabric while ensuring that the model replacing the circuit component is properly inserted and connected as intended or designed. At 204, the method or system may optionally extract parasitics of one or more circuit components related to the instance from a layout of the electronic design. In some of these illustrated embodiments, a circuit component may include an interconnect or a passive structure or component. A passive structure or component may include a circuit component that consumes but does not produce energy or a component that does not increase the power or amplitude of a signal from the input to the output of the circuit component by introducing energy from some power supply source to the signal. At 206, the method or system may determine, by identifying (if already existing), generating (if non-existing), or modifying, one or more models (e.g., complex models described herein) with connectivity information and/or the extracted parasitics. For example, the method or system may add various port identifications of corresponding layout ports to the ports of a schematic block or the pertinent parasitics to the schematic block. For example, FIG. 20A illustrate application of techniques described herein to generate visualization or display of ports of parasitic models that correspond to extracted nets in a simplified electronic design in some embodiments. More specifically, FIG. 20A illustrates a schematic representation of a portion of an electronic design where a user or an EDA tool has identified or selected some net segments 2002. Reference numeral 2050A illustrates the annotation or stitching of parasitics in a portion of FIG. 20A where a resistor 2006A and a capacitor 2004A are annotated along the net segment 2002A the electronic design. The annotated parasitics may also be associated with their respective parasitic values in some embodiments. In some embodiments, the connectivity information may include, for example, one or more reference designators of the one or more models or circuit components thereof, one or more port numbers or names for the one or more ports in the one or more models, or one or more identifications (e.g., names) of one or more nets to be connected to the one or more models in the electronic design.

At 208, the method or system may annotate the first representation by at least automatically inserting the one or more models into the first representation of the electronic design and automatically connecting, depending at least in part upon whether the first representation is complete at least in the areas of the insertion of these one or more models, at least some of the ports of the one or more models to the corresponding circuit components (e.g., nets or other circuit components) in the first representation. In some embodiments, the method or system use the port identifications that have been added to or associated with these at least some of the ports of the one or more models to properly connect these one or more ports to the correct circuit components or nets. In these embodiments, the method or system may not only annotate a representation of an electronic design with parasitic information from the corresponding layout but also automatically insert and connect a complex model to replace a corresponding block of one or more circuit components in the representation. With the described annotation techniques including model association (e.g., with port identifications), model insertion, model connection, parasitic annotation, the method or system does not require the circuit components in the first representation or the layout to be connected. Moreover, the method or system not only performs all the described techniques with full and equal effects to both individual circuit components and blocks of circuit components (e.g., an instance of a cell or a block) but also does not require any model to include separate nets. Instead, a net may be shared or common between two or more models, and the method or system may perform the techniques described herein with full and equal effects for such a shared or common net. In addition, the method or system may modify model association independently of and separately from the remainder of or at least a portion of the electronic design beyond the model without having to modify or modifying an entire cell view having the inserted model.

Figure 3:
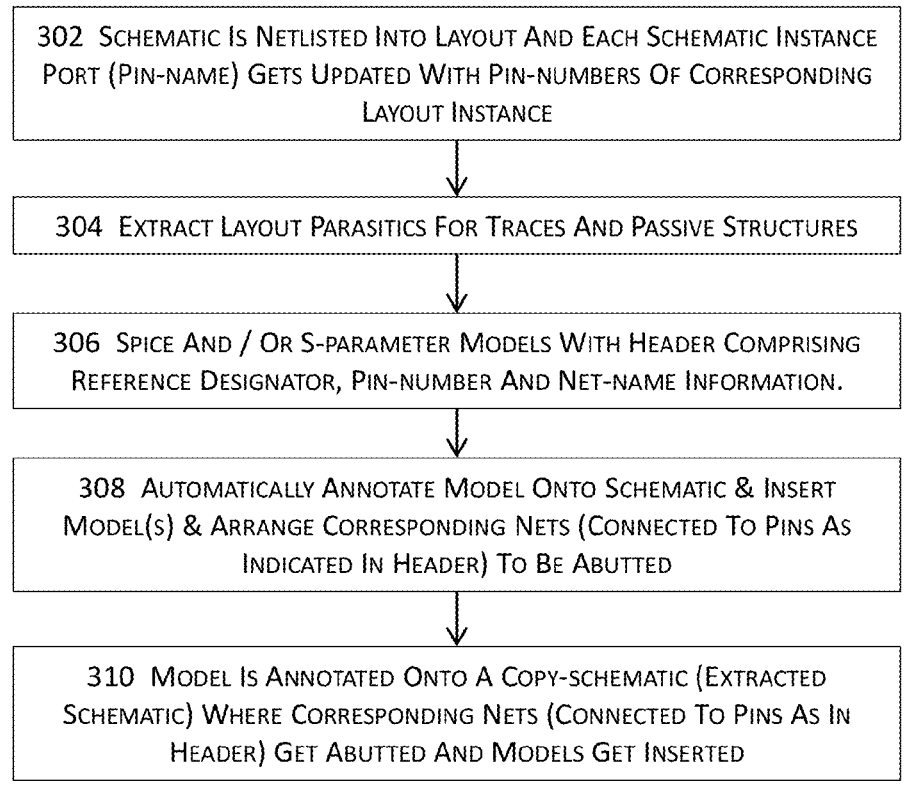
FIGS. 3 and 3A jointly illustrate a more detailed flow diagram for back annotating and visualizing parasitic models of electronic designs in some embodiments.
Figure 3A:
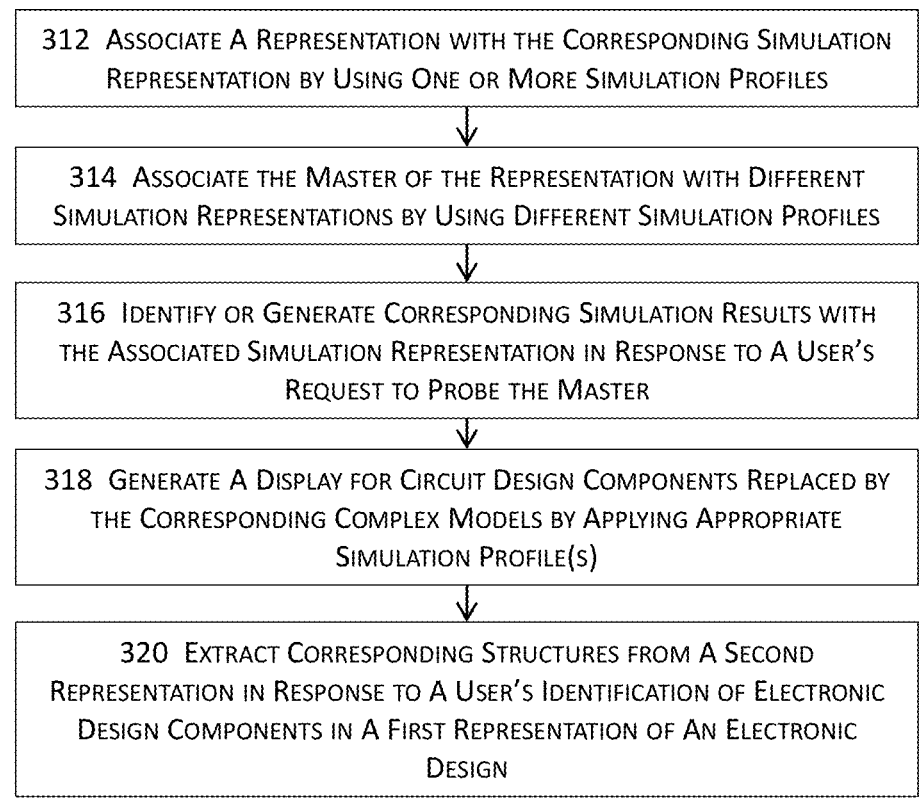

FIGS. 3 and 3A jointly illustrate a more detailed flow diagram for back annotating and visualizing parasitic models of electronic designs in some embodiments. In these embodiments, the method or system may netlist a first representation of the electronic design into a second representation of the electronic design at 302. In some of these embodiments, the first representation may comprise a schematic representation of the electronic design in a first design fabric. In some of these embodiments, the second representation may comprise a layout of the electronic design in the first design fabric or a second design fabric. In some embodiments, the method or system may netlist a schematic into a layout, and each schematic instance port having a pin_name parameter may be updated with the corresponding pin_number of the corresponding layout instance. With the techniques described herein. In these embodiments, the method or system may perform various techniques described herein across multiple design fabrics. In some embodiments where the method or system in a first EDA tool for a first design fabric desires or requires design data in a second design fabric, the method or system automatically invokes a second EDA tool from the first EDA tool and issues a request to the second EDA tool to access the desired or required design data, which are native to the second EDA tool but not the first EDA tool, in the second design fabric At 304, the method or system may extract parasitics for circuit components including, for example, wires, routes, interconnects, or traces (collectively interconnects) and/or passive structures from the second representation. Design fabrics may include the IC design fabric, the package design fabric, the PCB (printed circuit board) design fabric, or a test bench design fabric. The IC design fabric may include design data for an integrated circuit at one or more hierarchical levels. The package design fabric may include the design data for the package of an integrated circuit at one or more hierarchical levels but not the design data for the integrated circuit, where the EDA tools for the package design fabric have no access to the IC design data, and the integrated circuit may be represented as a symbol associated with certain information (e.g., connectivity information, identifications of pins, ports, terminals, pads, etc.). The PCB design fabric may include the design data for the printed circuit board housing one or more IC packages at one or more hierarchical levels but not the design data for the one or more IC packages or the corresponding integrated circuits in the one or more IC packages, where the EDA tools for the PCB design fabric have no access to the IC package design data or the IC design data, and the one or more IC packages may be represented as one or more symbols associated with certain information (e.g., connectivity information, identifications of pins, ports, terminals, pads, etc.). The test bench design fabric may include the design data for the test bench housing one or more printed circuit boards at one or more hierarchical levels but not the design data for the one or more printed circuit boards, the IC packages, or the corresponding integrated circuits in the IC packages, where the EDA tools for the test bench design fabric have no access to the PCB design data, and the one or more printed circuit boards may be represented as one or more symbols associated with certain information (e.g., connectivity information, identifications of pins, ports, terminals, pads, etc.). In some embodiments, at least some of the EDA tools for the test bench design may also be shared with the IC design fabric such that these EDA tools may access both the IC design data and the test bench design data.

At 306, the method or system may identify or generate one or more models. In some of these embodiments, a model may include a complex model that further comprises connectivity information for the model. For example, a complex model may include a header comprising a reference designator for the complex model, one or more pin numbers, and/or information about the corresponding names of one or more nets in the complex model. In some of these embodiments, these one or more complex models may convey the information that stitching or annotation may need to be done in the schematic representation of the electronic design. In some of these embodiments, a complex model may include an S-parameter model, a SPICE sub-circuit model, or an IBIS (input output buffer information specification) model, etc.

At 308, the method or system may automatically annotate or stitch a complex model onto the first representation of the electronic design. Annotation or stitching a model into a representation of an electronic design includes the act of automatically inserting the model into the representation and the act of automatically connecting the model with the appropriate circuit components in the representation. In some embodiments, the method or system may netlist a schematic into a layout, and each schematic port instance having a pin_name parameter may be updated with the corresponding pin_number of the corresponding layout instance. With the techniques described herein. For example, the method or system may automatically annotate an S-parameter model onto the schematic representation of the electronic design in some embodiments. In some of these embodiments, one or more nets may be abutted or connected to the corresponding bus(es), port(s), pin(s), terminal(s), or pad(s) of the model for both vectored and non-vectored or scalar nets.

At 310, the method or system may annotate a complex model or information thereof onto a copy of the first representation of the electronic design. In these embodiments, the corresponding one or more nets may be abutted or connected to the corresponding pins as indicated in the respective headers of these corresponding pins of the inserted complex model. In some embodiments, the method or system operates on a copy of a representation of an electronic design so as to preserve the original representation of the electronic design. In some of these embodiments, the copy may be referred to as a simulation representation view of the corresponding electronic design. Some embodiments may further link a copy with the master representation such that the method or system may visualize, probe, netlist, simulate, analyze, or otherwise manipulate the copy being annotated with one or more complex models.

At 312 of FIG. 3A, the method or system may associate a representation with the corresponding simulation representation by using one or more simulation profiles. A simulation profile may include the selection or identification of electronic design components (e.g., nets) for determining results or other design related information from subsequent simulations or analyses. The selection or identification of electronic design components may be made by a user or by one or more EDA tools during their performance of certain tasks that desire or require the selection of electronic design components. A representation may include either the master or a scratch copy of a schematic of the corresponding electronic design in some embodiments.

At 314, the method or system may associate the master representation of an electronic design with multiple simulation representations by using one or more simulation profiles for each of these multiple simulation representations. As presented above, a simulation profile may also include user's selection or identification of electronic design components (e.g., nets) in which the user is interested in obtaining simulation results or other design related information. Therefore, the user may create multiple versions of simulation representations for the same master, and each of these simulation representations may be simulated or analyzed with the corresponding simulation profile to obtain different results. An advantage of this approach is to enable designers to perform various what-if analyses while working with and preserving the master.

At 316, the method or system may identify (if already existing) or generate (if non-existing) the corresponding simulation results with the associated simulation representation and the respective simulation profile in response to a request to, for example, probe the master representation. Probing a representation may provide, for example, visualization of various pieces of design information including connectivity, the net segments included in or connected to the probed circuit component, electrical characteristics (e.g., voltages, currents, etc.), parasitics (e.g., capacitances, resistances, inductances, etc.), or other characteristics (e.g., timing information, delay information, etc.) For example, a user may issue a request to probe a net or a portion thereof that starts from, for example, a power rail at the test bench level through the printed circuit board, into an IC packaging, and ends at a location within an integrated circuit design. The first EDA tool (e.g., an IC schematic design tool) may identify or instantiate the second EDA tool instance (e.g., a printed circuit board design tool) in response to an input to probe the aforementioned net because probing the net needs to cross the interface of the printed circuit board to continue the probing for the net. The identification or selection of electronic design components may be stored in or associated with the respective simulation profile. Therefore, upon receiving the identification or selection of electronic design components for probing, the method or system may identify one or more simulation profiles that include or are associated with the identified or selected electronic design components and retrieve (if existing) or generate (if non-existing) the corresponding simulation results to fulfill the request for probing the master.

At 318, the method or system may generate a display for one or more circuit design components and present a graphical, textual, or both graphical and textual display of the one or more corresponding complex models, which have been inserted into and have replaced the corresponding one or more circuit design components the electronic design, by applying the appropriate one or more simulation profiles.

The display including these one or more corresponding complex models may be presented along with or in place of the one or more circuit design components in a user interface in some embodiments. In other words, the display may be overlaid in the original representation or in a separate display, with the one or more complex models properly inserted and connected to the remainder of the electronic design in these embodiments.

For example, the method or system may modify the original representation or view of an annotated electronic design by inserting one or more models into the original electronic design. For example, the method or system may insert an s-parameter model along a net to represent the parasitic information of the net, where the s-parameter may be extracted from, for example, the corresponding layout of the electronic design. It shall be noted that the terms "representation" and "view" may be used interchangeably and include a visualization of at least a portion of an electronic design or related data or information thereof. In some embodiments, the method or system may generate such an annotated electronic design as an internal representation that may be referenced by various EDA tools when performing various operations (e.g., probing, simulations, displaying, or any other operations) on the electronic design.

As another example, the method or system may generate the annotated representation of the electronic design in such a way that the annotated representation appears to be nearly identical to the original representation of the electronic design with the only exception that the annotation of the electronic design includes one or more graphical, textual, or both textual and graphical indicators (e.g., one or more probe symbols) of the inclusion of one or more extracted models in the electronic design. In these embodiments, the appearance of the one or more indicators provides a hint that additional information is available at or between the one or more indicators. In some embodiments, the method or system may even maintain the annotated representation of the annotated electronic design to be identical to that of the original representation of the electronic design prior to annotation.

In these embodiments, the annotated electronic design appears to be identical to the original representation while providing all the capabilities and functionalities of any other annotated electronic designs described herein. For example, an annotated design, regardless of its appearance, may provide information including electrical information (e.g., voltage or current information), parasitic information (e.g., resistance, capacitance, inductance, variations thereof, etc.), analysis or simulation results, timing information, etc. that may be obtained in the same domain as the electronic design, in one or more different domains, or in one or more different design fabrics.

At 320, in response to the selection or identification of the one or more circuit design components in a first representation (e.g., the schematic) the method or system may also identify the corresponding circuit design components in a second representation of the same electronic design. For example, in response to a user's selection of some schematic components, the method or system may automatically identify the corresponding layout structures from the layout of the same electronic design. In addition or in the alternative, the method or system may further extract the one or more corresponding circuit design components in the second representation. In some embodiments, the method or system may extract the one or more corresponding circuit design components in the second representation and store them as one or more corresponding complex models including one or more s-parameter models, one or more SPICE sub-circuits, or any combinations thereof.

Figure 3B:
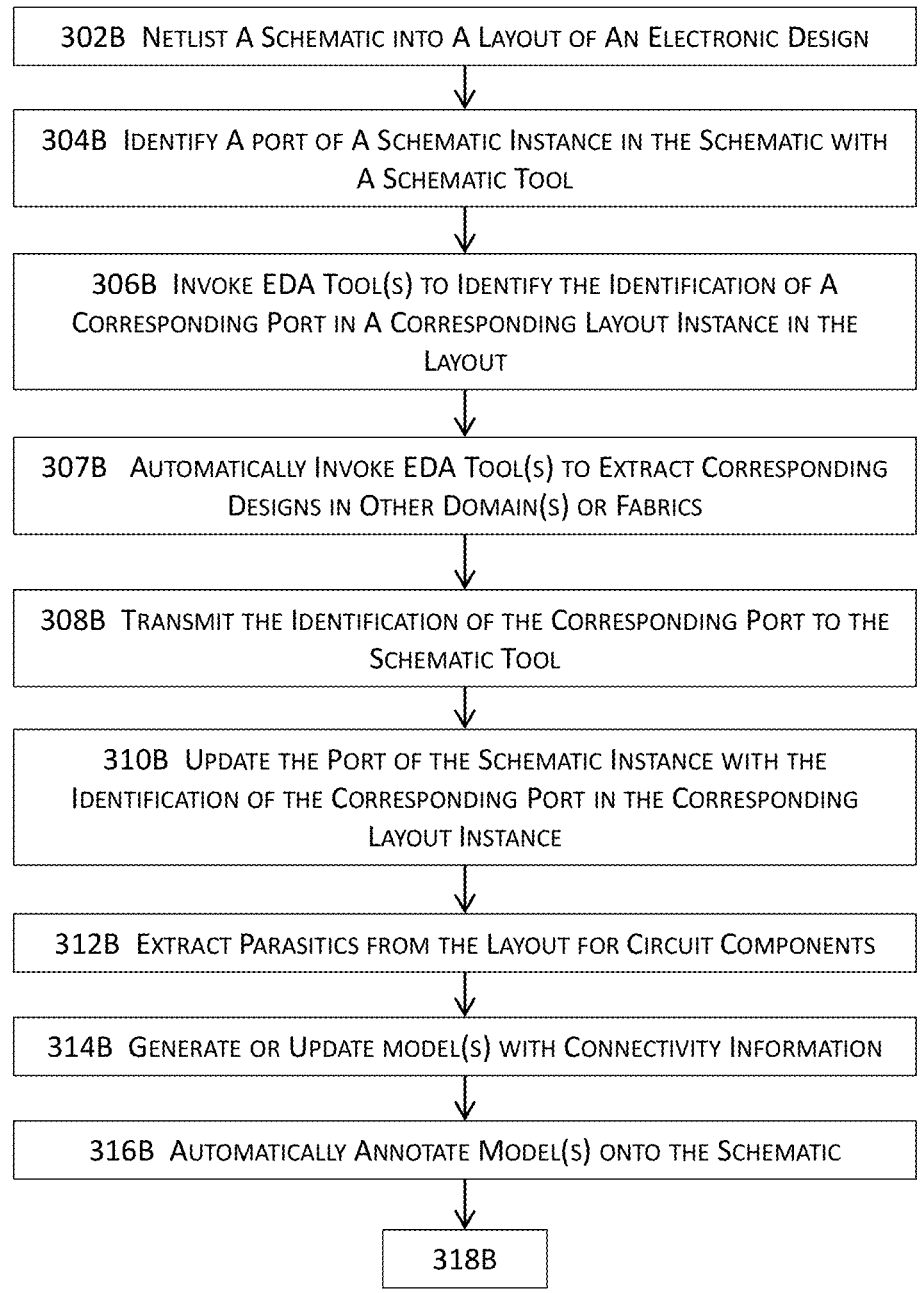
FIGS. 3B-C jointly illustrate a more detailed flow diagram for back annotating and visualizing parasitic models of electronic designs in some embodiments.
Figure 3C:
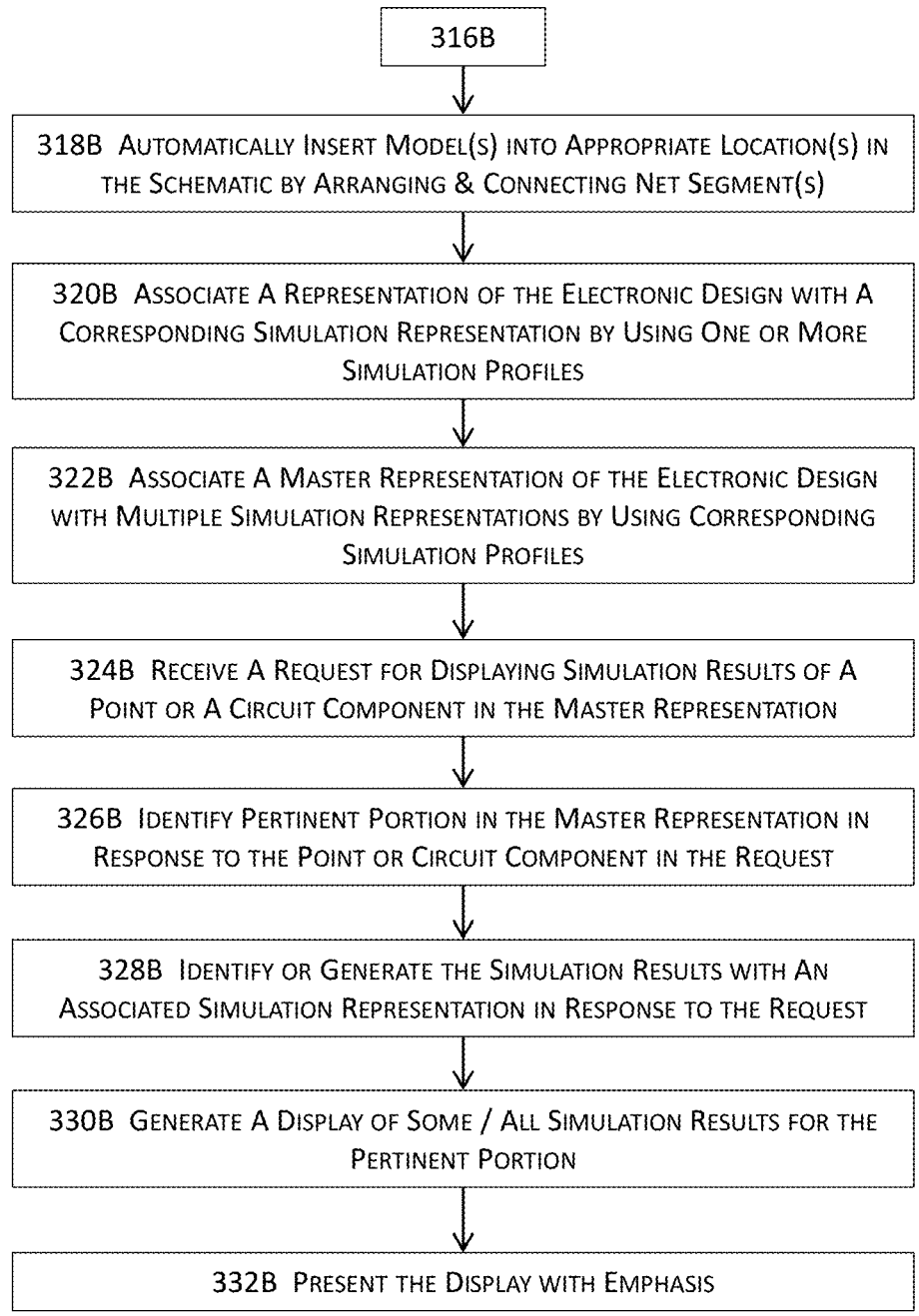

FIGS. 3B-C jointly illustrate a more detailed flow diagram for back annotating and visualizing parasitic models of electronic designs in some embodiments. In these embodiments illustrated in FIGS. 3B-C, the method or system may netlist a first representation (e.g., a schematic) of an electronic design into a second representation (e.g., a layout) of the electronic design at 302B. For the ease of illustration and explanation, the description of FIGS. 3B-C may refer to the schematic and the layout for the first representation and the second representation respectively from this point, although it shall be understood that the techniques described herein are not limited to the first representation being a schematic or the second representation being a layout. Netlisting generates a list of connectivity information including, for example, information such as names or identifications of the nets or segments thereof, how or where the nets or nets segments are connected, information about the sources and/or destinations of nets, net segments, or circuit components, etc.

At 304B, the method or system may identify one or more ports of an instance in the first representation with a first EDA tool that accesses the design data natively in the first representation. For example, the method or system may identify a port name of a schematic instance with the corresponding pin number of the corresponding layout instance. An instance may include one or more circuit design components. Design data are native to a design fabric and hence various EDA tools and other tools (collectively circuit design tools) for processing the design data in the design fabric (e.g., various simulators, verification engines, waveform viewers, etc.) if these tools for the design fabric may generate, access (e.g., read from or write to), modify, maintain, or otherwise manipulate the design data without transforming, mapping, or abstracting the design data by using a transform, a mapping, or another process to translate, map, or otherwise transform the design data into another type or format.

On the other hand, design data are non-native to a design fabric and hence the EDA tools and other tools cannot generate, access (e.g., read from or write to), modify, maintain, or otherwise manipulate the design data without transforming, mapping, or abstracting the design data by using a transform, a mapping, or another process to translate, map, or otherwise transform the design data into another type or format. For example, IC design data (e.g., schematic or layout data) are native to IC design tools (e.g., schematic, layout, or synthesis tools, etc.) but are non-native to tools associated with the PCB design fabric or the packaging design fabric. Within a single design fabric, design data may also be native to a smaller subset of circuit design tools but are non-native to other circuit design tools associated with the design fabric. For example, the schematic design data may be native to various schematic tools (e.g., schematic editor or simulator) in the IC design fabric but may be non-native to other circuit design tools (e.g., layout tools, synthesis tools, etc.) in the same IC design fabric.

Design data that are native to a design fabric may be processed (e.g., implemented, verified, checked, simulated, netlisted, probed, or otherwise analyzed) by using various libraries (e.g., design libraries, runtime libraries, standard intellectual property or IP cells or block libraries, etc.) Design data that are non-native to a design fabric may need to be transformed, mapped, abstracted, exported, reconstructed, or otherwise processed into another form or format before such non-native design data may be processed by various circuit design tools associated with the design fabric in conjunction with various libraries for the design fabric. In addition or in the alternative, some the original libraries and/or constraints associated with the non-native design data may also need to be transformed, mapped, abstracted, exported, reconstructed, or otherwise processed into another form or format before such libraries and/or constraints may be used in the design fabric to which the design data are non-native.

At 306B, the method or system may invoke one or more EDA tools to identify the identification of a corresponding port in a corresponding instance in the second representation. For example, the schematic editor for the schematic domain may automatically invoke a layout editor and send a request to the layout editor to identify the corresponding port in the layout for a port in the schematic domain. At 307B, the method or system may also automatically invoke the one or more EDA tools to extract the corresponding design data or other data related to the corresponding design data in one or more other domains or design fabrics. For example, the schematic editor for the schematic domain in the IC design fabric may automatically invoke a layout editor and send a request to the layout editor in, for example, the layout of an IC package in the package design fabric to identify one or more circuit components in the layout for a port in the schematic domain. The one or more circuit components may include, for example, one or more interconnects, one or more passive components, or any combinations thereof in some embodiments.

At 308B, the method or system may transmit the identification of the corresponding port in the second representation to the EDA tools having native access to the design data in the first representation. For example, the method or system may transmit the port name of a port identified from a layout editor for the layout to the schematic editor for the schematic. At 310B, the method or system may update the port of the instance of 304B in the first representation with the identification of the corresponding port in the second representation. The method or system may store the identification in or with the instance or may associate the identification with the instance. At 312B, the method or system may invoke (if not instantiated) or use (if already instantiated) a session of an appropriate EDA tool to extract parasitics from the second representation for the circuit components that correspond to the instance identified at 304B.

For example, the method or system may automatically extract the layout structures corresponding to the schematic instance at 312B in some embodiments. At 314B, the method or system may generate (if non-existing) or update (if already existing) one or more models with connectivity information determined from netlisting the schematic the first representation. In some embodiments, the method or system may generate or update one or more models by including connectivity information in the respective headers of the one or more models. The connectivity information may include, for example, one or more reference designators of the one or more models or circuit components thereof, one or more port numbers or names for the one or more ports in the one or more models, or one or more identifications (e.g., names) of one or more nets to be connected to the one or more models in the electronic design.

At 316B, the method or system may automatically annotate the one or more models having or associated with at least a part of the connectivity information onto the first representation of the electronic design. In some embodiments, the method or system may automatically annotate the first representation by at least inserting the one or more models into the first representation of the electronic design and connecting, depending at least in part upon whether the first representation is complete at least in the areas of the insertion of these one or more models, at least some of the ports of the one or more models to the corresponding circuit components (e.g., nets or other circuit components) in the first representation at 318B.

At 320B, the method or system may further optionally associate the first representation with one or more corresponding simulation representation by using one or more simulation profiles. A simulation profile may include the selection or identification of electronic design components (e.g., nets, net segments, other circuit components, etc.), one or more parameter values of one or more parameters for circuit components (e.g., parameterized cells) or for subsequent analyses or simulations (e.g., various parameters for simulations or analyses), analysis or simulation input (e.g., currents, voltages, etc.), other information for analyses or simulations, etc. for determining results or other design related information from subsequent simulations or analyses in some embodiments. At 322B, the method or system may associate the master representation of the electronic design with multiple simulation representations by using respective simulation profiles. At 324B, the method or system may receive a request for displaying simulation or analysis results of a point (e.g., a node) or a circuit component in the first representation or the master representation.

At 326B, the method or system may optionally identify the pertinent portion in the first or master representation in response to the point or circuit component in the request. For example, when the user specifies a point along a net in a design fabric, the method or system may identify the pertinent net including all the circuit components that may affect the electrical behavior at the specified point from the source to the destination at 326B. In some embodiments, the method or system identifies the pertinent portion across multiple hierarchical levels or even across multiple design fabrics. At 328, the method or system may identify or generate the simulation results covering the pertinent portion with the corresponding simulation representation in response to the request. For example, if the corresponding simulation profile has already existed and has been applied to the first representation or the master representation with the corresponding simulation representation, the method or system may simply identify the simulation results. Otherwise, the method or system may identify the corresponding simulation representation or profile or modify the closest resembling simulation representation or profile, apply the simulation profile, and obtain the simulation results. At 330B, the method or system may generate a display of some or all of the simulation results for the pertinent portion. At 332B, the method or system may present the display with graphical, textual, or both graphical and textual emphasis on the point or circuit component identified in the request.

Figure 4:
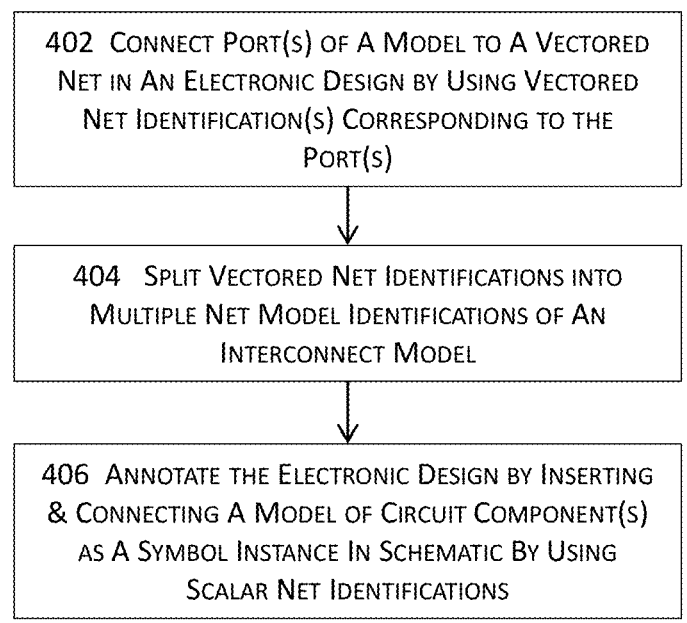
FIG. 4 illustrates a high flow diagram for back annotating and visualizing parasitic models of electronic designs in some embodiments.

FIG. 4 illustrates a high flow diagram for back annotating and visualizing parasitic models of electronic designs including in some embodiments. More specifically, FIG. 4 illustrates the flow diagram for annotating an electronic design with a model including one or more vectored nets. In these embodiments illustrated in FIG. 4, the method or system may connect one or more ports of a circuit component (e.g., a cell or block of circuit components) to a vectored net by using one or more vectored net identifications corresponding to the one or more ports at 402. For example, the method or system may identify (if pre-existing) or create (if non-existing) net name variants (e.g., a common net name as a prefix and a bit number as a suffix for each pin) on each of the one or more pins of the vectored bus to appropriately connect a vectored bus to a vectored net. In some embodiments, the one or more vectored net identifications may include one or more names, numbers, or identifiers of the net.

A model may include, for example, a complex model comprising an s-parameter model, an IBIS model, a SPICE sub-circuit, or any models including one or more parameters, instances, or nets common to one or more such models, etc. A vectored net includes a net where the net names for each bit in the net may have the same net name as a prefix with a bit number associated therewith such as with the bit number as a suffix (e.g., net4<2:0> where "net4" represents the net name and "<2:0>" represents the bit numbers "0," "1," and "2" for the vectored net) in some embodiments. In some embodiments, a vectored net includes a net that has a width greater than one and is treated as an indivisible entity. In these embodiments, the indivisible entity is driven as a whole and not on individual bit basis. In contrast, a scalar net (or a scalared net) may be assigned to a specific bit number. In an example of splitting a model representing the above net4<2:0> into multiple scalared nets, the vectored net "net4<2:0>" may be split into three separate net segments in the model having the split net identification of "net4<0>," "net4<1>," and "net4<2>".

A vectored net may be identified with the Verilog declaration: "net_declaration::=net_type_or_trireg [drive_strength|charge_strength] [vectored|scalared] [signing] {packed_dimension} [delay3] list_of_net_decl_assignments;" At 404, the method may split a vectored net identification into multiple net model identifications of an interconnect model. In some embodiments, a vectored net model identification includes the identification of the vectored net and a bit number. For example, the method or system may split a vectored net name (e.g., net<2:0> into multiple corresponding scalar net names (e.g., net<0>, net<1>, and net<2>) of an interconnect model that is used to annotate the vectored net in the representation by replacing the vectored net with the interconnect model. In some embodiments, the multiple net model identifications respectively correspond to multiple net segments in the interconnect model.

For example, in a representation including a first block and a second block that are interconnected by a vectored net, the annotated representation may include a first model instance for the first block, a second model instance for the second block, and an interconnect model including multiple net segments for the vectored net to connect the first model to the second model. More details about splitting a vectored net identification into multiple corresponding scalar net identifications will be described below with reference to FIGS. 17-19. At 406, the method or system may annotate the electronic design by at least automatically inserting the model into the electronic design and connecting the model having one or more circuit components as a symbol instance in place of or in addition to the original one or more circuit components in the electronic design by using the multiple corresponding scalar net identifications. For example, the method or system may insert a complex model into an electronic design as an instance of a symbol and connect all corresponding pins of the complex model to the corresponding nets or a vectored net based at least in part upon the same net names.

Figure 4A:
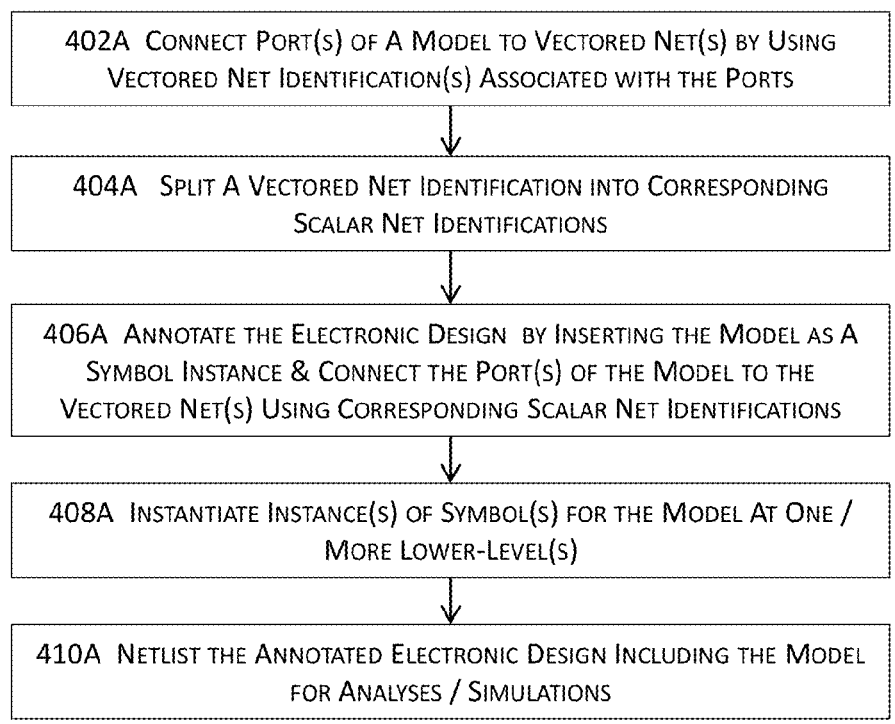
FIG. 4AA illustrates a high level block diagram for a system for back annotating and visualizing parasitic models of electronic designs in some embodiments.

FIG. 4AA illustrates a working example of annotating a portion of a schematic electronic design including a vectored net and the corresponding annotated portion of the electronic design in some embodiments. More specifically, FIG. 4AA illustrates a portion 102A of a schematic design including two blocks 104A and 106A interconnected by a vectored net 108A, NETDI_0<0 . . . 2>. FIG. 4AA further illustrates the blocks and the vectored net 108A in the portion 102A may be represented as 110A shows. For example, block 104A may be represented as the first symbol instance 112A; block 106A may be represented as the second symbol instance 114A, and the vectored net 108A may be split into three scalared nets 116A and represented as the corresponding scalared nets with the respective scalared net identifications. The vectored net 108A is now represented in the annotated portion of the schematic design with the s-parameter model symbol of one of the scalared net segments and two additional wire model symbols for the remaining two scalared net segments.

Figure 4B:
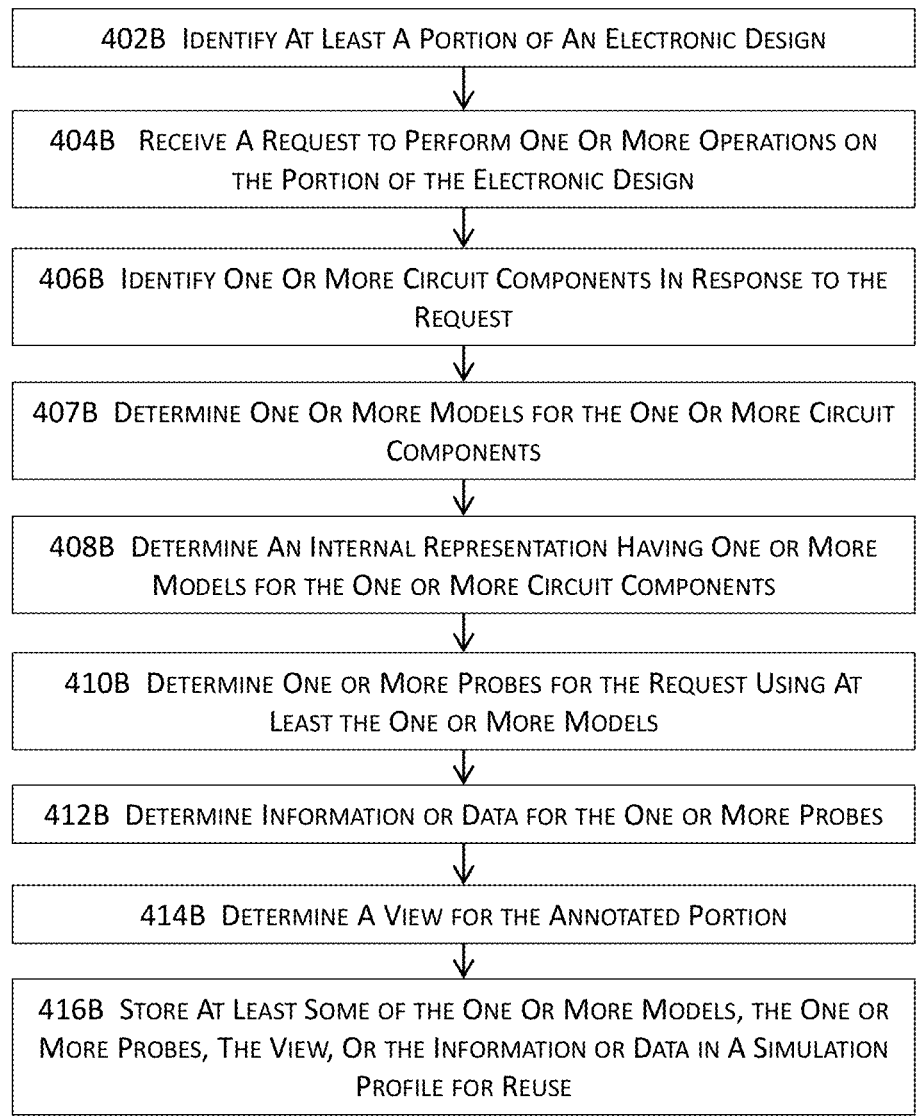
FIG. 4BB illustrates a schematic that may be implemented with various techniques described herein in some embodiments.
Figure 4A:
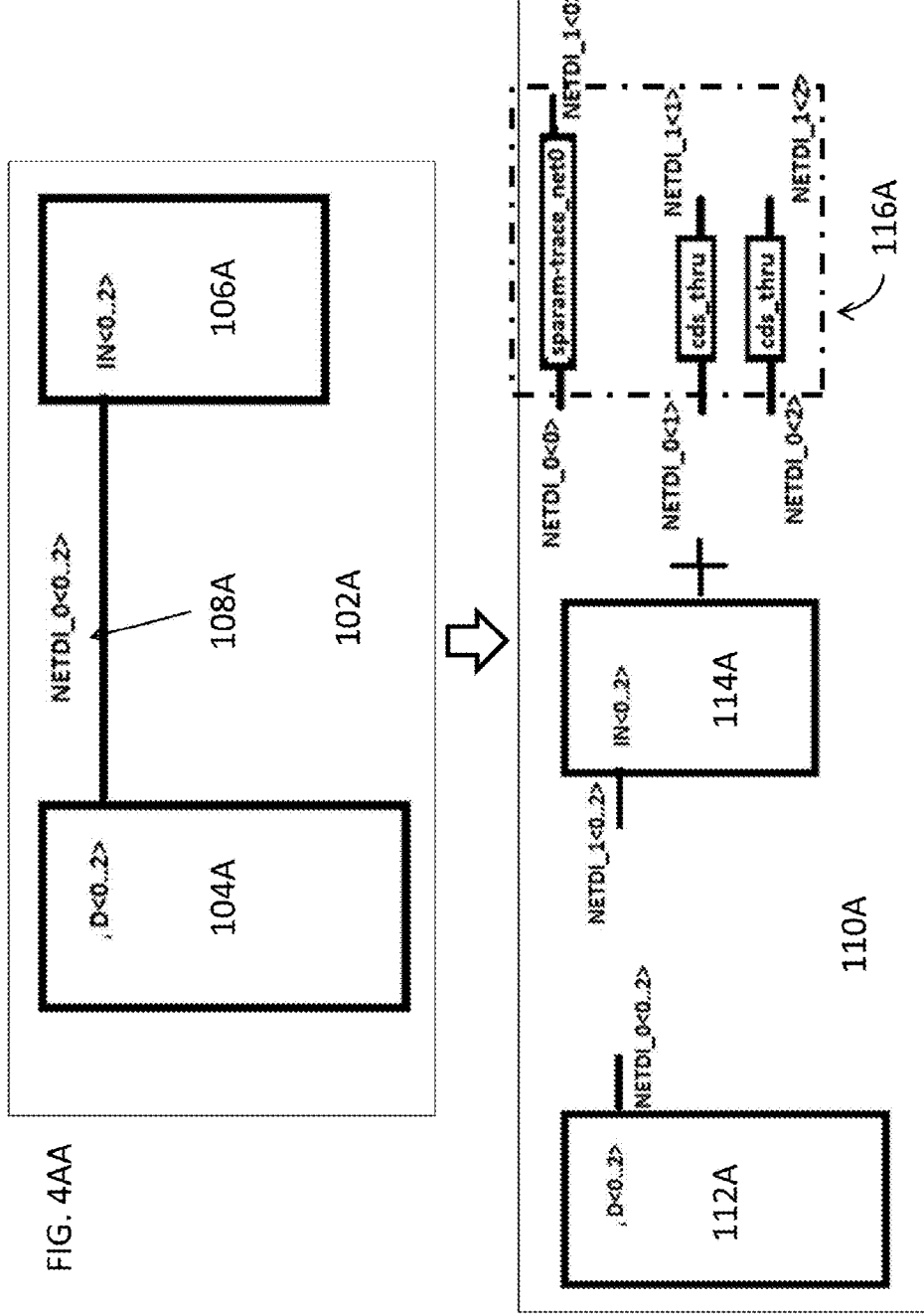
Figure 4B:
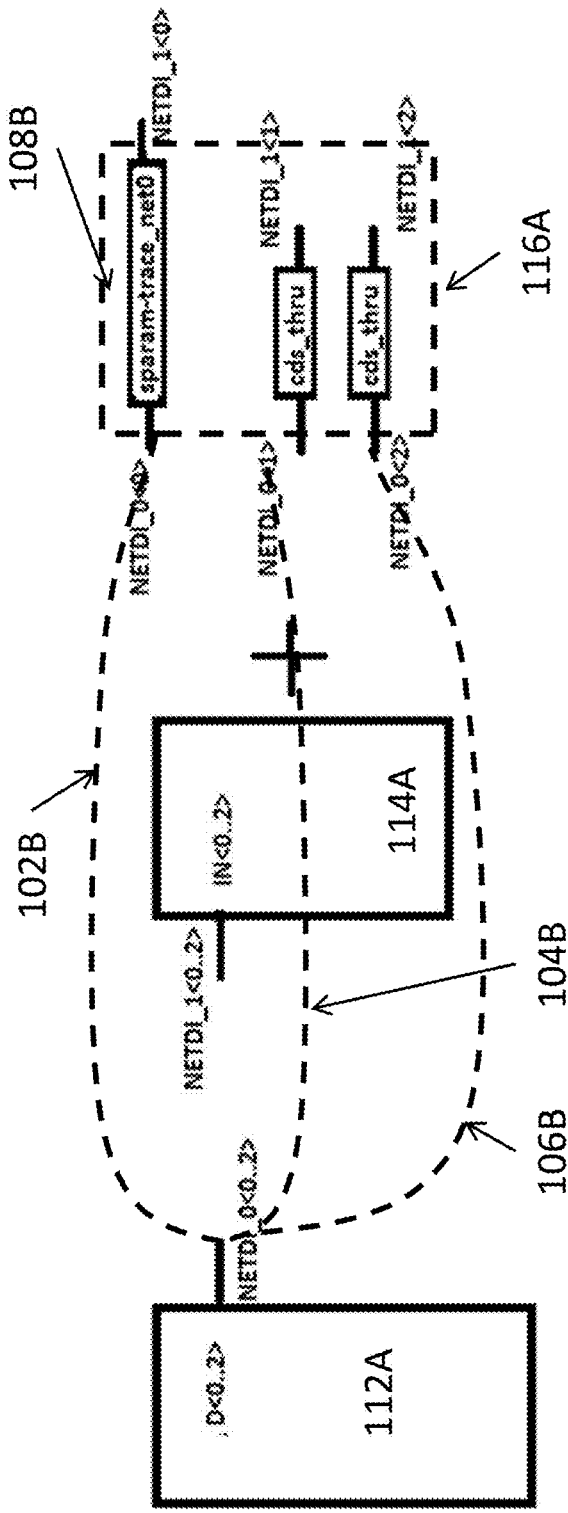

FIG. 4BB illustrates connecting the symbol instances for the portion of the schematic design including a vectored net in some embodiments. More specifically, FIG. 4BB shows that the method or system automatically connects the port of the symbol instance 112A to the vectored net, NETDI_1<0 . . . 2>, by connecting the scalared net symbol instances in 116A. As FIG. 4BB shows, each scalared net instance symbol in 116A has or is associated with the same vectored net identification (NETDI_0) as the prefix and the bit number ("0", "1", and "2") as the suffix. In these embodiments, various techniques described herein split a vectored net into multiple scalar nets and complete the connectivity between the two blocks by using the scalared net identifications of the symbol instances of the scalared nets. The dashed lines 102B, 104B, and 106B indicate that the symbol instance 112A for the first block is connected to the vectored net by using the scalared net identifications. The same may also be done to connect the model symbols of the scalared net segments to the second block 114A by using identifications of the scalared net segments that are split from the vectored net, as similarly described above.

FIG. 4A illustrates a more detailed flow diagram for back annotating and visualizing parasitic models of electronic designs including a vectored net in some embodiments. More specifically, FIG. 4A illustrates a more detailed flow diagram for annotating an electronic design with a model including one or more vectored nets. In these embodiments, the method or system may connect one or more ports of a model to one or more vectored nets by using the corresponding one or more vectored net identifications associated with the one or more ports at 402A. At 404A, the method or system may split a vectored net identification into corresponding scalar net identifications. In some of these embodiments, the method or system splits each vectored net identification into the respective corresponding scalar net identification.

At 406A, the method or system may annotate the electronic design (e.g., a schematic design) by at least inserting the model of one or more circuit components as a symbol instance in place of or in addition to the original one or more circuit components in the electronic design and connecting the one or more ports of the model to the one or more vectored nets using the corresponding scalar net identifications. At 408A, the method or system may instantiate one or more instances of one or more symbols for the model at one or more lower hierarchical levels for the model. In these embodiments, the symbol instance for the model may be hierarchical and include multiple hierarchical levels, each of which may include one or more symbol instances. In some of these illustrated embodiments, the model symbols may include one or more parasitics or parasitic models extracted from a layout of the electronic design. In some of these embodiments, the model symbols may include short circuits for nets that are not extracted.

At 410A, the method or system may netlist the annotated electronic design including the model for subsequent analyses or simulations. To netlist an electronic design is to generate a list of nets and/or the connectivity information for the electronic design. In some embodiments, the representation of the electronic design comprises a copy of the corresponding schematic of the electronic design with one or more complex models inserted into the corresponding schematic. In some embodiments, the method or system may netlist the annotated electronic design across multiple hierarchical levels or across multiple design fabrics by automatically invoking the various EDA tools or instantiating the respective sessions of the various EDA tools to natively process the design data in these multiple design fabrics. For example, the method or system may generate a SPICE netlist of a PCB design including one or more IC package designs for subsequent SPICE or SPICE-like simulations.

FIG. 4B illustrates another more detailed flow diagram for processing an annotated electronic design in some embodiments. In these embodiments illustrated in FIG. 4B, the method or system may identify at least a portion an electronic design at 402B. In some of these embodiments, the at least a portion of the electronic design may be at least partially annotated with one or more models (e.g., one or more complex models) by using various techniques described herein.

At 404B, the method or system may receive a request to perform one or more operations on the portion of the electronic design. The one or more operations may include generating a view for the portion of the electronic design; probing the electronic design to obtain related electrical, parasitic, performance, or design related information, and/or analysis results; netlisting the electronic design; analyzing (e.g., performing a cross-talk analysis, noise analysis, inter-symbol analysis, etc.) at least the portion of the electronic design; simulating at least the portion of the electronic design (e.g., schematic simulation, SPICE simulation, or SPICE-like simulation, etc.), or any other operations to aid one or more EDA tools to perform their intended functions in some embodiments.

The request may be initiated by, for example, a designer or an EDA tool. For example, the request may include a user's request for probing a net to determine electrical information (e.g., voltage or current) or parasitic information at one or more nodes along the net or an EDA tool's request to traverse a net across multiple domains or multiple design fabrics to determine design related information. At 406B, the method or system may identify one or more circuit components (e.g., one or more nets or segments thereof, one or more devices, or any combinations thereof, etc.) in response to the request. For example, the method or system may identify the source, the destination, and/or one or more nodes along a net in response to a request to probe a net or a segment thereof at 406B.

At 408B, the method or system may determine an internal representation that includes one or more models that are determined at 407B for the one or more circuit components identified at 406B. In some embodiments where the one or more models already exist, the method or system determines these one or more models by identifying these one or more models. In some other embodiments where at least one model of the one or more models is not yet existing, the method or system determines the at least one model by extracting or retrieving the pertinent information or data and generate the at least one model with the pertinent information or data. For example, the method or system may identify what circuit components (e.g., a net, one or more net segments thereof, and one or more devices) the at least one model is to represent and extract or retrieve the information or data for these circuit components, and construct the at least one model with the extracted or retrieved information or data using various techniques described herein.

For example, if the method or system determines that no existing model accommodates two identified nets and includes two identified devices with cross-talk analysis results, the method or system may extract, for example, the parasitics for these two nets and two devices from the layout, retrieve the cross-talk analysis results or perform the cross-talk analysis for at least these circuit components of interest to obtain the cross-talk analysis results, and construct a single model (e.g., a complex model) to represent these circuit components in another representation of an electronic design (e.g., in a schematic representation). The pertinent information or data may include, for example, electrical information (e.g., voltages, currents, etc.), parasitic information (e.g., resistance, capacitance, inductance, variations thereof, etc.), various analysis or simulation results, timing information, analysis parameters or corners, input data to various simulations or analyses, etc. that may be obtained in the same domain as the electronic design, in at least two different domains, or in at least two different design fabrics.

At 410B, the method or system may determine one or more probes for the request using at least the one or more models. In some embodiments, the method or system may determine the one or more probes from a user's input. For example, a user may manually insert a probe at a node of interest or along a net by clicking on the node or net of interest. In some other embodiments, the method or system may automatically determine the number and/or the respective locations of probes and associate these probes with an annotated representation that either displays or hides these probes. For example, the method or system may receive a request to probe a net (e.g., from a user's identification of the net with a pointing device or from an EDA tool's identification of the net for other operations) in an annotated portion of an electronic design.

In response to the request, the method or system may access the internal, annotated representation of the annotated portion or the annotated portion itself to determine how many probes are to be created and where these probes are to be created. For instance, the method or system may, for example, identify the ports, pins, pads, terminals, etc. of each of one or more models in the annotated representation (or the internal, annotated representation) as the probes in some embodiments. In some embodiments, the method or system may simply identify the source and the destination of a net as two probes and associate these two probes with the annotated representation. The internal, annotated representation may be referenced or accessed by one or more EDA tools that are to process at least the portion of the electronic design and is not visible to a designer in some embodiments.

In addition or in the alternative, the method or system may further identify one or more groups for the one or more probes, wherein a group of probes may be displayed with its respective textual, graphical, or both textual and graphical indication that is distinguishable from that of another group of one or more probes. In these embodiments, each group of one or more probes corresponds to a model (e.g., a complex model) that is individually and separately constructed via, for example, individual and separate extraction and/or retrieval processes described herein. At 412B, the method or system may further determine information or data for the one or more probes. In some embodiments, the method or system may determine the information or data by identifying the simulation results for these one or more probes or retrieve the parasitic for these one or more probes or the circuit components between two probes.

For example, the method or system may identify two probes located at both ends of a net, determine the nodal voltage values for these two probes from the simulation results, and extract the parasitic resistance of the net between these two probes. At 414B, the method or system may further determine a view for at least the annotated portion of the electronic design. In some embodiments, the view or representation may appear to be exactly identical to the original view or representation of the portion prior to annotation. For example, an annotated schematic view including the pertinent information and one or more models described above may appear to be exactly identical to the original schematic view prior to annotation. In some other embodiments, the view or representation may appear to be substantially identical to the original view or representation with the only exceptions being the textual, graphical, or both textual and graphical indications of the probes.

For example, an annotated schematic view may appear to be the original schematic view prior to annotation with the additions of some forms of indication of the probes. These forms of indication may provide a hint to a designer to inform the designer that the portion has been annotated, and that additional information is available, without disturbing the original view by, for example, adding or stitching other additional elements (e.g., resistor or capacitor symbols, other elements representing characteristics of circuit components that are not in the original view). For example, these embodiments do not add any resistor or capacitor symbols to represent the parasitics of some circuit components to the original view. One of the advantages of these embodiments is that the annotated view resembles the original view of the electronic design that designers are familiar with and thus reduces or minimizes the transition into or acceptance of the new EDA tools including at least some of these techniques described herein.

At 416B, the method or system may store at least some of the one or more circuit components identified at 406B or links thereof, the one or more models for the one or more circuit components or links thereof, the one or more probes, the information or data determined at 412B, or the view or a link thereof to a simulation profile in some embodiments. The method or system may also associate the simulation profile with the master view or representation or the master electronic design in some embodiments. In some of these embodiments, the method or system may associate a plurality of simulation profiles with the master view or representation or the master electronic design. These simulation profiles may be subsequently re-used for, for instance, quick what-if analyses or other suitable purposes.

Figure 5:
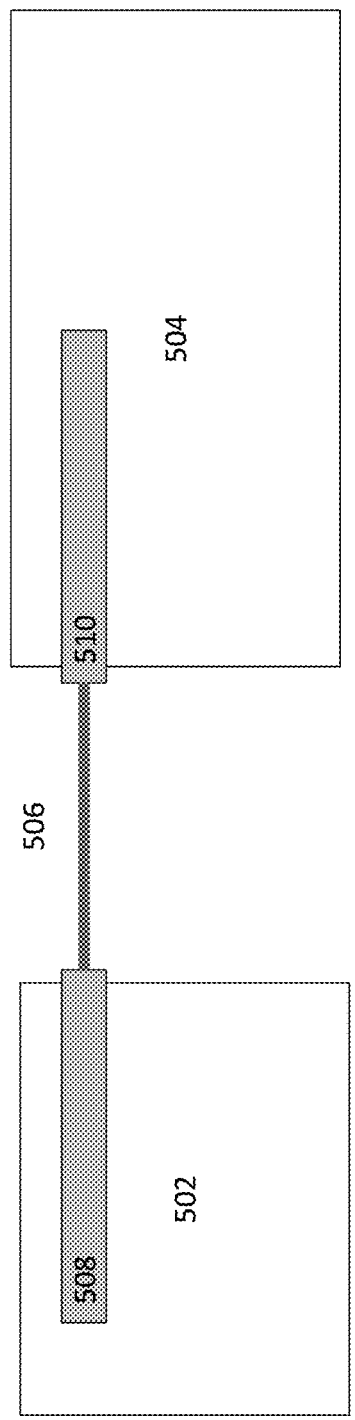
FIG. 5 illustrates the application of some techniques described herein to a first use case in some embodiments.

FIG. 5 illustrates the application of some techniques described herein to a first working example in some embodiments. More specifically, FIG. 5 illustrates the first block 502 including a first port 508 (e.g., die_pin<2:0>) and a second block 504 including a second port 504 (e.g., bga_pin<2:0>). The first port is connected to the second port via the net 506 (e.g., net<2:0>). In some embodiments, the first block may include an IC and may also be associated with a first reference designator, and the second block may include a BGA (ball grid array) and may also be associated with a second reference designator. In these illustrated embodiments, model assignment may be done in one or more of the following assignments:

Model assignment performed on net<2>, net<1>, and net<0>

Model assignment performed on net<1> and net<0>, or

Model assignment performed on net<0> but not on net<1> or net<2>.

Figure 6:
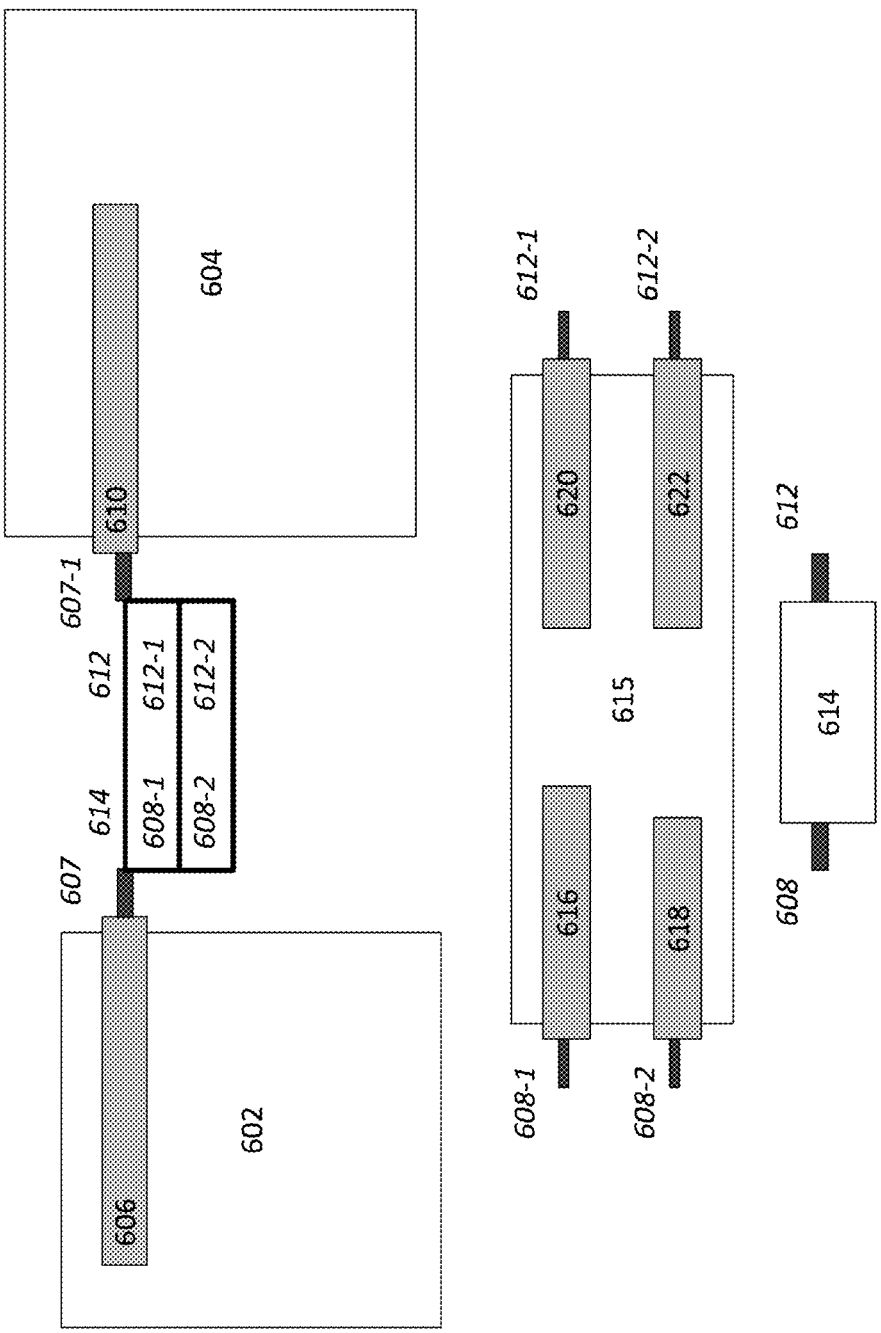
FIG. 6 illustrates a solution for the first use case illustrated in FIG. 5 in some embodiments.

Model assignment associates a circuit component (e.g., a net segment or a block of circuit components) in an electronic design with a model. The model that may be associated with a circuit component may include, for example, a symbolic model, a complex model (e.g., an s-parameter model, a SPICE sub-circuit model, etc.), or any other suitable models. FIG. 6 illustrates a solution for the first use case illustrated in FIG. 5 in some embodiments. As FIG. 6 shows, the model assignment may be done on both net<1> and net<0>. More specifically, FIG. 6 illustrates that the schematic representation illustrated in FIG. 5 may be annotated with the model instances illustrated in FIG. 6. In FIG. 6, the first block and the second block may be respectively represented or replaced with the model symbols 602 and 604. The first port may be represented by the model symbol 606 (e.g., die_pin<2:0>), which may also be instantiated under the model with model symbol 602, and connected to the first new net 607 (e.g., net<2:0>).

The second port of the second block may be represented or replaced with the model symbol 610, which may also be instantiated under the model with model symbol 604, and connected to the second new net 607-1 (e.g., net_new<2:0>).

The interconnection between the first block and the second block may be further represented or replaced as the model symbol 614 (e.g., "cds_thru" representing a short circuit) including or associated with the first new net identification 608 (e.g., net_new<1>) and the second new net identification 612 (e.g., net_new<2>). The interconnection between the first block and the second block may further include the model symbol 615 that may further include the first pin 616 (e.g., DIE-die_pin<0>) connected to a scalared net 608-1 (e.g., net<0>) and a second pin 618 (e.g., DIE-die_pin<1>) connected to a scalared net 608-2 (e.g., net<1>) that are both used to connect the model 615 to the model symbol 602 of the first block.

Figure 7:
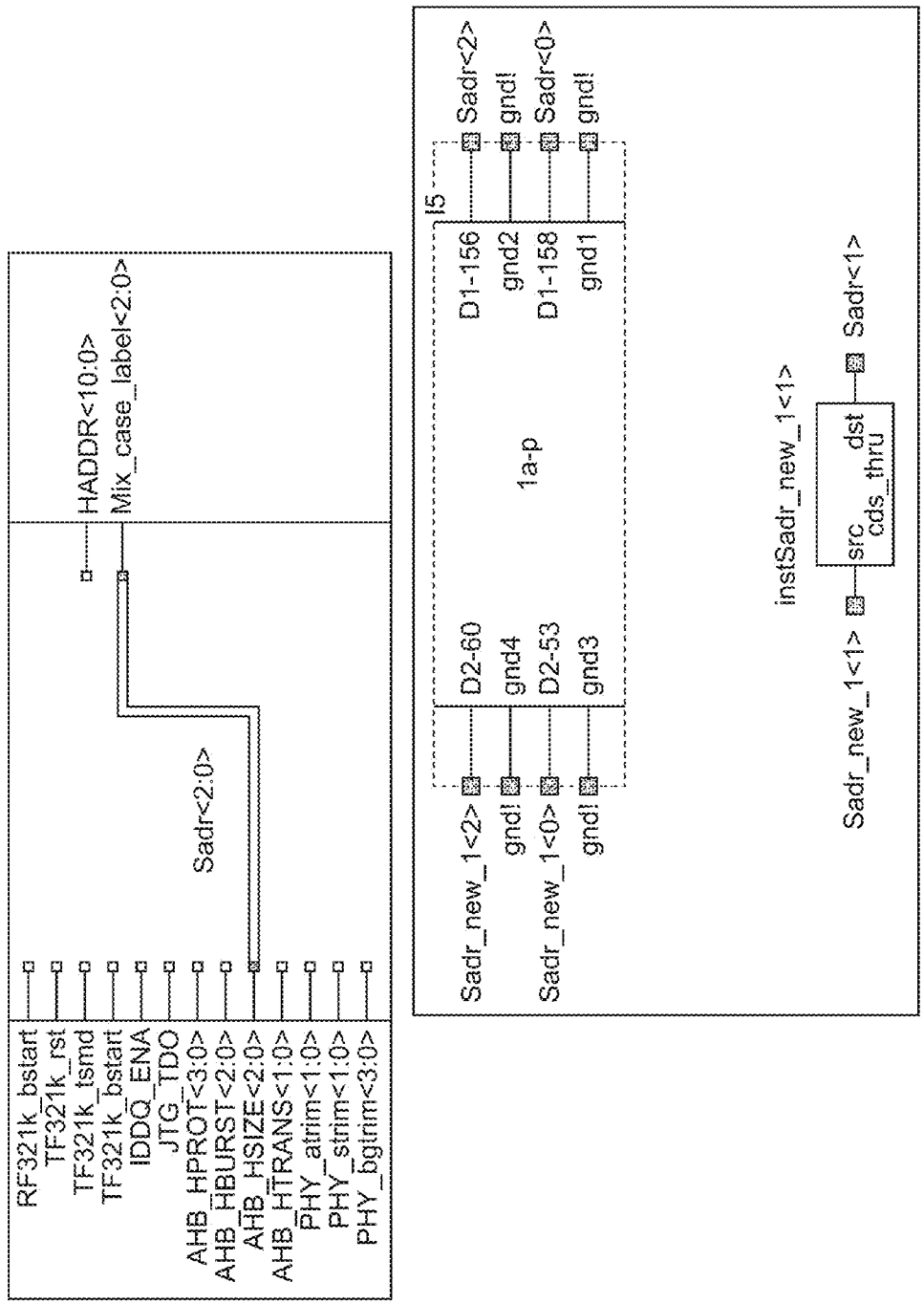
FIG. 7 illustrates the application of some techniques described with reference to FIGS. 5-6 to a part of an electronic design in some embodiments.

The model symbol 615 may further include the third pin 620 (e.g., BGA-bga_pin<0>) connected to a scalared net 612-1 (e.g., net_new<0>) and a fourth pin 622 (e.g., BGA-bga_pin<1>) connected to a scalared net 612-2 (e.g., net_new<1>) that are both used to connect the model 615 to the model symbol 604 of the second block. In this figure, net<2> from the first block passes through the short circuit 614 and then ends at, for example, pin #3 of the second block; net<1> from the first block passes through the extracted model 615 and ends at, for example, pin #2 of the second block; and net <0> passes through the extracted model 615 and ends at, for example, pin #1 of the second block. FIG. 7 shows an illustrated design for the first working example illustrated above with reference to FIGS. 5-6 in some embodiments.

Figure 8:
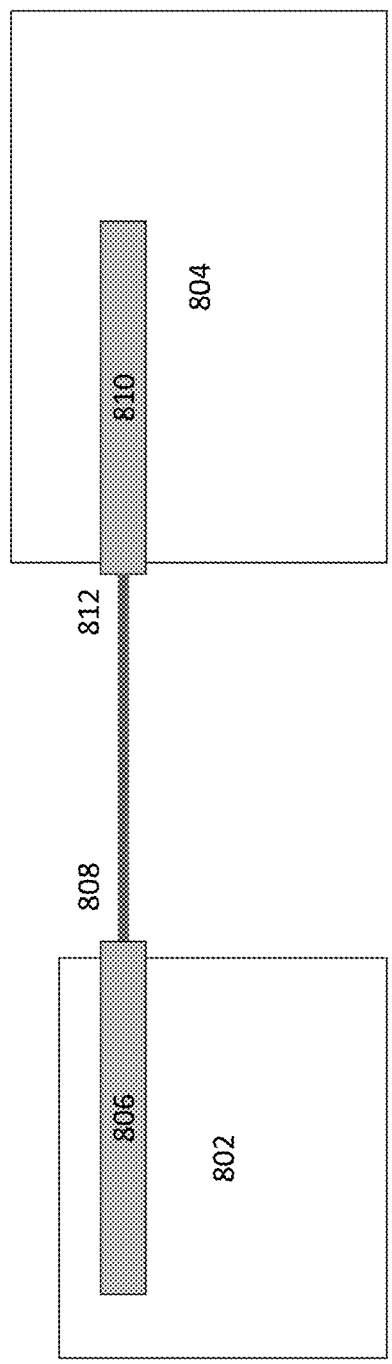
FIG. 8 illustrates the application of some techniques described herein to a second use case in some embodiments.

FIG. 8 illustrates the application of some techniques described herein to a second working example in some embodiments. More specifically, FIG. 8 illustrates the first block 802 including a first port 806 (e.g., die_pin<3:0>) and a second block 804 including a second port 810 (e.g., bga_pin<4:0>). The first port 806 is connected to the second port via a net. It shall be noted that the design data for the first block 802 and the design data for the second block 804 may be in the same design fabric or in different design fabrics. The net identification (e.g., net name) or its variant may be associated with or included in the first model 802 or the first port 806 as a first property 808 (e.g., net<7:0>).

Similarly, the net identification (e.g., net name) or its variant may be associated with or included in the second model 804 or the second port 810 as a second property 812 (e.g., net_new<7:0>). In some embodiments, the first block 802 may include an IC and may also be associated with a first reference designator, and the second block 804 may include a BGA (ball grid array) and may also be associated with a second reference designator. Moreover, FIG. 8 illustrates the annotation of a portion of a schematic design including nets of different widths. In these illustrated embodiments, model assignment may be done in one or more of the following assignments:

Model Assignment done on net<7>, net<6>, and net<5>,
Model Assignment done on net<6> and net<5>, or
Model Assignment done on net<5> but not on net<6> or net<7>.

Figure 9:
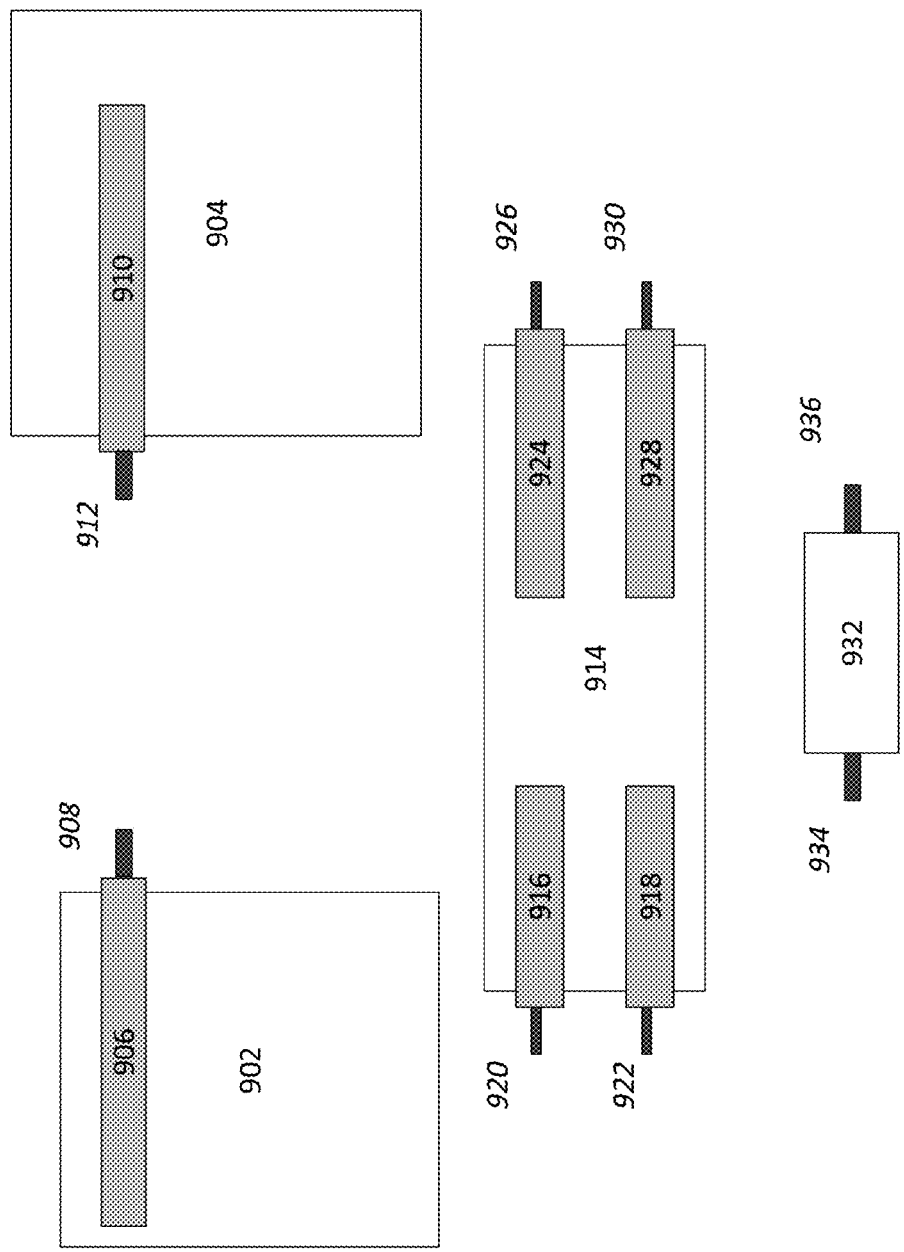
FIG. 9 illustrates a solution for the second use case illustrated in FIG. 8 in some embodiments.

FIG. 9 illustrates a solution for the second use case illustrated in FIG. 8 in some embodiments. The solution to the first use case by using certain techniques described herein is shown in FIG. 9 where model assignment may be done on net<6> and net<5>. More specifically, FIG. 9 illustrates that the schematic representation illustrated in FIG. 8 may be annotated with the model instances illustrated in FIG. 9. In FIG. 9, the first block and the second block may be respectively represented or replaced with the model symbols 902 and 904. The first port may be represented by the model symbol 906 (e.g., DIE-die_pin<3:0>), which may also be instantiated under the model with model symbol 902, and connected to the first new net 908 (e.g., net<7:4>).

The second port of the second block may be represented or replaced with the model symbol 910, which may also be instantiated under the model with model symbol 904, and connected to the second new net 912 (e.g., net_new<8:4>). The interconnection between the first block and the second block may be further represented as or replaced with the model including the model symbol 932 (e.g., "cds_thru" representing a short circuit) including or associated with the first new net identification 934 (e.g., net_new<7.4>) and the second new net identification 936 (e.g., net <7,4>).

The interconnection between the first block and the second block may further include the model symbol 914 that may further include the first pin 916 (e.g., DIE-die_pin<5>) connected to a scalared net 920 (e.g., net_new<5>) and a second pin 918 (e.g., DIE-die_pin<6>) connected to a scalared net 922 (e.g., net_new<6>) that are both used to connect the model 914 to the model symbol 902 of the first block.

The model symbol 914 may further include the third pin 924 (e.g., BGA-bga_pin<1>) connected to a scalared net 926 (e.g., net <5>) and a fourth pin 928 (e.g., BGA-bga_pin<2>) connected to a scalared net 928 (e.g., net <6>) that are both used to connect the model 914 to the model symbol 904 of the second block.

Figure 10:
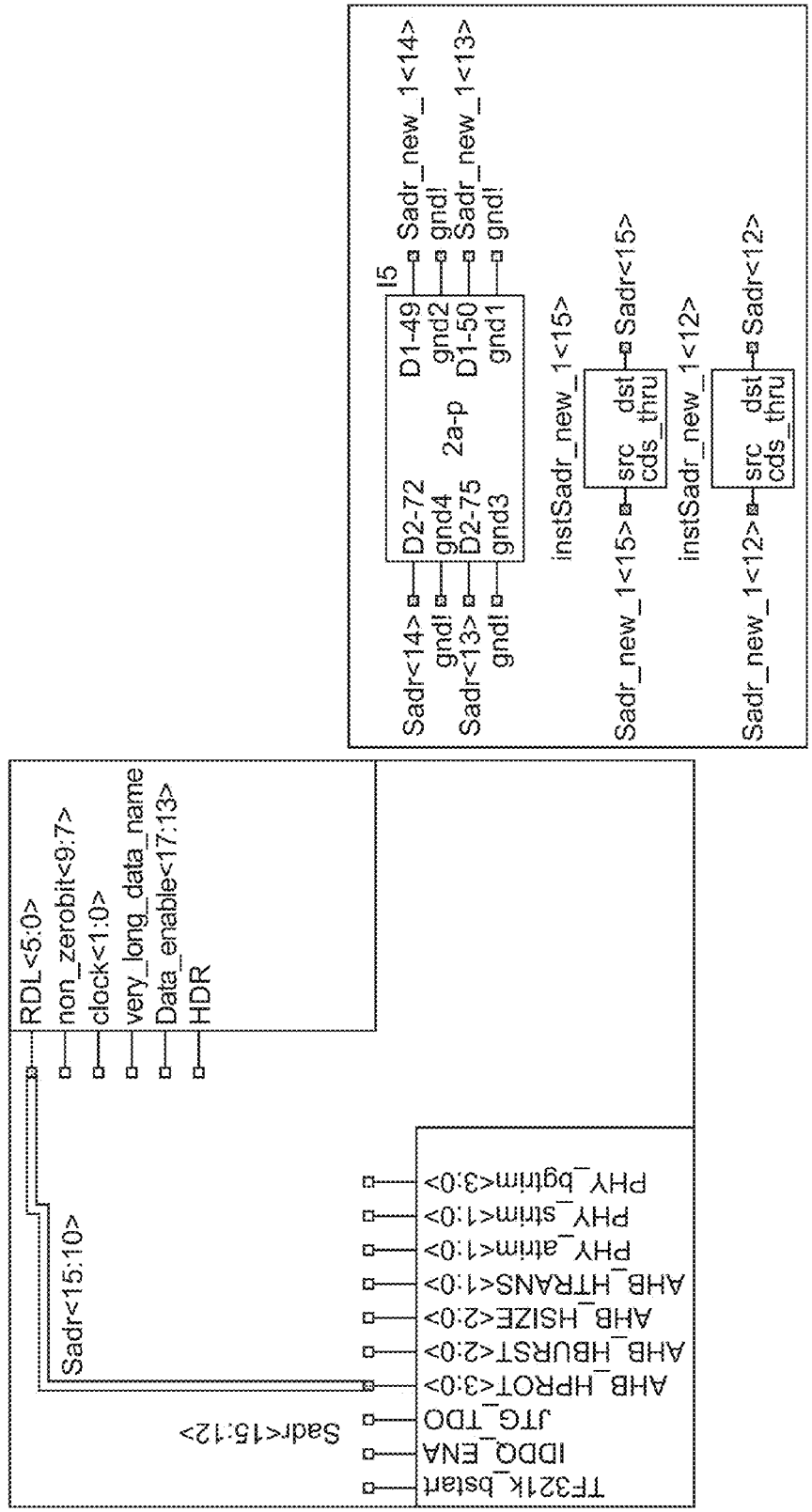
FIG. 10 illustrates the application of some techniques described with reference to FIGS. 8-9 to a part of an electronic design in some embodiments.

In this figure, net<7> from the first block passes through the short circuit 932 and then ends at, for example, pin #3 of the second block; net<6> from the first block passes through the extracted model 914 and ends at, for example, pin #2 of the second block; and net <5> passes through the extracted model 914 and ends at, for example, pin #1 of the second block. FIG. 10 illustrates an illustrated design for the second working example illustrated above with reference to FIGS. 8-9 in some embodiments.

Figure 11:
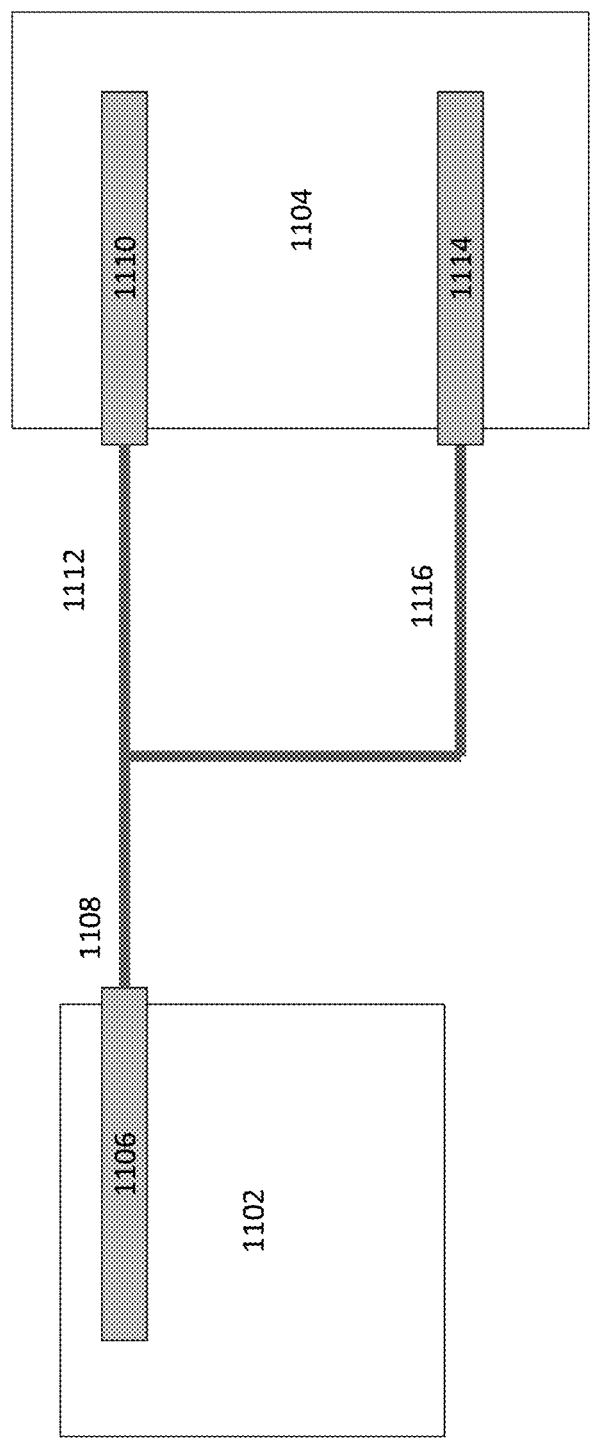
FIG. 11 illustrates the application of some techniques described herein to a third use case in some embodiments.

FIG. 11 illustrates the application of some techniques described herein to a third working example in some embodiments. More specifically, FIG. 11 illustrates the annotation techniques applied to a first block connected to a net which is further connected to different destinations on a second block. More specifically, FIG. 11 illustrates the first block 1102 including a first port 1106 (e.g., die_pin<5:0>) and a second block 1104 including a second port 1110 (e.g., bga_pin<2:0>) and a third port 1114 (e.g., bga_pin<2:0>). The first port 1106 is connected to the second port via the net 1108 and the net 1112. The first port is further connected to the third port 1114 via the net 1108 and 1116. In other words, net 1108 is connected to both net 1112 and net 1116. In some embodiments, the first block 1102 may include an IC and may also be associated with a first reference designator, and the second block 1104 may include a BGA (ball grid array) and may also be associated with a second reference designator.

Figure 12:
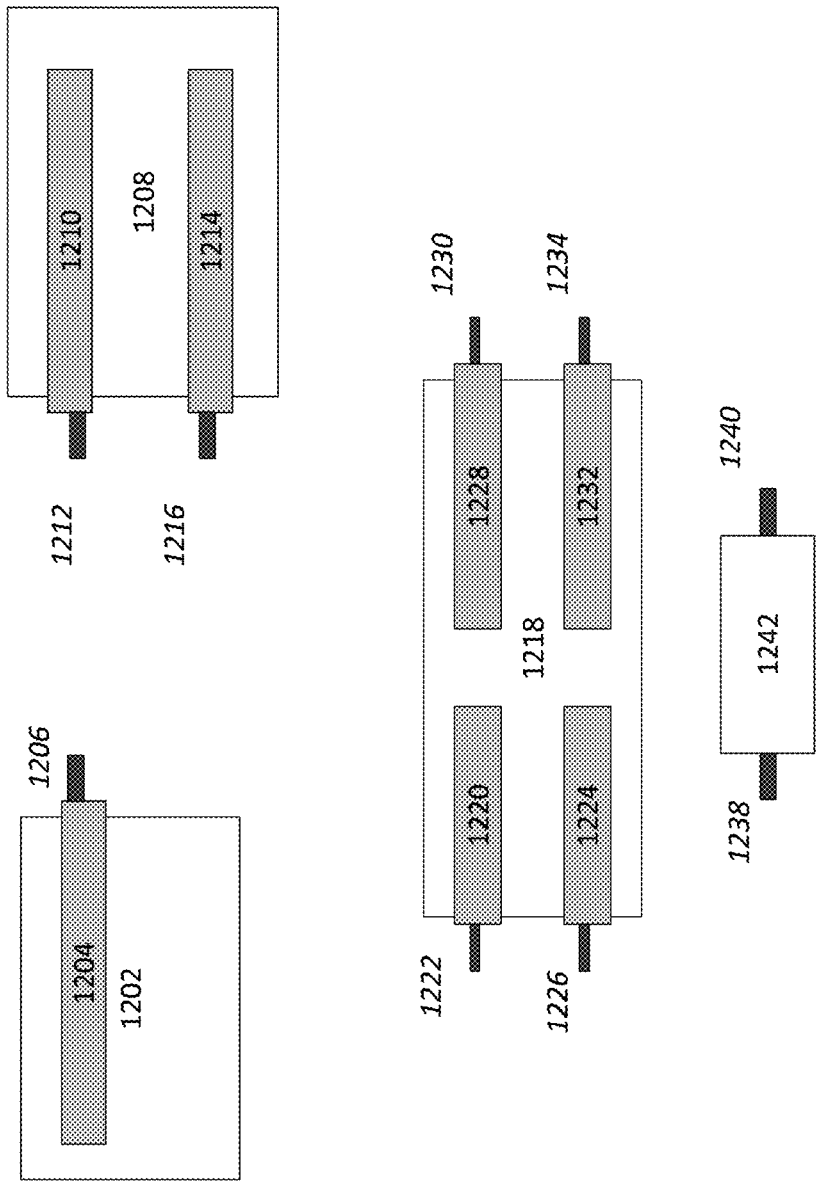
FIG. 12 illustrates a solution for the second use case illustrated in FIG. 11 in some embodiments.
Figure 13:
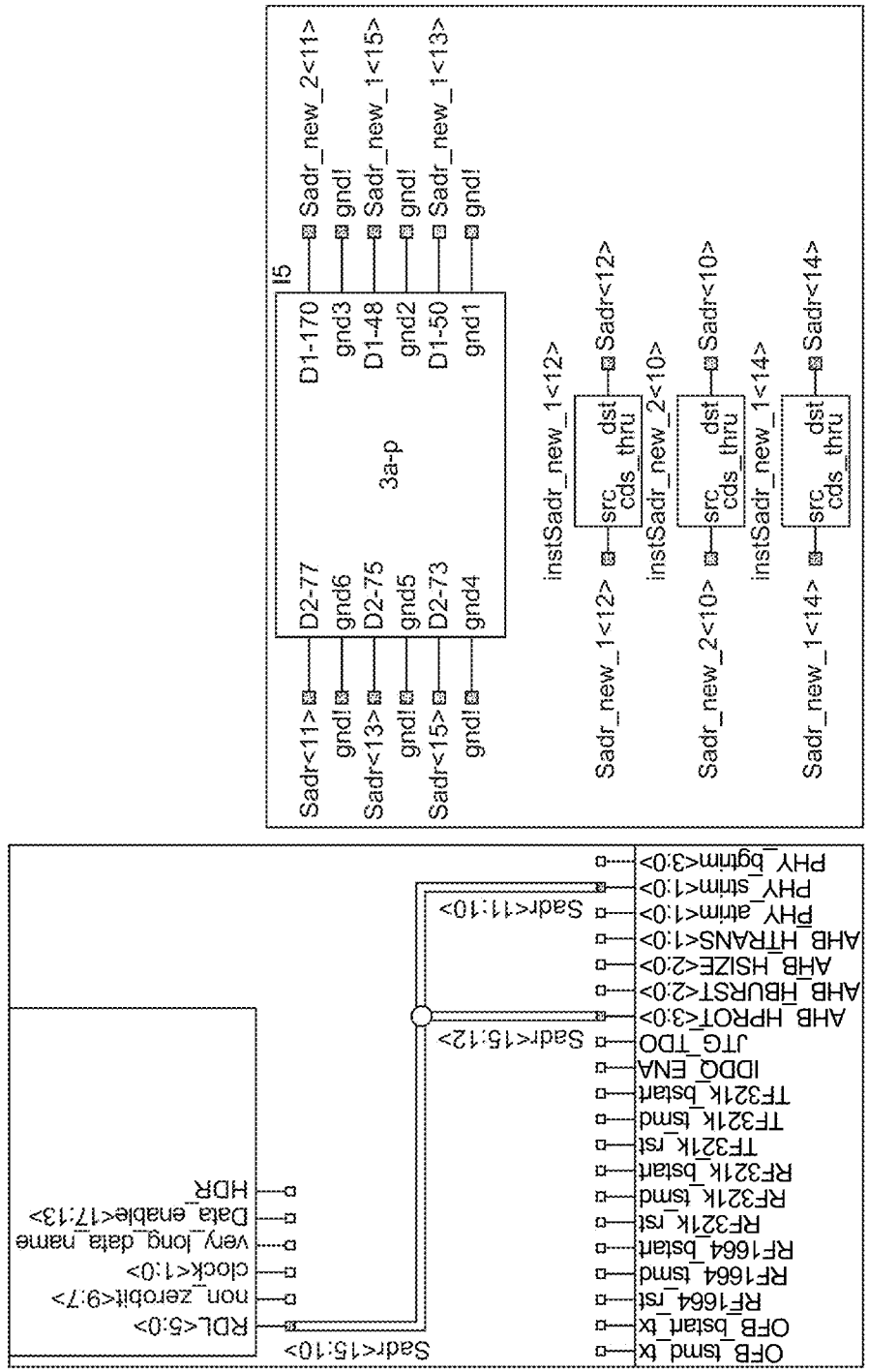
FIG. 13 illustrates the application of some techniques described with reference to FIGS. 11-12 to a part of an electronic design in some embodiments.

FIG. 12 illustrates a solution for the second use case illustrated in FIG. 11 in some embodiments. The solution to the third use case is illustrated in FIG. 12 where model assignment may be performed on net<0> and net<5>. More specifically, FIG. 12 illustrates that the schematic representation illustrated in FIG. 11 may be annotated with the model instances illustrated in FIG. 12. In FIG. 12, the first block and the second block may be respectively represented or replaced with the model symbols 1202 and 1208. The first port may be represented by the model symbol 1204 (e.g., die_pin<5:0>), which may also be instantiated under the model with model symbol 1202, and connected to the first net 1206 (e.g., net<5:0>). The second port of the second block may be represented or replaced with the model symbol 1210, which may also be instantiated under the model with model symbol 1208, and connected to the second new net 1212 (e.g., net_new<2:0>). The third port of the second block may be represented or replaced with the model symbol 1214, which may also be instantiated under the model with model symbol 1208, and connected to the second new net 1216 (e.g., net_new<5:3>).

A model described herein may be used to represent its corresponding circuit components in place of or in addition to the original representation in an electronic design. In some embodiments, the model may further be used to represent its corresponding circuit component in only the internal, annotated representation visible to various methods or systems but not to the users. The interconnection between the first block and the second block may be further represented as or replaced with the model including the model symbol 1242 (e.g., "cds_thru" representing a short circuit) including or associated with the first new net identification 1238 (e.g., net_new<1, 2, 3, 4>) and the second new net identification 1240 (e.g., net <1, 2, 3, 4>). The interconnection between the first block and the second block may further include the model symbol 1218 that may further include the first pin 1220 (e.g., DIE-die_pin<0>) connected to a net 1222 (e.g., net <0>) and a second pin 1224 (e.g., DIE-die_pin<5>) connected to a net 1226 (e.g., net <5>) that are both used to connect the model 1218 to the model symbol 1202 of the first block.

The model symbol 1218 may further include the third pin 1228 (e.g., BGA-bga_pin<0>) connected to a net 1230 (e.g., net_new<0>) and a fourth pin 1232 (e.g., BGA1-bga_pin<5>) connected to a net 1234 (e.g., net_new<5>) that are both used to connect the model 1218 to the model symbol 1208 of the second block. In this figure, net<1, 2, 3, 4> from the first block passes through the short circuit 1242 and then ends at, for example, pins #6, 5, 4, and 3 of the second block; net<0> from the first block passes through the extracted model 1218 and ends at, for example, pin #2 of the second block; and net <5> passes through the extracted model 1218 and ends at, for example, pin #1 of the second block. FIG.

13 illustrates an illustrated design for the third working example illustrated above with reference to FIGS. 11-12 in some embodiments.

Figure 14:
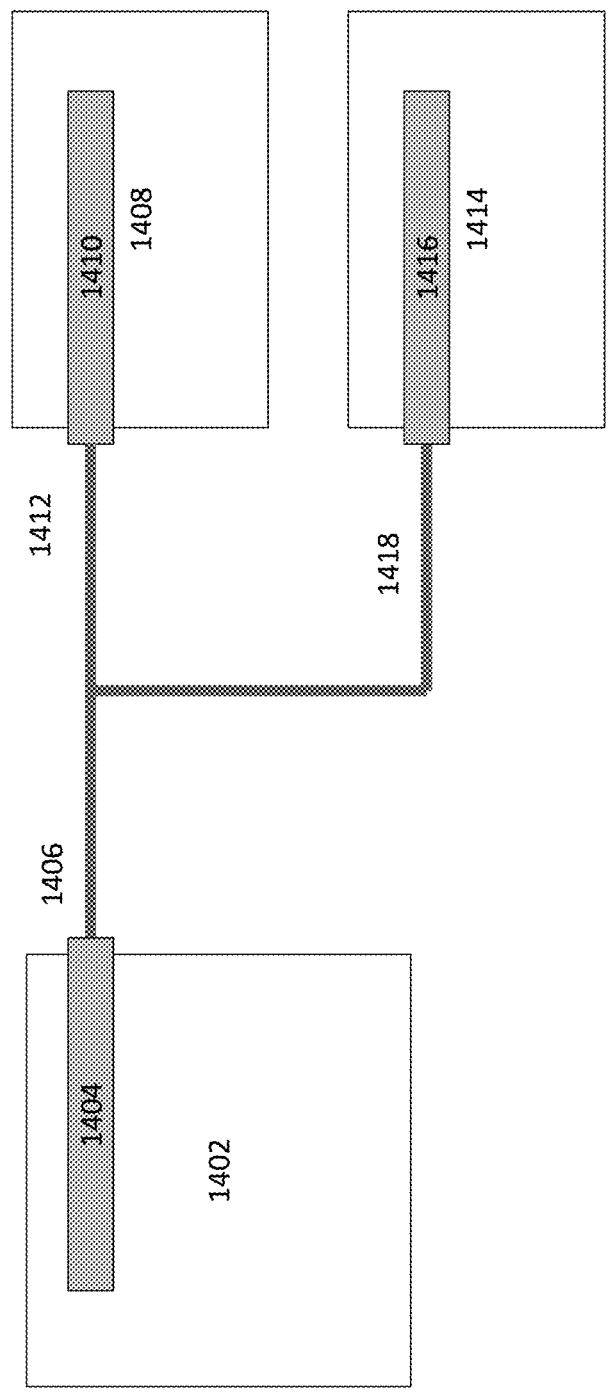
FIG. 14 illustrates the application of some techniques described herein to a fourth use case in some embodiments.

FIG. 14 illustrates the application of some techniques described herein to a fourth working example in some embodiments. More specifically, FIG. 14 illustrates the annotation techniques applied to a first block connected to two different blocks representing, for example, two different devices.

In these illustrated embodiments, FIG. 14 shows the first block 1402 including a first port 1404 (e.g., die_pin<5:0>), a second block 1408 including a second port 1410 (e.g., bga_pin<2:0>), and a third port 1414 (e.g., bga_pin<2:0>). The first port 1404 (e.g., die_pin<5:0>) is connected to the second port via the net 1406 (e.g., net<5:0>) and the net 1412 (e.g., net<2:0>). The first port 1404 is further connected to the third port 1416 (e.g., bga_pin<5:3>) via the net 1406 and 1418 (e.g., net<5:3>). In other words, net 1406 is connected to both net 1412 and net 1418. In some embodiments, the first block 1402 may include an IC and may also be associated with a first reference designator, the second block 1408 may include a first BGA (ball grid array) and may also be associated with a second reference designator, and the third block 1414 may include a second BGA and may be associated with a third reference designator.

Figure 15:
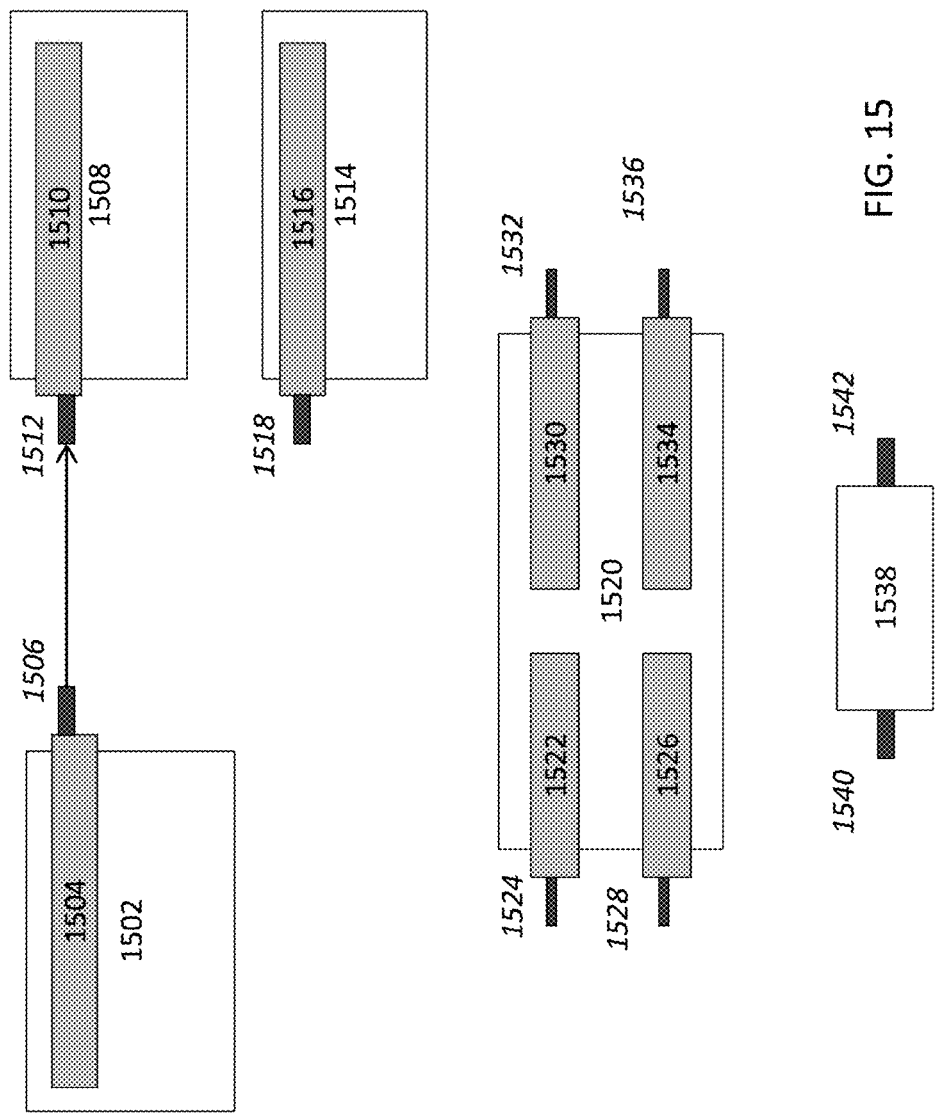
FIG. 15 illustrates a solution for the second use case illustrated in FIG. 8 in some embodiments.

FIG. 15 illustrates a solution for the fourth use case illustrated in FIG. 14 in some embodiments. The solution to the fourth use case is illustrated in FIG. 15 where model assignment may be done on net<0> and net<5>. More specifically, FIG. 15 illustrates that the schematic representation illustrated in FIG. 14 may be annotated with the model instances illustrated in FIG. 15. In FIG. 15, the first block 1502, the second block 1508, and the third block 1514 may be respectively represented or replaced with the model symbols 1502, 1508, and 1514.

The first port may be represented by the model symbol 1504 (e.g., die_pin<5:0>), which may also be instantiated under the model with model symbol 1502, and connected to the first net 1506 (e.g., net<5:0>). The second port of the second block may be represented or replaced with the model symbol 1510 (e.g., bga_pin1[2:0]), which may also be instantiated under the model with model symbol 1508, and connected to the second new net 1512 (e.g., net_new<2:0>).

The third port of the third block may be represented or replaced with the model symbol 1516 (e.g., bga_pin2[2:0]), which may also be instantiated under the model with model symbol 1514, and connected to the second new net 1518 (e.g., net_new<5:3>). The interconnection between the first block, the second block, and the third block may be further represented as or replaced with the model with the model symbol 1538 (e.g., "cds_thru" representing a short circuit) including or associated with the first new net identification 1540 (e.g., net_new<1, 2, 3, 4>) and the second new net identification 1542 (e.g., net_new<1, 2, 3, 4>). The interconnection between the first block and the second block may further include the model symbol 1520 that may further include the first pin 1522 (e.g., DIE-die_pin<0>) connected to a net 1524 (e.g., net <0>) and a second pin 1526 (e.g., DIE-die_pin<5>) connected to a net 1528 (e.g., net <5>) that are both used to connect the model 1520 to the model symbol 1502 of the first block.

The model symbol 1520 may further include the third pin 1530 (e.g., BGA-bga_pin<0>) connected to a net 1532 (e.g., net_new<0>) and then to the second block and a fourth pin 1534 (e.g., BGA1-bga_pin<5>) connected to a net 1536 (e.g., net_new<5>) and then to the third block. FIG. 15 further illustrates that there are six signals transmitted from the first block as the vectored bus net 1506 (e.g., net<5:0>) that includes, for example, net<5>, net<4>, net<3>, net<2>, net<1>, and net<0>. These six signals are transmitted to the second block (e.g., bga or BGA) with the model symbol 1508 and the third block (e.g., bga1 or BGA1) with the model symbol 1514. For example, net<5>, net<4>, and net<3> may be respectively connected to bga_pin<2>, bga_pin<1>, and bga_pin<0> of the second block.

Figure 16:
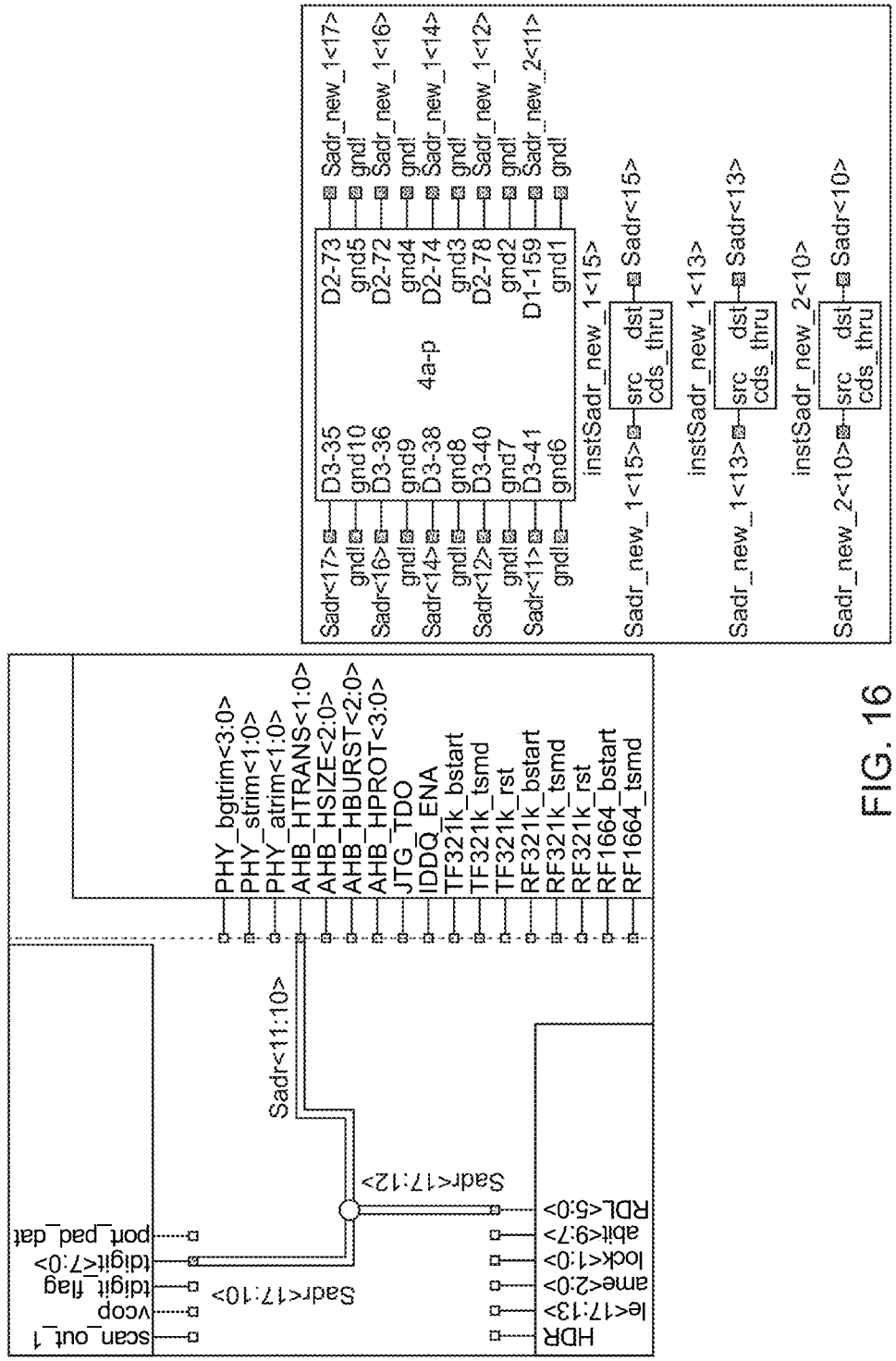
FIG. 16 illustrates the application of some techniques described with reference to FIGS. 14-15 to a part of an electronic design in some embodiments.

Furthermore, net<2>, net<1>, and net<0> may be respectively connected to bga1_pin<2>, bga1_pin<1>, and bga1_pin<0> of the third block. In some embodiments, the mode of interconnects net<0> and net<5> may be extracted as, for example, a SPICE sub-circuit or an S-parameter model that includes two input ports and two output ports as the model illustrated with the model symbol 1520. This model may be inserted in paths for net<5> and net<0> from the first block to the second and the third blocks. Inserting the model with model symbol 1520 in this manner results in abutment or connection of net<5> into net<5> and net_new<6> and abutment or connection of net<0> into net<0> and net_new<0>. FIG. 16 illustrates an illustrated design for the fourth working example illustrated above with reference to FIGS. 14-15 in some embodiments.

Figure 17:
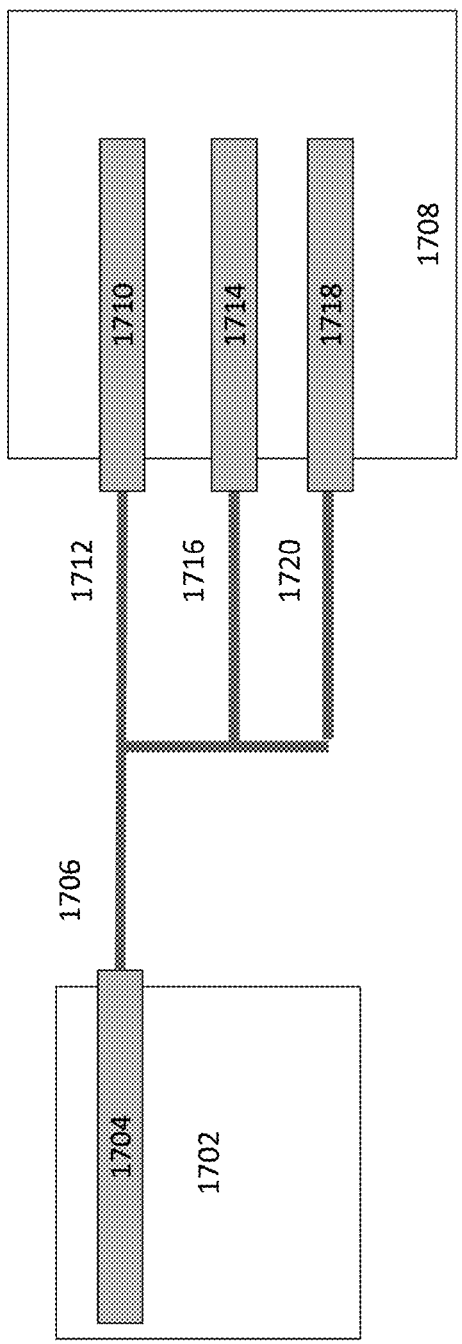
FIG. 17 illustrates the application of some techniques described herein to a fifth use case in some embodiments.

FIG. 17 illustrates the application of some techniques described herein to a fifth working example in some embodiments. More specifically, FIG. 17 illustrates the annotation techniques applied to a first block having a vectored bus connected to the scalared bus of a second block. In these embodiments, the first block may include, for example, an IC die, and the second block may include, for example, a ball grid array.

In these illustrated embodiments, FIG. 17 shows the first block 1702 including a first port 1704 (e.g., die_pin<2:0>), and a second block 1708 including a second port 1710 (e.g., bga_pin_1), a third port 1714 (e.g., bga_pin_2), and a fourth port 1718 (e.g., bga_pin_3). The first block 1702 is connected to the second block via a vectored net 1706 (e.g., net<2:0>) which is further connected to the first scalared net 1712 (e.g., net<2>), the second scalared net 1716 (e.g., net<1>), and the third scalared net 1720 (e.g., net<0>) which are respectively connected to the second port 1710, the third port 1714, and the fourth port 1718 of the second block 1708. In other words, the vectored net 1706 is connected to the first scalared net 1712 which is connected to the second port 1710 of the second block 1710; the vectored net 1706 is connected to the second scalared net 1716 which is connected to the third port 1714 of the second block 1708; and the vectored net 1706 is connected to the third scalared net 1720 which is connected to the fourth port 1718 of the second block 1708. In some embodiments, the first block 1702 may include an IC die and may also be associated with a first reference designator, the second block 1708 may include a BGA (ball grid array) and may also be associated with a second reference designator. In these embodiments illustrated in FIG. 17, the model assignment may be done on net<0> and net<1>.

Figure 18:
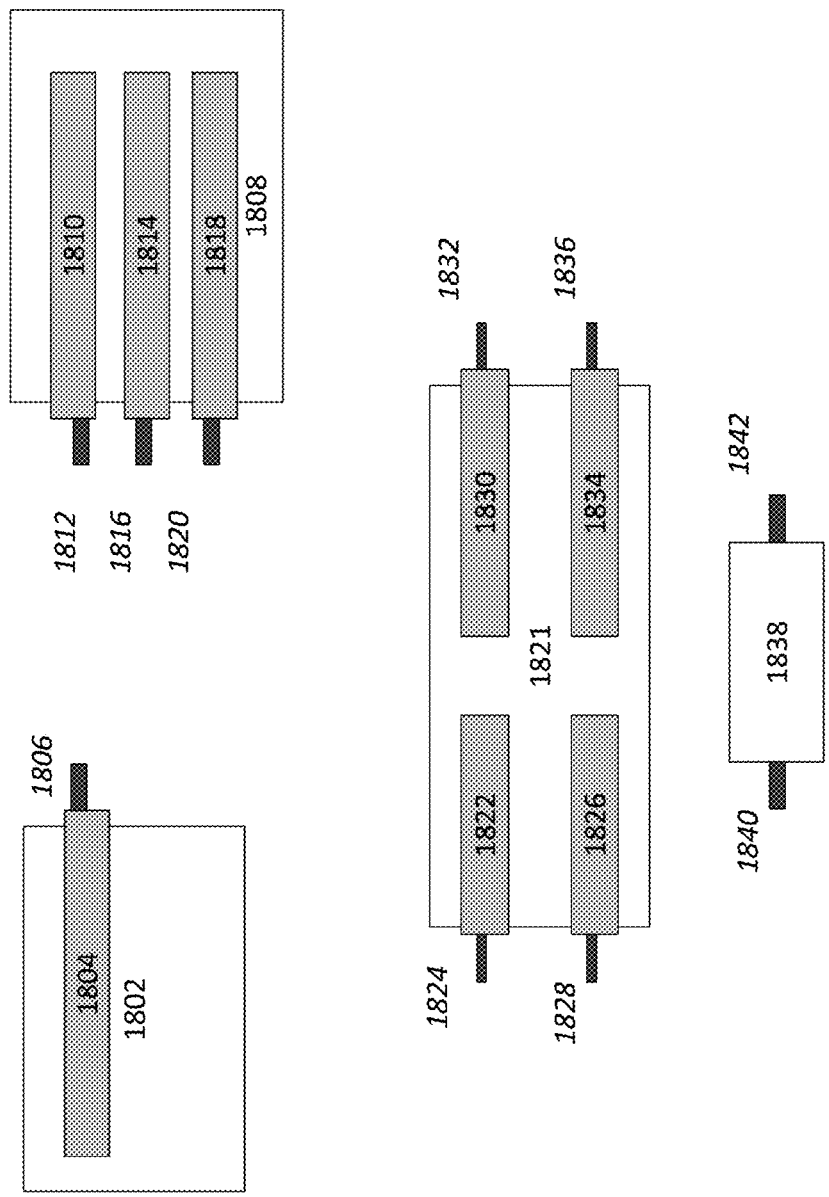
FIG. 18 illustrates a solution for the second use case illustrated in FIG. 17 in some embodiments.

FIG. 18 illustrates a solution for the second use case illustrated in FIG. 17 in some embodiments. More specifically, the solution to the fourth use case is illustrated in FIG. 18 where model assignment may be done on net<1> and net<0>. More specifically, FIG. 18 illustrates that the schematic representation illustrated in FIG. 17 may be annotated with the model instances illustrated in FIG. 18. In these embodiments illustrated in FIG. 18, the first block 1702 and the second block 1708 may be respectively represented or replaced with the model symbols 1802 and 1808. The first port 1704 may be represented by the model symbol instance

1804 (e.g., die_pin<2:0>), which may also be instantiated under the model symbol instance 1802 and connected to the model symbol instance 1806 of the vectored net (e.g., net<2:0>).

The second port 1710 of the second block 1708 may be represented or replaced with the model symbol instance 1810, which may also be instantiated under the symbol instance 1808 and connected to the model symbol instance of the first scalared net 1812 (e.g., net_new<2>).

The third port 1714 of the second block may be represented or replaced with the model symbol instance 1814, which may also be instantiated under the model with model symbol instance 1808, and connected to the model symbol of the second scalared new net 1816 (e.g., net_new<1>).

The fourth port 1718 of the second block may be represented or replaced with the model symbol instance 1818, which may also be instantiated under the model with model symbol instance 1808, and connected to the model symbol instance of the third scalared new net 1820 (e.g., net_new<0>).

The interconnection between the first block and the second block may be further represented as or replaced with the model symbol instances including the model symbol 1838 (e.g., "cds_thru" representing a short circuit) including or associated with the first new net identification 1840 (e.g., net <2>) and the second new net identification 1842 (e.g., net_new<2>).

The interconnection between the first block and the second block may further include the model symbol instance 1821 that may further include the first pin model symbol instance 1822 (e.g., DIE-die_pin<0>) connected to a net 1824 (e.g., net <0>) and a second pin model symbol instance 1826 (e.g., DIE-die_pin<1>) connected to a net 1828 (e.g., net <1>) that are both used to connect the model symbol instance 1821 to the model symbol instance 1802 of the first block. The model symbol instance 1821 may also include the third pin model symbol instance 1830 (e.g., BGA-die_pin<3>) connected to a net 1832 (e.g., net_new<0>) and a fourth pin model symbol instance 1834 (e.g., BGA-die_pin<2>) connected to a net 1836 (e.g., net_new<1>) that are both used to connect the model symbol instance 1821 to the model symbol instance 1808 of the second block.

Figure 19:
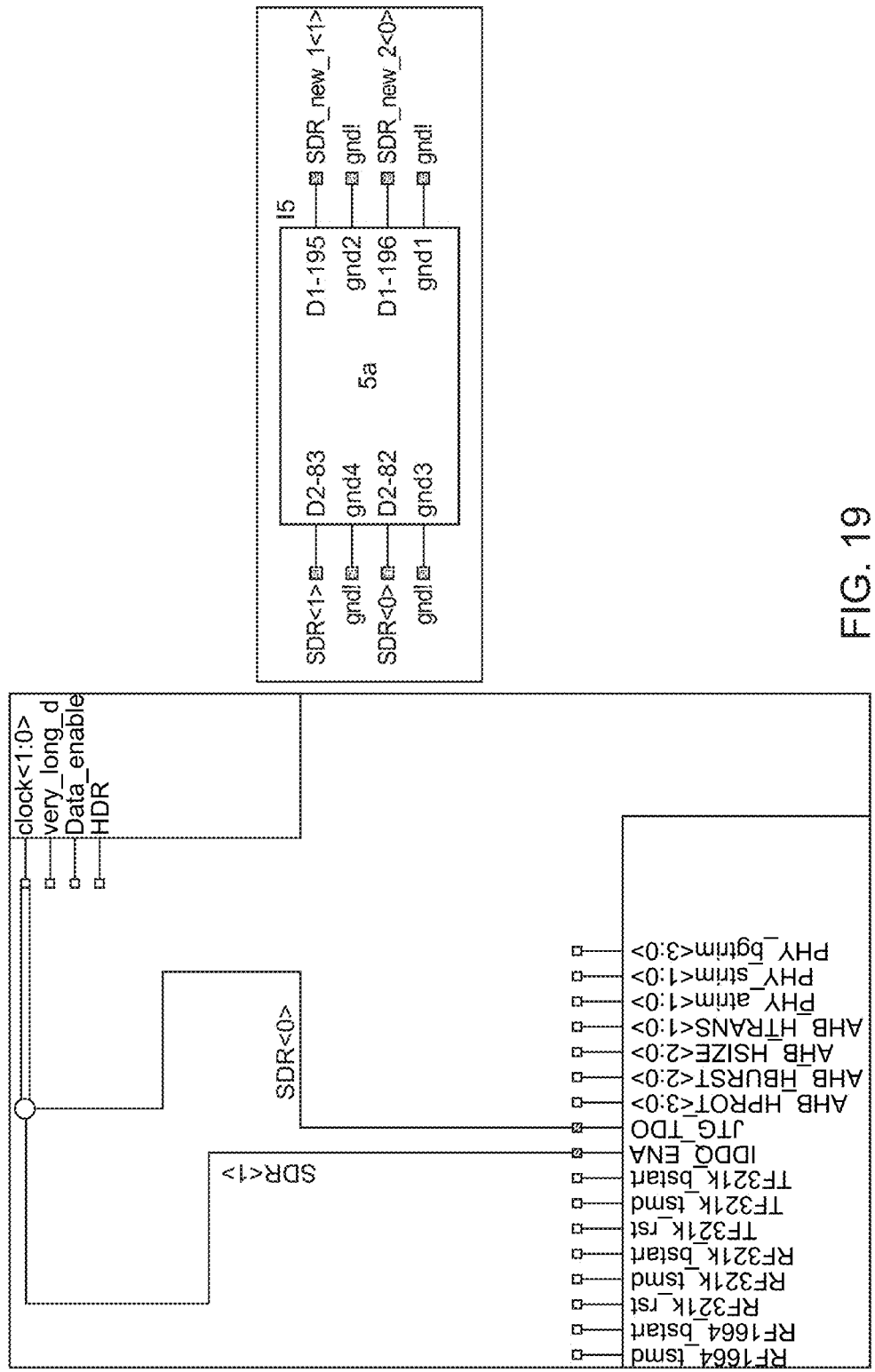
FIG. 19 illustrates the application of some techniques described with reference to FIGS. 17-18 to a part of an electronic design in some embodiments.

In FIG. 18, net<0> from the model symbol instance 1802 passes through the model symbol instance 1821 and ends at 1810 (e.g., BGA-bga_pin<3>); net<1> from the model symbol instance 1802 passes through the model symbol instance 1821 and at 1814 (e.g., BGA-bga_pin<2>); and net<2> from the model symbol instance 1802 passes through the model symbol instance 1838 and ends at 1820 (e.g., BGA-bga_pin<1>). FIG. 19 illustrates an illustrated design for the fifth working example illustrated above with reference to FIGS. 17-18 in some embodiments.

FIG. 20A illustrates application of techniques described herein to generate visualization or display of ports of parasitic models that correspond to extracted nets in a simplified electronic design in some embodiments. More specifically, FIG. 20A illustrates a schematic representation of a portion of an electronic design where a user or an EDA tool has identified or selected some net segments 2002. FIG. 20A illustrates the annotation or stitching of parasitics in a portion of FIG. 20A where a resistor 2006A and a capacitor 2004A are annotated to indicate the electrical parasitics along the interconnect including the interconnect segments 2002A in the electronic design. The annotated parasitics may also be associated with their respective parasitic values in some embodiments.

FIG. 21 illustrates application of techniques described herein to generate visualization or display of ports of parasitic models that correspond to a group of nets and instances in a simplified electronic design in some embodiments. More specifically, FIG. 21 illustrates that two complex models 2102 and 2104 are inserted with all the ports connected to the respective nets in the electronic design. In addition to the parasitic annotations, the electronic design in FIG. 21 further includes the association of port identifications with the respective ports of the complex models.

Figure 21A:
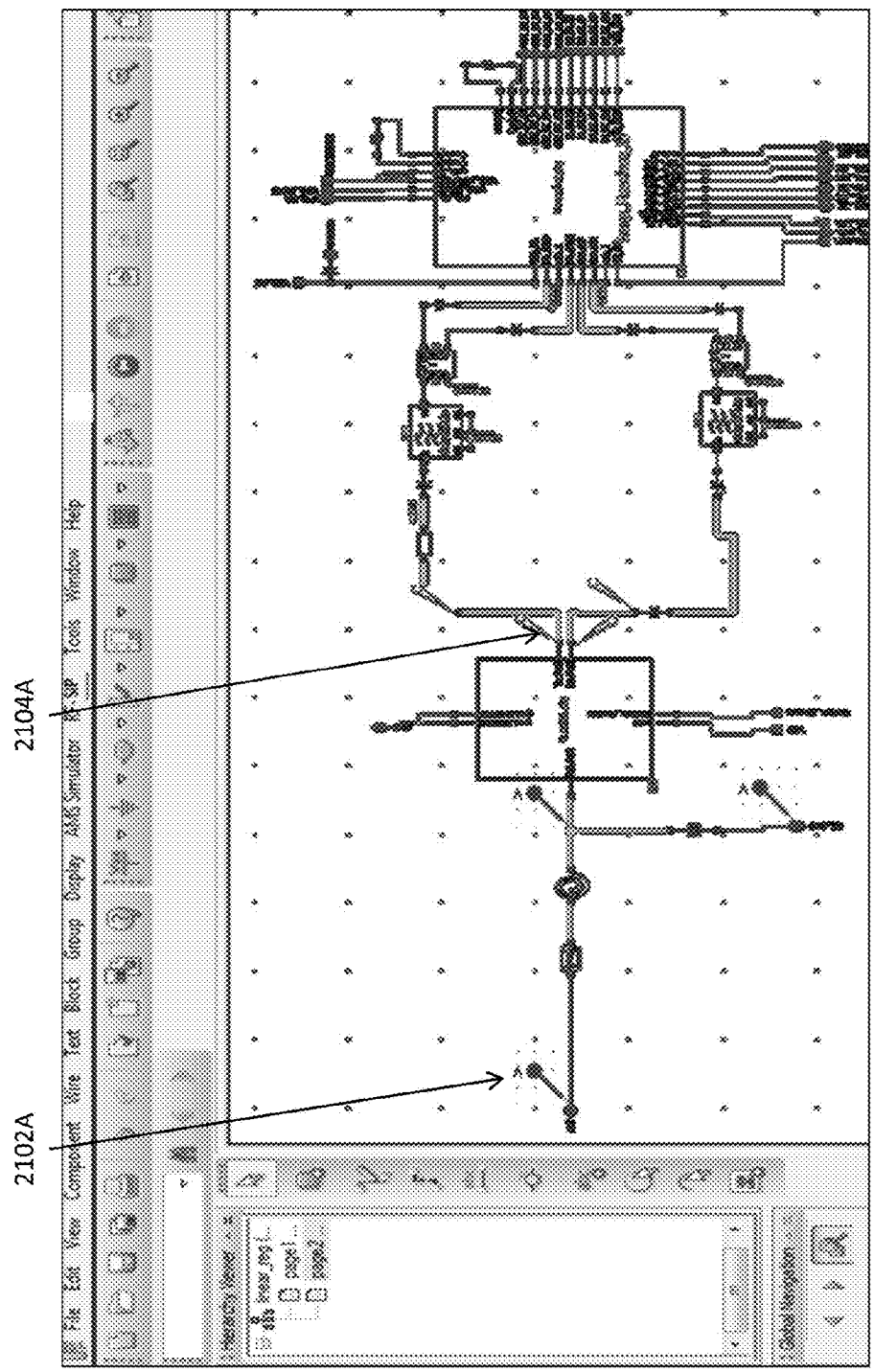
FIG. 21A illustrates application of techniques described herein to generate visualization or display of all annotated models identified with different graphical or textual emphasis in a simplified electronic design in some embodiments.

FIG. 21A illustrates application of techniques described herein to generate visualization or display of all annotated models identified with different graphical or textual emphasis in a simplified electronic design in some embodiments. More specifically, FIG. 21A illustrates that a user may probe different parts of the electronic design (e.g., a schematic design as illustrated in FIG. 21A) by identifying one or more nodes or circuit components (e.g., by using a point device or textual input to select nodes or circuit components in the electronic design) with one or more sets of probes. These one or more sets of probes (e.g., 2102A as one set, and 2104A as another set) may further be distinguished with different textual or graphical emphasis (e.g., different textual identifications, different graphical illustrations, or both).

In response to a probe, the method or system may automatically identify one or more pertinent circuit components across one or more hierarchical levels or even across one or more design fabrics for visualization or for subsequent analyses or simulations or display of the results therefor. In some embodiments, the method or system described herein may further display information related to the one or more nodes or circuit components identified by the one or more sets of probes as well as information related to the one or more pertinent circuit components in response to the one or more sets of probes. The information displayed may include any electrical characteristics (e.g., voltages, currents, etc.), any parasitic information (e.g., resistance, capacitance, etc.), and/or any other related information (e.g., timing, performance, noise, etc.) in the same display area or window for the electronic design, in a separate display area or window, or in other means for display (e.g., pop-up windows, balloons, etc.)

FIG. 22 illustrates application of techniques described herein to generate visualization or display of model annotations on vectored nets in a simplified electronic design in some embodiments. More specifically, FIG. 22 illustrates applying various automatic annotation techniques described herein to provide model visualizations on vectored nets with two probes 2218 and 2220 showing the port identifications (e.g., pin numbers) for the ports at which automatic extraction is to occur or has occurred. For example, probe 2218 may show the port identifications (e.g., DIE-die_pin<0> and DIE-die_pin<1>) for the first port 2204 at which extraction is to occur or has occurred; and probe 2220 may show the port identifications (e.g., BGA-bga_pin<0> and BGA-bga_pin<1>) of the second port 2212 at which extraction is to occur or has occurred. In some embodiments, the ordering of bits on a probe may reflect the corresponding end to end points of one or more nets. In some embodiments illustrated in FIG. 22, the electronic design includes a first model symbol instance 2202 for a first block, which may include, for example, an IC die having a first reference designator, and a second model symbol instance 2210 for a second block, which may include, for example, a ball grid array having a second reference designator. The first block includes a first port 2204 (e.g., die_pin<2:0>) that is connected to via a first net (e.g., net<2,0>) to the second port 2212 (e.g., bga_pin<2:0>). The first model for the first net may be split into multiple models, and the first net identification of the first net may also be split into multiple split net identifications. In an example where the first net includes net<2:0>, the first model for first net may be split into three nets having their respective identifications (e.g., 2206 and 2208) of net<0>, net<1>, and net<2>. The second block includes a second port 2212 (e.g., bga_pin<2:0>) that is connected to the first block 2202 via the first net (e.g., net<2,0>) at the second port 2212 (e.g., bga_pin<2:0>). The second model for the second net may also be split into multiple models, and the first net identification of the first net may also be split into multiple split net identifications (e.g., 2214 and 2216) to be added to or associated with the second block 2210. It shall be noted that the second block may include design data that are in a different design fabric from the design data in the first block 2202. In an example where the first net includes net<2:0>, the first model for first net may be split into three nets having their respective identifications of net<0>, net<1>, and net<2>. Furthermore, the second block 2202 or the second port 2212 may include or be associated with the multiple split identifications of the incoming first net segments. For example, the second block 2210 or the second port 2212 may include or be associated with the net identifications—net_new<0>, net_new<1>, and net_new<2>.

FIG. 23 illustrates application of techniques described herein for automatic identification of corresponding structures in a layout in response to the identification of one or more circuit component in a schematic design via probes in some embodiments. In these embodiments, the method or system may identify one or more ports or pins through, for example, one or more probes 2304 in an electronic design 2302 (e.g., a schematic design). In response to the identification of one or more ports or pins, the method or system may automatically identify and drive the corresponding circuit components 2306 in another domain (e.g., the layout domain) or design fabric 2304 for various other purposes. For example, in response to the probes 2304 in the schematic design, the method or system or automatically identify and drive the corresponding layout structures 2306 in the corresponding layout 2304 for solver extraction with respect to the nearest return path.

In some embodiments, the method or system may netlist a schematic into a layout, and each schematic instance port having a pin_name parameter may be updated with the corresponding pin_number of the corresponding layout instance. With the techniques described herein.

System Architecture Overview

Figure 24:
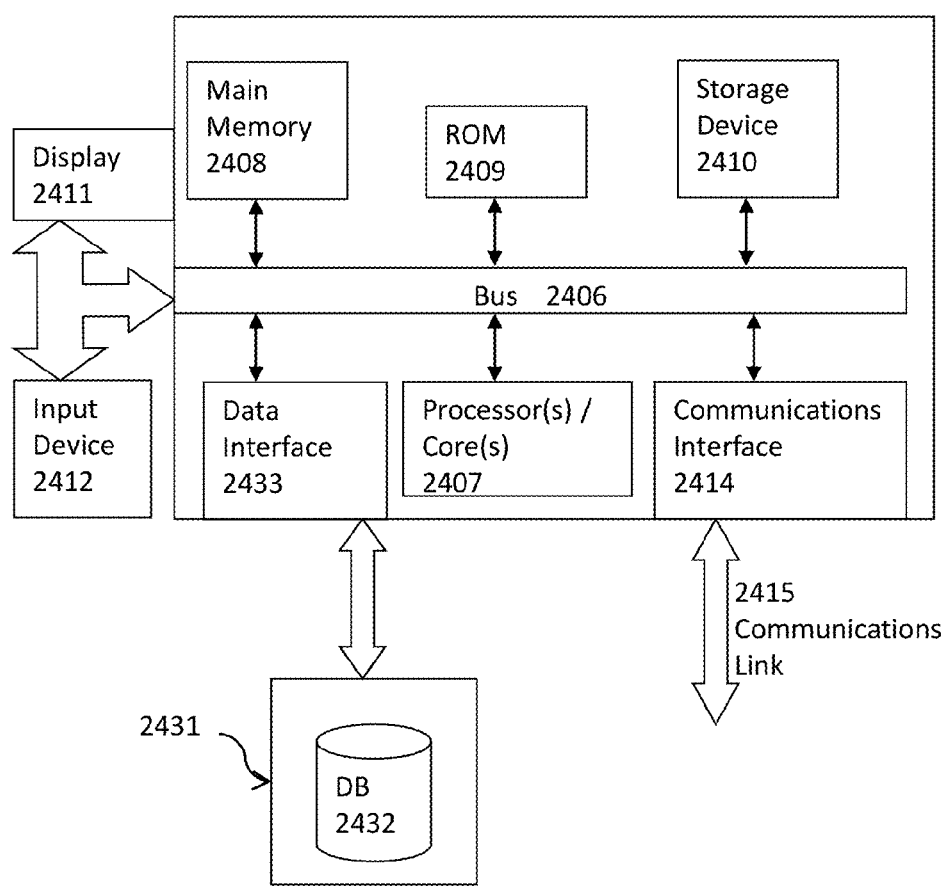
FIG. 24 illustrates a computerized system on which a method for back annotating and visualizing parasitic models of electronic designs may be implemented.

FIG. 24 illustrates a block diagram of an illustrative computing system 2400 suitable for back annotating and visualizing parasitic models of electronic designs as described in the preceding paragraphs with reference to various figures. Computer system 2400 includes a bus 2406 or other communication mechanism for communicating information, which interconnects subsystems and devices, such as processor 2407, system memory 2408 (e.g., RAM), static storage device 2409 (e.g., ROM), disk drive 2410 (e.g., magnetic or optical), communication interface 2414 (e.g., modem or Ethernet card), display 2411 (e.g., CRT or LCD), input device 2412 (e.g., keyboard), and cursor control (not shown).

According to one embodiment, computer system 2400 performs specific operations by one or more processor or processor cores 2407 executing one or more sequences of one or more instructions contained in system memory 2408. Such instructions may be read into system memory 2408 from another computer readable/usable storage medium, such as static storage device 2409 or disk drive 2410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 2407, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 2407 for execution. Such a medium may take many forms, including but not limited to, non-volatile media and volatile media. Non-volatile media includes, for example, optical or magnetic disks, such as disk drive 2410. Volatile media includes dynamic memory, such as system memory 2408.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 2400. According to other embodiments of the invention, two or more computer systems 2400 coupled by communication link 2415 (e.g., LAN, PTSN, or wireless network) may perform the sequence of instructions required to practice the invention in coordination with one another.

Computer system 2400 may transmit and receive messages, data, and instructions, including program, i.e., application code, through communication link 2415 and communication interface 2414. Received program code may be executed by processor 2407 as it is received, and/or stored in disk drive 2410, or other non-volatile storage for later execution. In an embodiment, the computer system 2400 operates in conjunction with a data storage system 2431, e.g., a data storage system 2431 that contains a database 2432 that is readily accessible by the computer system 2400. The computer system 2400 communicates with the data storage system 2431 through a data interface 2433. A data interface 2433, which is coupled to the bus 2406, transmits and receives electrical, electromagnetic or optical signals that include data streams representing various types of signal information, e.g., instructions, messages and data. In embodiments of the invention, the functions of the data interface 2433 may be performed by the communication interface 2414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for processing an annotated electronic design, comprising:
    using at least one processor or at least one processor core to perform a process the process comprising:
    identifying at least a portion of an electronic design;
    receiving a request to perform one or more operations on the portion of the electronic design;
    determining one or more probes in response to the request; and
    generating and displaying an annotated view for the at least the portion of the electronic design in a user interface with at least in part upon the one or more probes.

2. The computer implemented method of claim 1, the process further comprising:
    identifying one or more circuit components in response to the request for the at least the portion of the electronic design; and
    determining one or more models for the one or more circuit components, wherein the one or more models for the one or more circuit components include at least one complex model.

3. The computer implemented method of claim 2, the act of determining the one or more probes in response to the request comprising at least one of:
    determining a total number of the one or more probes based at least in part upon the one or more models for the one or more circuit components;
    determining respective locations in the of the one or more probes in the portion of the electronic design; and
    determining one or more groups of the one or more probes.

4. The computer implemented method of claim 1, the process further comprising:
    determining an internal, annotated view for the at least the portion of the electronic design, wherein the internal, annotated view is different from the annotated view for the at least the portion of the electronic design.

5. The computer implemented method of claim 1, the process further comprising:
    determining information based at least in part upon the one or more probes.

6. The computer implemented method of claim 5, the process further comprising:
    determining at least a first part of the information at a node which a first probe of the one or more probes is situated at or associated with.

7. The computer implemented method of claim 5, the process further comprising:
    determining at least a second part of the information for at least one circuit component that is situated between two probes of the one or more probes, wherein the circuit component comprises a net segment or a device.

8. The computer implemented method of claim 5, the process further comprising:
    storing at least some of the information or the one or more probes in a simulation profile, wherein
    the information comprises at least some of electrical information of one or more circuit components, parasitic information of one or more circuit components, analysis or simulation results, timing information, one or more analysis parameters or corners, input data for one or more simulations or analyses, and
    the information belongs to a same domain as the electronic design, to at least two different domains, or to at least two different design fabrics.

9. A system for processing an annotated electronic design, comprising:
    non-transitory memory storing thereupon computer code;
    at least one processor or at least one processor core that executes the computer code to identify at least a portion of an electronic design, to receive a request to perform one or more operations on the portion of the electronic design, to determine one or more probes in response to the request, and to generate and displaying an annotated view for the at least the portion of the electronic design in a user interface with at least in part upon the one or more probes.

10. The system of claim 9, wherein the at least one processor or at least one processor core further executes the computer code to identify one or more circuit components in response to the request for the at least the portion of the electronic design, and to determine one or more models for the one or more circuit components, wherein the one or more models for the one or more circuit components include at least one complex model.

11. The system of claim 10, wherein the at least one processor or at least one processor core further executes the computer code to determine a total number of the one or more probes based at least in part upon the one or more models for the one or more circuit components, to determine respective locations in the of the one or more probes in the portion of the electronic design, and to determine one or more groups of the one or more probes.

12. The system of claim 9, wherein the at least one processor or at least one processor core further executes the computer code to determine an internal, annotated view for the at least the portion of the electronic design, wherein the internal, annotated view is different from the annotated view for the at least the portion of the electronic design.

13. The system of claim 9, wherein the at least one processor or at least one processor core further executes the computer code to determine information based at least in part upon the one or more probes, and the at least one processor or at least one processor core further executes the computer code to determine at least a first part of the information at a node which a first probe of the one or more probes is situated at or associated with, or to determine at least a second part of the information for at least one circuit component that is situated between two probes of the one or more probes, wherein the circuit component comprises a net segment or a device.

14. The system of claim 13, wherein the at least one processor or at least one processor core further executes the computer code to store at least some of the information or the one or more probes in a simulation profile, wherein the information comprises at least some of electrical information of one or more circuit components, parasitic information of one or more circuit components, analysis or simulation results, timing information, one or more analysis parameters or corners, input data for one or more simulations or analyses, and the information belongs to a same domain as the electronic design, to at least two different domains, or to at least two different design fabrics.

15. An article of manufacture comprising a non-transitory computer readable storage medium storing thereupon a sequence of instructions which, when executed by at least one processor or at least one processor core, causes the at least one processor or the at least one processor core to perform a set of acts for processing an annotated electronic design, the set of acts comprising:
 using at least one processor or at least one processor core to perform a process the process comprising:
 identifying at least a portion of an electronic design;
 receiving a request to perform one or more operations on the portion of the electronic design;
 determining one or more probes in response to the request; and
 generating and displaying an annotated view for the at least the portion of the electronic design in a user interface with at least in part upon the one or more probes.

16. The article of manufacture of claim 15, the set of acts further comprising:
 identifying one or more circuit components in response to the request for the at least the portion of the electronic design; and
 determining one or more models for the one or more circuit components, wherein the one or more models for the one or more circuit components include at least one complex model.

17. The article of manufacture of claim 16, the act of determining the one or more probes in response to the request comprising at least one of:
 determining a total number of the one or more probes based at least in part upon the one or more models for the one or more circuit components;
 determining respective locations in the of the one or more probes in the portion of the electronic design; and
 determining one or more groups of the one or more probes.

18. The article of manufacture of claim 15, the set of acts further comprising:
 determining an internal, annotated view for the at least the portion of the electronic design, wherein the internal, annotated view is different from the annotated view for the at least the portion of the electronic design.

19. The article of manufacture of claim 15, the set of acts further comprising:
 determining information based at least in part upon the one or more probes, further comprising at least one of:
 determining at least a first part of the information at a node which a first probe of the one or more probes is situated at or associated with; or
 determining at least a second part of the information for at least one circuit component that is situated between two probes of the one or more probes, wherein the circuit component comprises a net segment or a device.

20. The article of manufacture of claim 19, the set of acts further comprising:
 storing at least some of the information or the one or more probes in a simulation profile, wherein
 the information comprises at least some of electrical information of one or more circuit components, parasitic information of one or more circuit components, analysis or simulation results, timing information, one or more analysis parameters or corners, input data for one or more simulations or analyses, and
 the information belongs to a same domain as the electronic design, to at least two different domains, or to at least two different design fabrics.

* * * * *